US008407606B1

(12) United States Patent
Davidson et al.

(10) Patent No.: US 8,407,606 B1
(45) Date of Patent: Mar. 26, 2013

(54) ALLOCATING CONTROL AMONG INPUTS CONCURRENTLY ENGAGING AN OBJECT DISPLAYED ON A MULTI-TOUCH DEVICE

(75) Inventors: Philip L. Davidson, New York, NY (US); Jefferson Y. Han, Holliswood, NY (US)

(73) Assignee: Perceptive Pixel Inc., New York, NY (US)

( * ) Notice: Subject to any disclaimer, the term of this patent is extended or adjusted under 35 U.S.C. 154(b) by 377 days.

(21) Appl. No.: 12/652,010

(22) Filed: Jan. 4, 2010

Related U.S. Application Data

(60) Provisional application No. 61/142,328, filed on Jan. 2, 2009.

(51) Int. Cl.
*G06F 3/048* (2006.01)

(52) U.S. Cl. ........ 715/754; 715/751; 715/753; 715/759; 715/863; 345/173

(58) Field of Classification Search .................. 715/754; 345/173
See application file for complete search history.

(56) References Cited

U.S. PATENT DOCUMENTS

| 4,845,644 | A | 7/1989 | Anthias et al. |
| 5,784,061 | A | 7/1998 | Moran et al. |
| 5,796,396 | A * | 8/1998 | Rich .............................. 715/741 |
| 5,933,135 | A * | 8/1999 | Martin ........................... 345/179 |
| 6,323,846 | B1 | 11/2001 | Westerman et al. |
| 6,998,545 | B2 * | 2/2006 | Harkcom et al. .......... 178/18.02 |
| 7,339,580 | B2 | 3/2008 | Westerman et al. |
| 7,479,949 | B2 | 1/2009 | Jobs et al. |
| 7,509,588 | B2 | 3/2009 | Van Os et al. |
| 7,620,900 | B2 * | 11/2009 | Kawashima et al. ......... 715/754 |
| 7,620,901 | B2 * | 11/2009 | Carpenter et al. ............ 715/754 |
| 7,653,883 | B2 | 1/2010 | Hotelling et al. |
| 7,743,348 | B2 | 6/2010 | Robbins et al. |
| 7,949,633 | B1 * | 5/2011 | Shaver et al. ................. 707/620 |
| 2006/0026521 | A1 | 2/2006 | Hotelling et al. |
| 2008/0016461 | A1 | 1/2008 | Hoblit |
| 2008/0174570 | A1 | 7/2008 | Jobs et al. |
| 2009/0085887 | A1* | 4/2009 | Chueh et al. .................. 345/173 |
| 2009/0228828 | A1 * | 9/2009 | Beatty et al. .................. 715/786 |
| 2010/0079382 | A1 * | 4/2010 | Suggs .......................... 345/173 |

OTHER PUBLICATIONS

Non-Final Office Action mailed Jul. 18, 2012 in U.S. Appl. No. 12/652,002, 82 pages.
Non-Final Office Action mailed Jul. 18, 2012 in U.S. Appl. No. 12/652,003, 91 pages.

* cited by examiner

*Primary Examiner* — Alvin Tan
(74) *Attorney, Agent, or Firm* — Alleman Hall McCoy Russell & Tuttle LLP

(57) ABSTRACT

A multi-touch display device is configured to enable control of a displayed object by less than all of the input mechanisms determined to be engaging the displayed object at the same time.

11 Claims, 19 Drawing Sheets

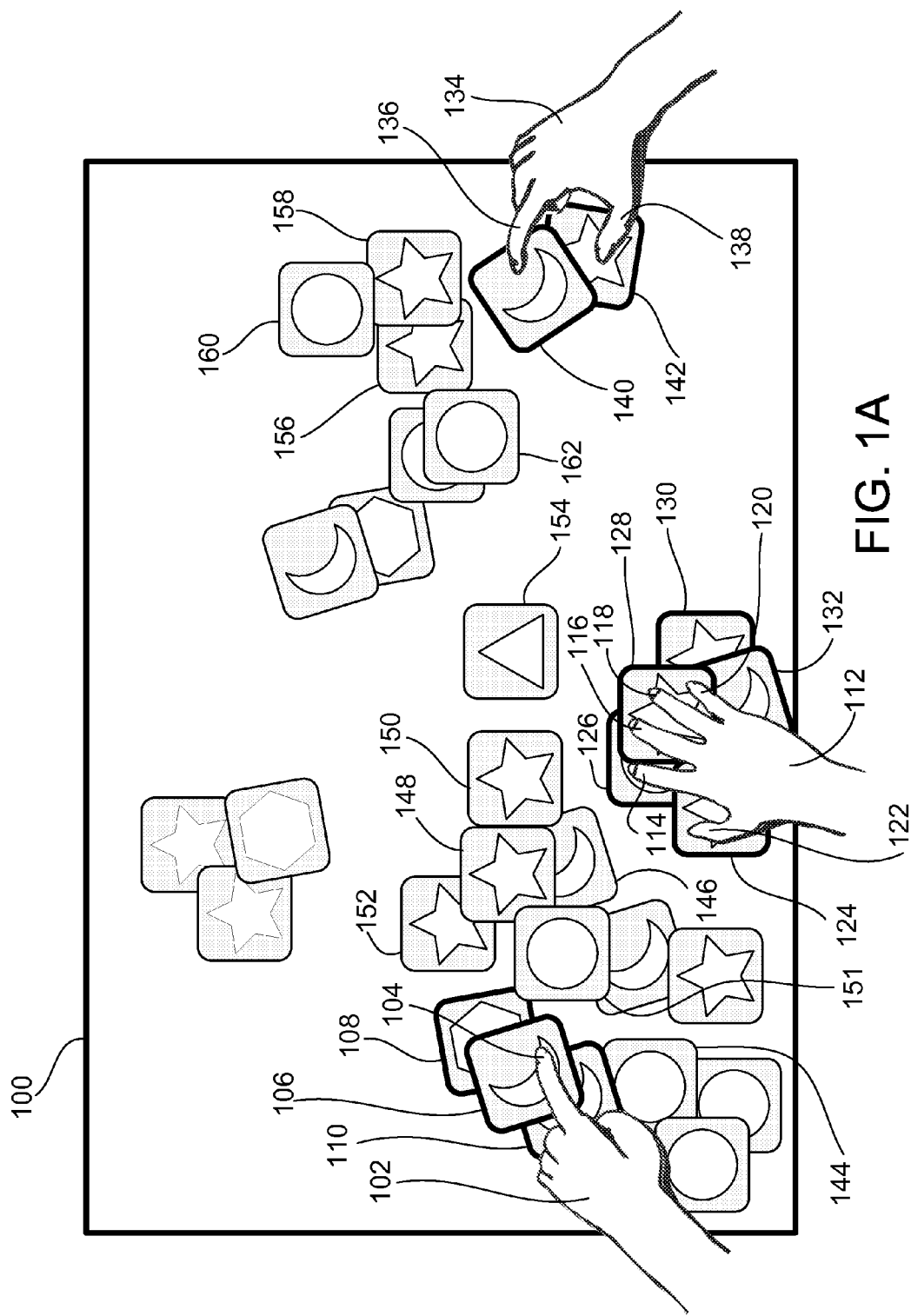

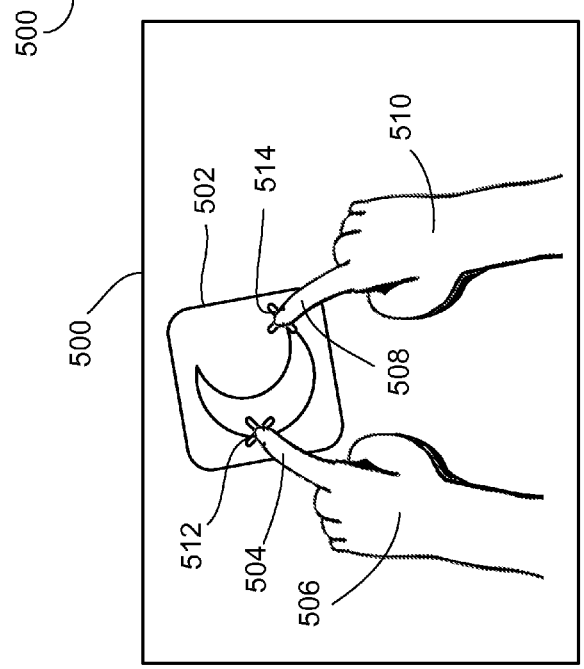
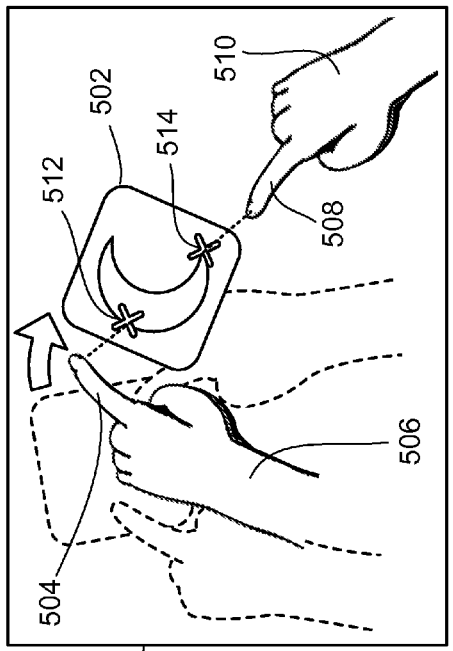
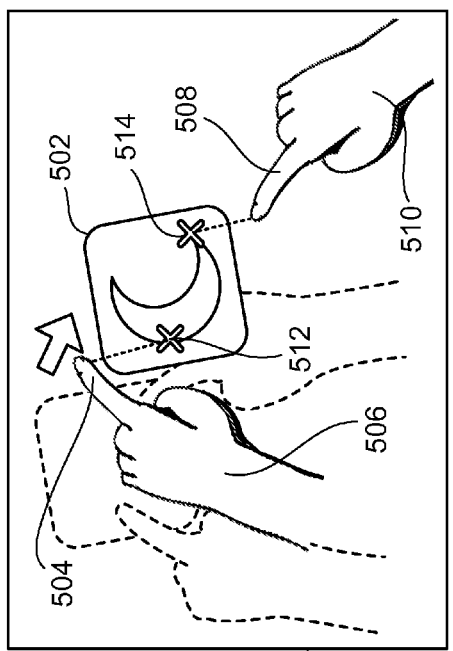

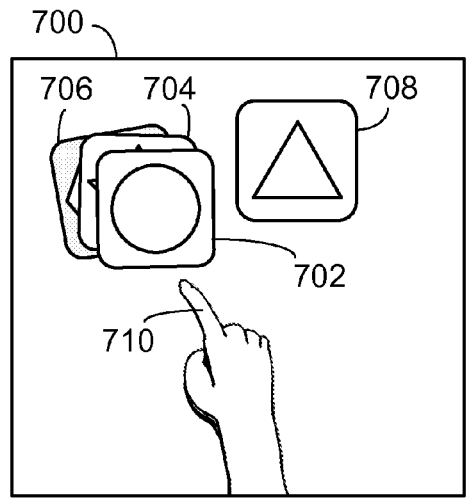 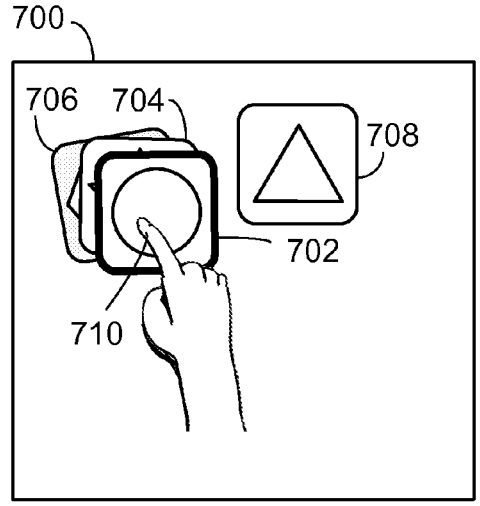
FIG. 7A  FIG. 7B
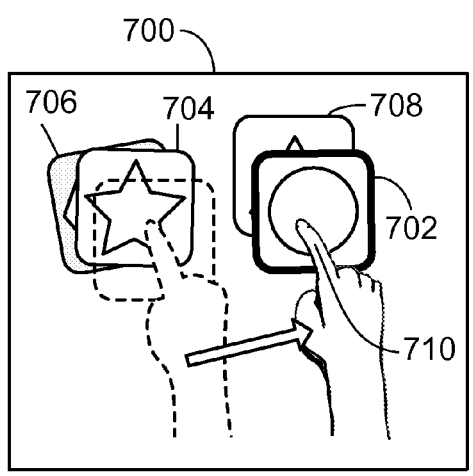 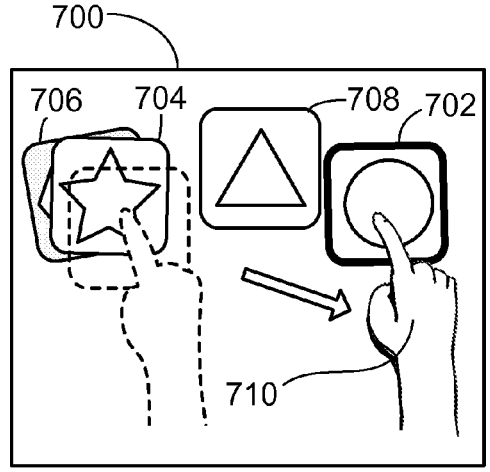
FIG. 7C  FIG. 7D

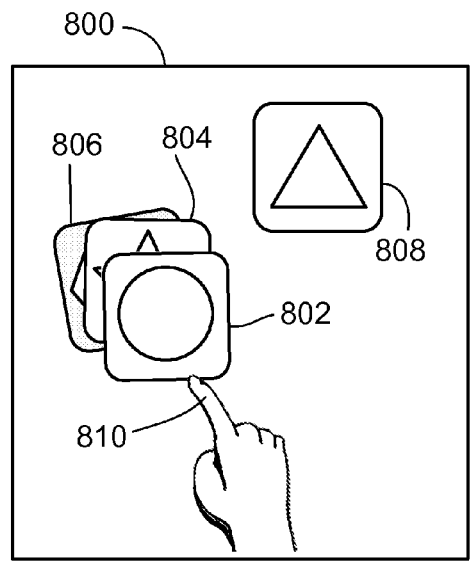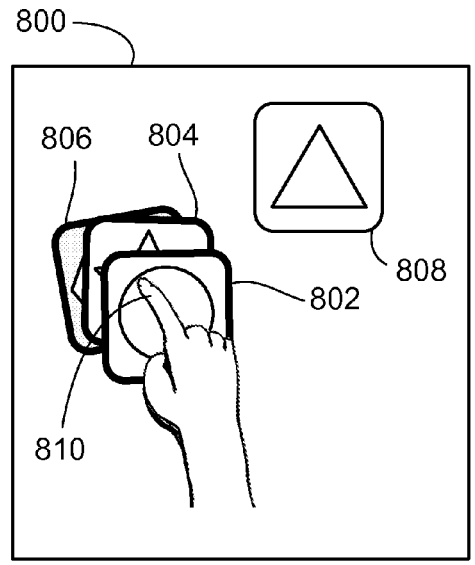
FIG. 8A  FIG. 8B
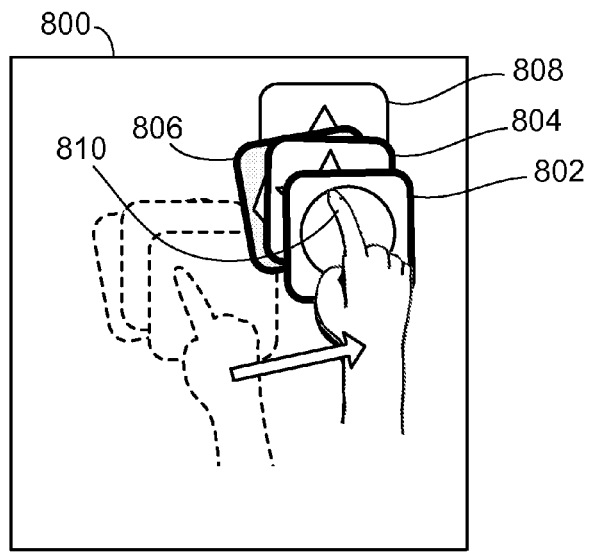
FIG. 8C

ALLOCATING CONTROL AMONG INPUTS CONCURRENTLY ENGAGING AN OBJECT DISPLAYED ON A MULTI-TOUCH DEVICE

CROSS REFERENCE TO RELATED APPLICATION

This application claims priority to U.S. Provisional Patent Application Ser. No. 61/142,328, filed on Jan. 2, 2009 and entitled "Concurrent Manipulation of Multiple Objects Displayed on a Multi-touch Device," which is incorporated herein by reference in its entirety.

TECHNICAL FIELD

This disclosure relates to allocating control among inputs concurrently engaging an object that is displayed on a multi-touch display device.

BACKGROUND

Generally, touch-screen display devices are capable of detecting input from a user by detecting the presence and location of a touch on, within, or within the vicinity of the surface of the display area. Some touch-screen display devices require that a user physically touch the surface of the display area, for example with a finger, stylus, or other input mechanism, in order to engage the surface of the touch-screen display device. Other touch-screen display devices are capable of receiving input by detecting that a user's finger, a stylus, or some other input mechanism has engaged the surface of the touch-screen display device by hovering around, or otherwise in the vicinity of, a particular location on the surface of the display area.

Multi-touch display devices are more sophisticated than traditional touch-screen display devices and are capable of detecting the presence and location of multiple touches on, within, or within the vicinity of the surface of the display area at the same time. Like traditional touch-screen display devices, some multi-touch display devices require that a user physically touch the surface of the display area with one or more fingers, styluses, and/or other mechanisms in order to engage the surface of the multi-touch display device, while other multi-touch display devices are capable of receiving input by detecting that one or more fingers, styluses, and/or other input mechanisms have engaged the surface of the multi-touch display device by hovering around, or otherwise in the vicinity of, the surface of the display area.

Multi-touch display devices belong to a more general class of multi-point input computing systems. Multi-point input computing systems receive, recognize, and act upon multiple inputs at the same time.

SUMMARY

A multi-touch display device is configured to enable control of a displayed object by less than all of the input mechanisms determined to be engaging the displayed object at the same time.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

DESCRIPTION OF DRAWINGS

FIGS. 1A-1B are diagrams of a multi-touch display device that provides for group manipulation of multiple displayed objects.

FIGS. 5A-5C are diagrams of a multi-touch display device that illustrate the multi-touch display device effecting less than four degree of freedom transformations of a displayed object in response to detecting user manipulation of the displayed object with two input mechanisms.

FIGS. 7A-7D are diagrams of a multi-touch display device that illustrate the multi-touch display device activating a multi-touch control for manipulating a displayed object in response to detecting that the surface of the multi-touch display device has been engaged in a location where two or more objects overlap.

FIGS. 8A-8E are diagrams of a multi-touch display device that illustrate the multi-touch display device activating multi-touch controls for manipulating multiple displayed objects in response to detecting that the surface of the multi-touch display device has been engaged in a location where multiple objects overlap.

DETAILED DESCRIPTION

A multi-touch display device is configured to display multiple selectable and manipulatable objects and to enable a user to interact with the displayed objects by engaging a surface of the multi-touch display device with an input mechanism, such as, for example, a finger, stylus, or some other mechanical, electro-mechanical, or magnetic input mechanism in locations that correspond to where the objects are displayed. In response to detecting that one or more input mechanisms have engaged the surface of the multi-touch display device in locations that correspond to where an object is displayed, the multi-touch display device may select the displayed object and enable the user to control or otherwise manipulate the displayed object by moving the one or more input mechanisms that engaged the object. In one implementation, the multi-touch display device offers four degrees of freedom for manipulating a selected object including translation in two dimensions, two-dimensional rotation, and/or uniform scaling. In such implementations, the multi-touch display device tracks movements of the one or more input mechanisms that have engaged an object and translates, rotates, and/or uniformly scales the selected object as a function of detected movements by the one or more input mechanisms that have engaged the object.

Due to the multi-touch display device's ability to detect multiple inputs (i.e., multiple input mechanisms engaging the surface of the multi-touch display device) at the same time, the multi-touch display device enables individual selection and control of multiple displayed objects at the same time. As a result, a single user can individually select and control multiple displayed objects at the same time, or multiple collaborating users each can individually select and control multiple displayed objects at the same time. In some scenarios, however, individually manipulating a large number of displayed objects at one time may prove unwieldy. Consequently, the multi-touch display device may enable individual displayed objects to be grouped together for group manipulation.

Figure 1B:
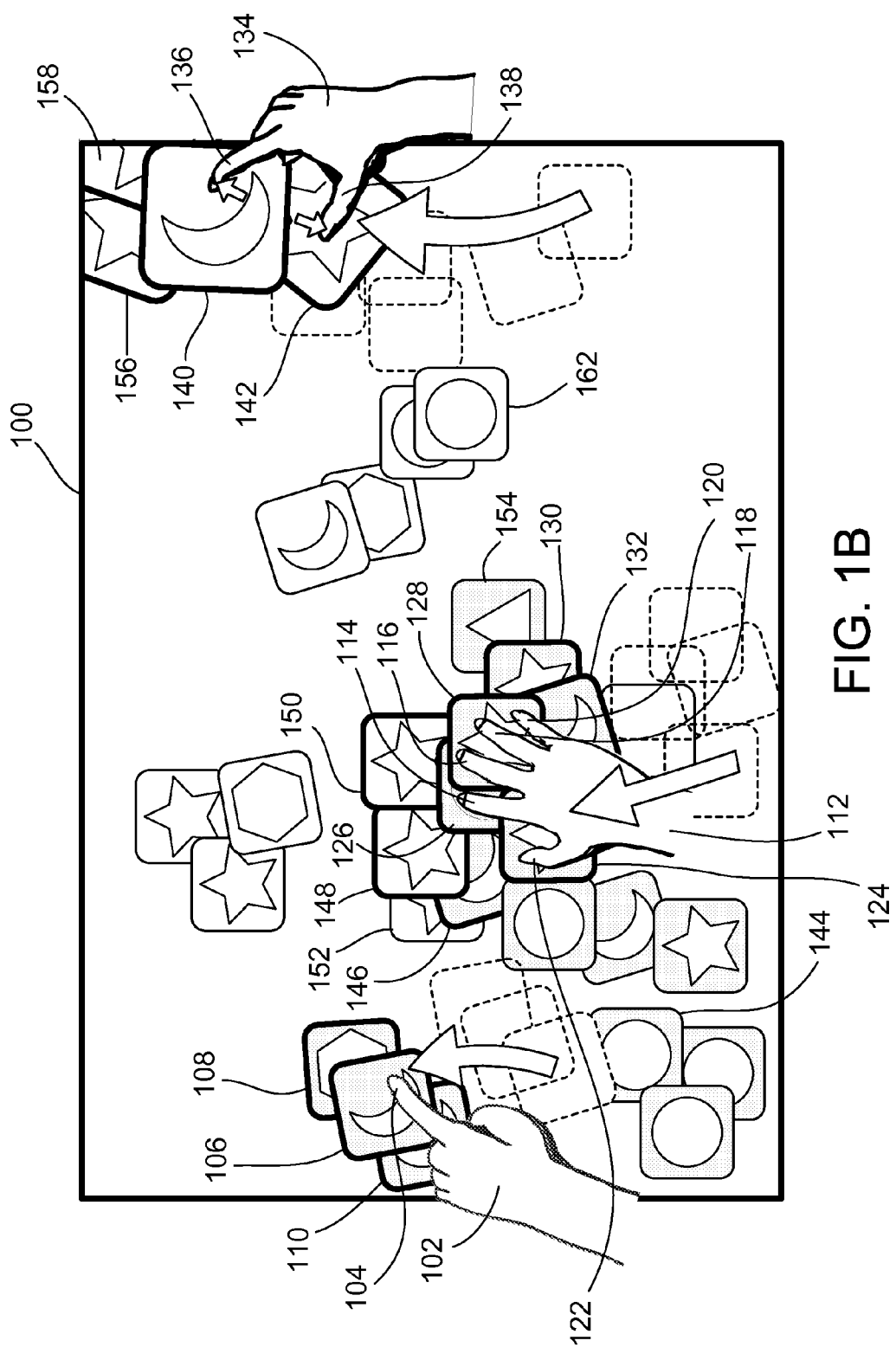

FIGS. 1A-1B are a series of figures of a multi-touch display device 100 that provides for group manipulation of multiple displayed objects. As illustrated in FIG. 1A, the multi-touch display device 100 is displaying multiple objects. In addition, a first hand 102 has engaged the surface of the multi-touch display device 100 with one finger 104 in a location that corresponds to where the multi-touch display device 100 is displaying objects 106, 108, and 110. At the same time, a second hand 112 also has engaged the surface of the multi-touch display device 100 with four fingers 114, 116, 118, and 120 and a thumb 122. As illustrated in FIG. 1A, the thumb 122 of the second hand 112 has engaged the surface of the multi-touch display device in a location that corresponds to where the multi-touch display device 100 is displaying object 124. Meanwhile, the index finger 114 of the second hand 112 has engaged the surface of the multi-touch display device 100 in a location that corresponds to where the multi-touch display device 100 is displaying object 126 while the middle finger 116 of the second hand 112 has engaged the surface of the multi-touch display device 100 in a location that corresponds to where the multi-touch display device 100 is displaying objects 126 and 128. Similarly, the ring finger 118 of the second hand 112 has engaged the surface of the multi-touch display device 100 in a location that corresponds to where the multi-touch display device 100 is displaying objects 128 and 130, and the pinky finger 120 of the second hand 112 has engaged the surface of the multi-touch display device 100 at a location where the multi-touch display device 100 is displaying objects 128, 130, and 132. While the first 102 and second 112 hands remain engaged with the surface of the multi-touch display device 100, a third hand 134 also has engaged the surface of the multi-touch display device 100 with a finger 136 and a thumb 138. As illustrated in FIG. 1A, the index finger 136 of the third hand 134 has engaged the surface of the multi-touch display device 100 at a location that corresponds to where the multi-touch display device 100 is displaying object 140 and the thumb 138 of the third hand 134 has engaged the surface of the multi-touch display device 100 at a location that corresponds to where the multi-touch display device 100 is displaying object 142.

The multi-touch display device 100 is configured to group together for group manipulation any individual displayed objects that are overlapping and that each have been engaged by an input mechanism. Thus, in response to detecting that the index finger 104 of the first hand 102 has engaged the surface of the multi-touch display device 100 at a location that corresponds to where objects 106, 108, and 110 are overlapping, the multi-touch display device has grouped objects 106, 108, and 110 together for group manipulation. Notably, the multi-touch display device 100 did not include object 144 within the group even though a portion of object 144 is overlapping with object 110. This is because object 144 is not engaged by a finger or any other input mechanism. Similarly, in response to detecting that objects 124, 126, 128, 130, and 132 have been engaged by one or more of the four fingers 114, 116, 118, and 120 and the thumb 122 of the second hand 112 and based on the fact that various portions of objects 124, 126, 128, 130, and 132 are overlapping, the multi-touch display device 100 has grouped objects 124, 126, 128, 130, and 132 together for group manipulation. Likewise, in response to detecting that the index finger 136 of the third hand 134 has engaged object 140 and the thumb 138 of the third hand 134 has engaged object 142 and based on the fact that portions of objects 140 and 142 are overlapping, the multi-touch display device 100 has grouped objects 140 and 142 together for group manipulation.

The multi-touch display device 100 is configured such that, after the multi-touch display device 100 has grouped multiple objects together for group manipulation, the multi-touch display device 100 tracks movements of the input mechanisms engaging the various objects within the group and manipulates each object within the group as a function of the tracked movements of all of the input mechanisms engaging any of the objects within the group. In addition, as the multi-touch display device 100 manipulates grouped objects in response to detecting movements by input mechanisms engaging any of the grouped objects, the multi-touch display device 100 also is configured to extend the membership of the group to include any additional object that is engaged by an input mechanism while being overlapped by any of the grouped objects as a result of manipulating the grouped objects.

Referring to FIG. 1B, the first hand 102 has moved relative to FIG. 1A, and, thus, the index finger 104 of the first hand 102 has engaged the surface of the multi-touch display device 100 in a different location than in FIG. 1A. Similarly, the second 112 and third 134 hands also have moved relative to FIG. 1A such that the four fingers 114, 116, 118, and 120 and thumb 122 of the second hand 112 and the index finger 136 and thumb 138 of the third hand 134 have engaged the surface of the multi-touch display device 100 in different locations than in FIG. 1A.

In response to detecting the change in position of the index finger 104 of the first hand 102, the multi-touch display device 100 manipulated objects 106, 108, and 110 as a group as a function of the movement of the index finger 104 of the first hand 102. Specifically, the multi-touch display device 100 translated objects 106, 108, and 110 as a function of the movement of the index finger 104 of the first hand 102.

Similarly, in response to detecting the change in the positions of the four fingers 114, 116, 118, and 120 and the thumb 122 of the second hand 112, the multi-touch display device 100 manipulated objects 124, 126, 128, 130, and 132 as a group as a function of the movement of the four fingers 114, 116, 118, and 120 and the thumb 122 of the second hand 112. Specifically, the multi-touch display device 100 translated objects 124, 126, 128, 130, and 132 as a group as a function of the movement of the four fingers 114, 116, 118, and 120 and the thumb 122 of the second hand 112.

In addition, as a consequence of the movement of the four fingers 114, 116, 118, and 120 and the thumb 122 of the second hand 112 and the resultant translation of grouped objects 124, 126, 128, 130, and 132, objects 146, 148, and 150 have been overlapped by one or more of the grouped objects 124, 126, 128, 130, and 132 while also being engaged by one or more of the four fingers 114, 116, 118, and 120 and thumb 122 of the second hand 112. Specifically, object 146 has been overlapped by objects 124 and 126 while also being engaged by the thumb 122 of the second hand 112. Furthermore, object 148 has been overlapped by objects 126 and 146 while also being engaged by the index finger 114 of the second hand 112 and object 150 has been overlapped by objects 126, 128, and 148 while being engaged by the index finger 114 and the middle finger 116 of the second hand 112. As a result, the multi-touch display device 100 has grouped objects 146, 148, and 150 with objects 124, 126, 128, 130, and 132 for group manipulation. Notably, even though each of objects 151, 152 and 154 overlaps with at least one member of the grouped objects, the multi-touch display device 100 has not added objects 151, 152, and 154 to the group of objects. This is because objects 151, 152, and 154 have not been engaged by input mechanisms while also overlapping with at least one of the grouped objects.

As illustrated in FIG. 1B, in response to detecting the movement of the index finger 136 and thumb 138 of the third hand 134, the multi-touch display device 100 also manipulated objects 140 and 142 as a group as a function of the detected movement of the index finger 136 and thumb 138 of the third hand 134. Specifically, the multi-touch display device 100 translated, rotated, and uniformly scaled each of objects 140 and 142 as a function of the detected movement of the index finger 136 and thumb 138 of the third hand 134.

In addition, as a consequence of the movement of the index finger 136 and thumb 138 of the third hand 134 and the resultant manipulation of grouped objects 140 and 142, at some point in time prior to the point in time illustrated in FIG. 1B, objects 156, 158, and 160 each were overlapped by object 140 while also being engaged by the index finger 136 of the third hand 134. Consequently, the multi-touch display device 100 grouped objects 156, 158, and 160 together with objects 140 and 142 for group manipulation and thereafter manipulated objects 156, 158, and 160 along with objects 140 and 142 as a function of the detected movements of the index finger 136 and thumb 138 of the third hand 134. Notably, even though object 162 was at one time overlapping with object 156, the multi-touch display device 100 did not add object 162 to the group of objects. This is because object 162 was never engaged by an input mechanism while also overlapping with object 156.

In some implementations, the multi-touch display device 100 may employ alternative rules for grouping multiple objects for group manipulation. For example, instead of grouping any overlapping objects that also are both engaged by an input mechanism, the multi-touch display device 100 may only group objects together for group manipulation in response to detecting that the objects have been engaged by an input mechanism in a region where the two objects are overlapping. Alternatively, the multi-touch display device 100 initially may group together any objects that are overlapping with or share a boundary with an engaged object and, thereafter, the multi-touch display device 100 may extend the group to include any other objects that ultimately are overlapped by or contacted by the boundary of one or more of the grouped objects as the grouped objects are manipulated by the multi-touch display device 100 in response to user-inspired input.

In one implementation, a multi-touch display device is configured to detect that one or more input mechanisms have engaged an object displayed on the multi-touch display device and to track movements of the one or more input mechanisms that have engaged the displayed object in response. For example, at some time after detecting that the one or more input mechanisms initially engaged the displayed object, the multi-touch display device may detect that the positions of one or more of the input mechanisms on the multi-touch display device have changed relative to their initial positions at the time that the multi-touch display device detected that the input mechanisms initially engaged the displayed object. In response, the multi-touch display device is configured to transform the displayed object such that the points on the displayed object initially engaged by the one or more input mechanisms are relocated to the changed positions of the one or more input mechanisms on the multi-touch display device and such that spatial and other relationships between the points engaged by the one or more input mechanisms and other points within the displayed object are maintained (at least to the extent possible).

Figure 2A:
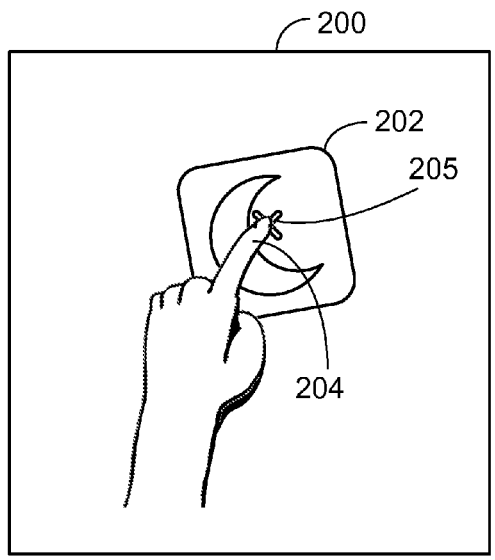
FIGS. 2A-2C are diagrams of a multi-touch display device that illustrate the multi-touch display device effecting a translation of a displayed object in response to detecting user manipulation of the displayed object with a single input mechanism.
Figure 2B:
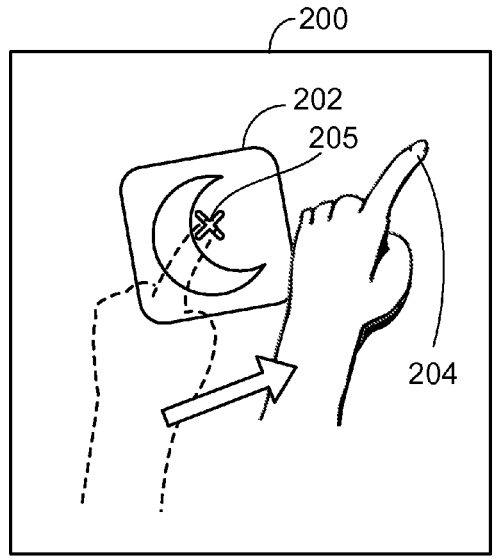
Figure 2C:
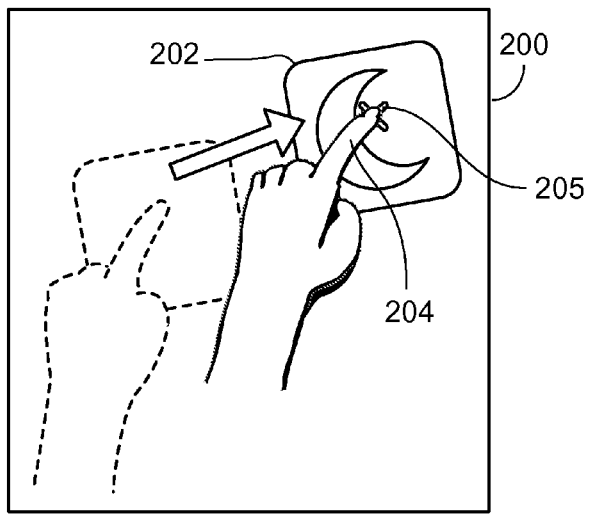

FIGS. 2A-2C are a series of figures of a multi-touch display device that illustrate the multi-touch display device effecting a translation of a displayed object in response to detecting user manipulation of the displayed object with a single input mechanism. As illustrated in FIG. 2A, a multi-touch display device 200 is displaying an object 202. In addition, a finger 204 has engaged the displayed object 202.

The multi-touch display device 200 is configured to detect that the displayed object 202 is engaged by the finger 204. For example, the multi-touch display device 200 may be a frustrated total internal reflection (FTIR) based multi-touch display device that is configured to detect that the displayed object 202 is engaged by the finger 204 by detecting that the finger 204 is making physical contact with the surface of the multi-touch display device 200 at a location where object 202 is displayed. Alternatively, the multi-touch display device 200 may not require physical contact with a surface of the multi-touch display device 200 in order to detect that displayed object 202 is engaged by the finger 204. For example, the multi-touch display device 200 may be configured to detect that that the displayed object 202 is engaged by the finger 204 by detecting that the finger is hovering in the vicinity of the displayed object 202 without actually making physical contact with the surface of the multi-touch display device 200.

In response to detecting that the displayed object 202 is engaged by the finger 204, the multi-touch display device 200 is configured to track movements of the finger 204 while the finger 204 remains engaged with the multi-touch display device 200 and to transform the displayed object 202 as a function of the movement of the finger 204.

As illustrated in FIG. 2B, at some time after initially engaging the displayed object 202, the finger 204 has moved to a new location on the multi-touch display device 200. The multi-touch display device 200 is configured to detect that the location of the finger 204 has changed and to transform the displayed object 202 in response. In particular, the multi-touch display device 200 is configured to detect the new position of the finger 204 relative to the multi-touch display device 200 and to transform the displayed object 202 such that the point 205 on the displayed object 202 initially engaged by the finger 204 is relocated to a new position on the multi-touch display device 200 that is located substantially in line with the new position of the finger 204 and such that spatial relationships between the point 205 on the displayed object 202 engaged by the finger 204 and other points within the displayed object 202 are maintained. The net result is that the multi-touch display device 200 translates the displayed object 202 as a function of the change in position of the finger 204.

FIG. 2C depicts the display of the multi-touch display device 200 after the multi-touch display device 200 has translated the displayed object 202 from its original position to its new position in response to detecting that the location of the finger 204 changed while remaining engaged with the surface of the multi-touch display device 200. In some implementations, the multi-touch display device 200 is configured to sample input and update the display (as appropriate) relatively frequently (e.g., 30-60 times per second). As a result, users of the multi-touch display device 200 may perceive that the displayed object 202 is translated continuously and in real time about a path traced along the multi-touch display device 200 by the finger 204.

A multi-touch display device also may be configured to enable multiple input mechanisms to engage a displayed object and to perform higher degree of freedom transformations of the displayed object in response to detecting movement of the multiple input mechanisms that have engaged the displayed object. For example, a multi-touch display device may be configured to enable two input mechanisms to engage a displayed object and to perform transformations of the displayed object with four degrees of freedom (e.g., translation in two dimensions, two-dimensional rotation, and uniform scaling) in response to detecting movements of the input mechanisms engaging the object.

Figure 3A:
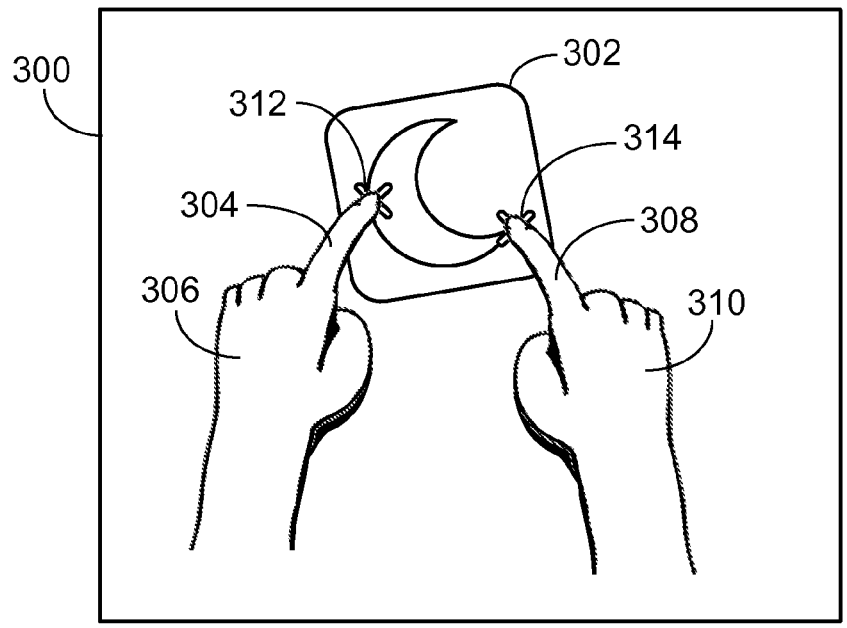
FIGS. 3A-3B are diagrams of a multi-touch display device that illustrate the multi-touch display device effecting translation, rotation, and uniform scaling of a displayed object in response to detecting user manipulation of the displayed object with two input mechanisms.
Figure 3B:
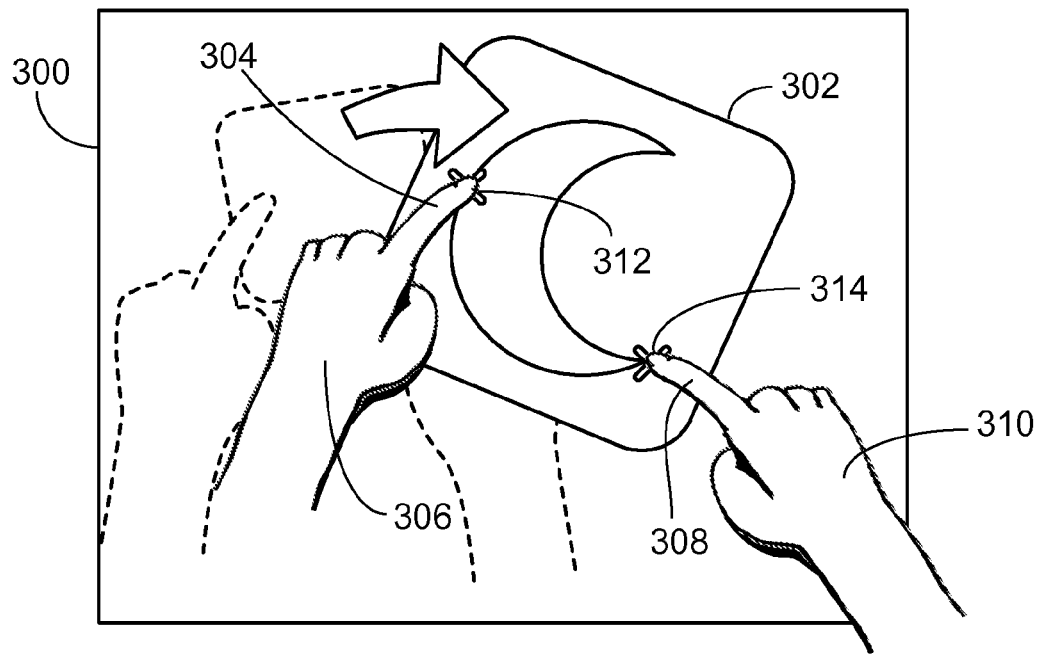

FIGS. 3A-3B are a series of figures of a multi-touch display device that illustrate the multi-touch display device effecting translation, rotation, and uniform scaling of a displayed object in response to detecting user manipulation of the displayed object with two input mechanisms.

As illustrated in FIG. 3A, a multi-touch display device 300 is displaying an object 302. In addition, an index finger 304 of a first hand 306 and an index finger 308 of a second hand 310 have engaged the displayed object 302. The multi-touch display device 300 is configured to detect that fingers 304 and 308 have engaged object 302 and to track movements of fingers 304 and 308 in response. In addition, the multi-touch display device 300 also is configured to translate, rotate, and/or uniformly scale object 302 as a function of detected movements by finger 304 and/or finger 308. Specifically, in response to detecting movements by finger 304 and/or finger 308, the multi-touch display device 300 is configured to transform object 302 such that the points 312 and 314 on object 302 initially engaged by fingers 304 and 308 are relocated to the changed positions of fingers 304 and 308 and such that spatial and other relationships between the points 312 and 314 engaged by fingers 304 and 308 and other points within object 302 are maintained.

As illustrated in FIG. 3B, the locations of the index finger 304 of the first hand 306 and the index finger 308 of the second hand 310 have changed relative to their positions illustrated in FIG. 3A. In addition, in response to detecting the changed positions of fingers 304 and 308, the multi-touch display device 300 has transformed object 302 as a function of the movement of fingers 306 and 308. Specifically, multi-touch display device 300 has transformed object 302 such that the points 312 and 314 on object 302 originally engaged by fingers 304 and 308 have been relocated to the changed positions of fingers 304 and 308 and such that spatial and other relationships between the points 312 and 314 engaged by fingers 304 and 308 and other points within object 302 have been maintained. As illustrated in FIG. 3B, the multi-touch display device 300 translated object 302 in a generally rightward direction, rotated object 302 in a clockwise fashion, and increased the size of object 302 in response to detecting the changed positions of fingers 306 and 308. Notably, the points 312 and 314 on object 302 engaged by fingers 306 and 308 in FIG. 3B are the same points 312 and 314 engaged by fingers 306 and 308 in FIG. 3A.

In some implementations, a multi-touch display device may be configured to track the movements of more than two fingers (or other input mechanisms) that have engaged a displayed object and to transform the displayed object as a function of the tracked movements of the fingers. In such implementations, when three or more fingers (or other input mechanisms) engaging a displayed object are moved concurrently, it may not be possible for the multi-touch display device to solve the transform operation exactly for all of the fingers (or other input mechanisms). Rather, the multi-touch display device may solve the transform operation such that the error between the points on the displayed object originally engaged by the fingers (or other input mechanisms) and the actual changed locations of the fingers (or other input mechanisms) is minimized (or at least within an acceptable level).

Figure 4A:
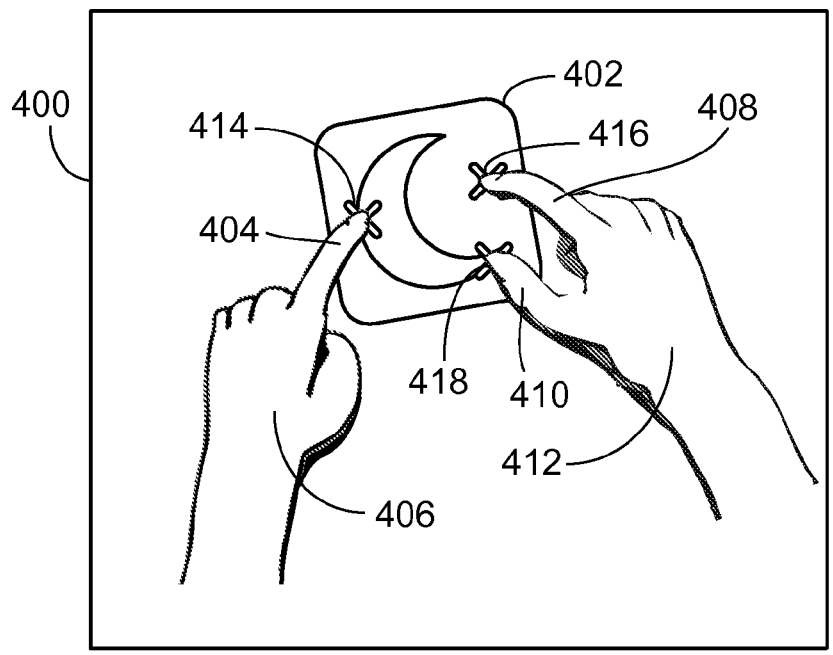
FIGS. 4A-4B are diagrams of a multi-touch display device that illustrate the multi-touch display device effecting translation, rotation, and uniform scaling of a displayed object in response to detecting user manipulation of the displayed object with three input mechanisms.
Figure 4B:
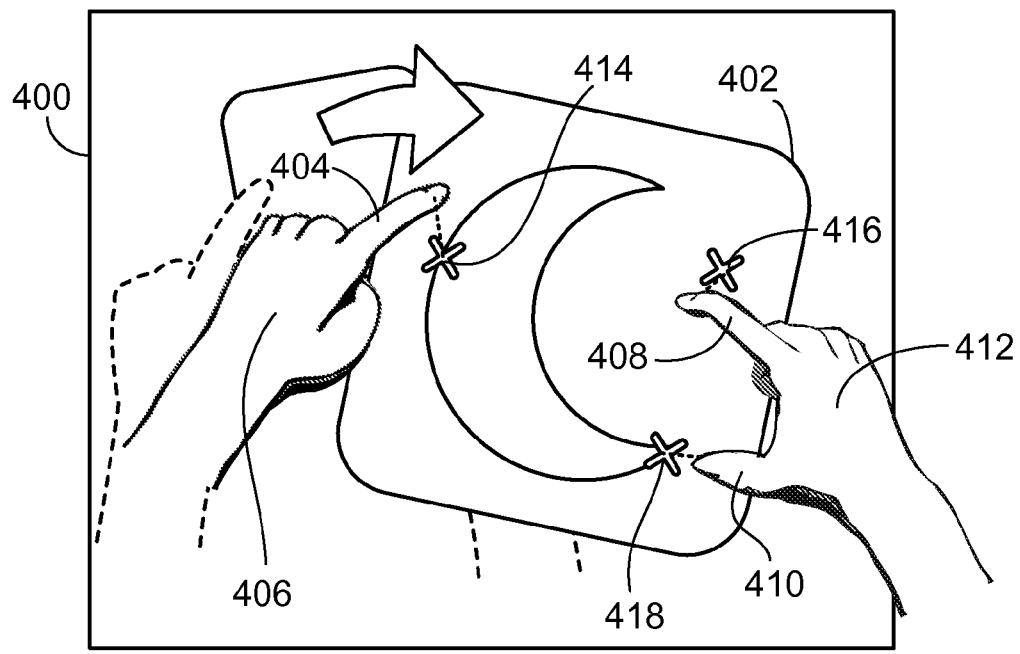

FIGS. 4A-4B are a series of figures of a multi-touch display device that illustrate the multi-touch display device effecting translation, rotation, and uniform scaling of a displayed object in response to detecting user manipulation of the displayed object with three input mechanisms.

As illustrated in FIG. 4A, a multi-touch display device 400 is displaying an object 402. In addition, an index finger 404 of a first hand 406 and an index finger 408 and a thumb 410 of a second hand 412 have engaged the displayed object 402. The multi-touch display device 400 is configured to detect that the index finger 404 of the first hand 406 and the index finger 408 and thumb 410 of the second hand 412 have engaged object 402 and to track movements of the index finger 404 of the first hand and the index finger 408 and thumb 410 of the second hand 412 in response. In addition, the multi-touch display device 400 also is configured to translate, rotate, and/or uniformly scale object 402 as a function of detected movements by the index finger 404 of the first hand 406, the index finger 408 of the second hand 412, and/or the thumb 410 of the second hand 412. Specifically, in response to detecting movements by the index finger 404 of the first hand 406, the index finger 408 of the second hand 412, and/or the thumb 410 of the second hand 412, the multi-touch display device 400 is configured to transform object 402 such that the points 414, 416, and 418 on object 402 initially engaged by the index finger 404 of the first hand 406 and the index finger 408 and thumb 410 of the second hand 412 are relocated to substantially the same positions as the changed positions of the index finger 404 of the first hand, the index finger 408 of the second hand 412, and the thumb 410 of the second hand 412 and such that spatial and other relationships between the points 414, 416, and 418 within object 402 are maintained.

As illustrated in FIG. 4B, the locations of the index finger 404 of the first hand 406 and the index finger 408 and thumb 410 of the second hand 412 have changed relative to their positions illustrated in FIG. 4A. In addition, in response to detecting the changed positions of the index finger 404 of the first hand 406 and the index finger 408 and thumb 410 of the second hand 412, the multi-touch display device 400 has transformed object 402 as a function of the movement of the index finger 404 of the first hand 406 and the index finger 408 and thumb 410 of the second hand 412.

As illustrated in FIG. 4B, the multi-touch display device 400 translated object 402 in a generally rightward direction, rotated object 402 in a clockwise fashion, and increased the size of object 402 in response to detecting the changed positions of the index finger 404 of the first hand 406 and the index finger 408 and thumb 410 of the second hand 412. Notably, the multi-touch display device 400 did not relocate the points 414, 416, and 418 on object 402 initially engaged by the index finger 404 of the first hand 406 and the index finger 408 and thumb 410 of the second hand have 412 to exactly the same positions as the changed positions of the index finger 404 of the first hand 406 and the index finger 408 and thumb 410 of the second hand 412.

In addition to being configured to display a single selectable and manipulatable object as illustrated in FIGS. 2A-2C, 3A-3B, and 4A-4B, a multi-touch display device also may be configured to display multiple selectable and manipulatable objects concurrently. When a multi-touch display device displays multiple selectable and manipulatable objects concurrently, the multi-touch display device may be configured to provide multi-touch controls for concurrently but independently manipulating multiple of the displayed objects, each with at least four degrees of freedom. For example, for each of multiple concurrently-displayed objects, the multi-touch display device may be configured to provide a multi-touch control that can be actuated by a user to perform the various manipulations illustrated in FIGS. 2A-2C, 3A-3B, and 4A-4B.

In some implementations, a multi-touch display device may not provide a full four degrees of freedom for manipulating a displayed object even when two or more input mechanisms engage the displayed object. For example, a multi-touch display device may provide the ability to translate and rotate a displayed object but not the ability to uniformly scale the displayed object when the displayed object is engaged by two or more input mechanisms. Alternatively, a multi-touch display device may provide the ability to translate a displayed object but not the ability to rotate and uniformly scale the displayed object when the displayed object is engaged by two or more input mechanisms.

FIGS. 5A-5C are a series of figures of a multi-touch display device that illustrate the multi-touch display device effecting less than four degree of freedom transformations of a displayed object in response to detecting user manipulation of the displayed object with two input mechanisms.

As illustrated in FIG. 5A, a multi-touch display device 500 is displaying an object 502. In addition, an index finger 504 of a first hand 506 and an index finger 508 of a second hand 510 have engaged the displayed object 502. The multi-touch display device 500 is configured to detect that fingers 504 and 508 have engaged object 502 and to track movements of fingers 504 and 508 in response. In addition, in some implementations, the multi-touch display device is configured to translate and rotate object 502 as a function of detected movements by finger 504 and/or finger 508. Alternatively, in other implementations, the multi-touch display device 500 is configured only to translate object 502 as a function of detected movements by finger 504 and/or finger 508.

FIG. 5B illustrates a configuration of the multi-touch display device 500 in which the multi-touch display device 500 is configured to translate and rotate object 502 as a function of detected movements by finger 504 and/or finger 508. FIG. 5C illustrates a configuration of the multi-touch display device 500 in which the multi-touch display device 500 is configured only to translate object 502 as a function of detected movements by finger 504 and/or finger 508.

Referring to FIGS. 5B and 5C, the locations of the index finger 504 of the first hand 506 and the index finger 508 of the second hand 510 have changed relative to their positions illustrated in FIG. 5A.

As illustrated in FIG. 5B, in response to detecting the changed positions of fingers 504 and 508, the multi-touch display device 500 has translated and rotated but not scaled object 502 as a function of the movement of fingers 506 and 508. Specifically, the multi-touch display device 500 translated object 502 in a generally rightward direction and rotated object 502 in a clockwise fashion. Notably, due to the fact that the multi-touch display device 500 is not configured to provide for uniform scaling of object 502 in response to detecting movements by finger 504 and/or finger 506, the multi-touch display device 500 was unable to solve the transform operation for object 502 exactly. Consequently, as illustrated in FIG. 5B, in transforming object 502, the multi-touch display device 500 was unable to relocate the points 512 and 514 on object 502 initially engaged by fingers 504 and 508 to exactly the changed positions of fingers 504 and 508.

As illustrated in FIG. 5C, in response to detecting the changed positions of fingers 504 and 508, the multi-touch display device 500 has translated but not rotated or scaled object 502 as a function of the movement of fingers 506 and 508. Specifically, the multi-touch display device 500 translated object 502 in a generally rightward direction. Notably, due to the fact that the multi-touch display device 500 is not configured to provide for rotating or uniform scaling of object 502 in response to detecting movements by finger 504 and/or finger 506, the multi-touch display device 500 was unable to solve the transform operation for object 502 exactly. Consequently, as illustrated in FIG. 5C, in transforming object 502, the multi-touch display device 500 was unable to relocate the points 512 and 514 on object 502 initially engaged by fingers 504 and 508 to exactly the changed positions of fingers 504 and 508. Rather, the multi-touch display device 500 translated object 502 as a function of an average of the changed positions of fingers 504 and 508. In some implementations, in performing the translation operation, the multi-touch device 500 may weight the influence of the two fingers differently. For example, in implementations where the multi-touch display device 500 is configured to be able to sense the amount of pressure applied to the surface of the multi-touch display device 500 by different input mechanisms, the multi-touch display device 500 may weight the influence of the fingers as a function of the pressure applied to the surface of the multi-touch display device by each finger. In such implementations, the multi-touch display device may weight the influence of a finger that applies a relatively high amount of pressure to the surface of the multi-touch display device more heavily than the multi-touch display device weights the influence of a finger that applies a relatively low amount of pressure to the surface of the multi-touch display device.

A multi-touch display device may be configured to display objects at different virtual levels relative to the background (or the foreground) of the multi-touch display device, thereby providing an element of depth to the display. For example, a multi-touch display device may be configured to support some predefined or variable number of virtual levels, each of which is defined relative to the background (or the foreground) of the multi-touch display device. In such implementations, the multi-touch display device treats objects that are displayed at virtual levels that are closer to the background (or further from the foreground) of the display as being displayed below objects that are displayed at virtual levels that are further from the background (or closer to the foreground). As a result, when the multi-touch display device displays objects such that portions of the objects overlap, the multi-touch display device may display the objects such that objects displayed at virtual levels that are further from the background (or closer to the foreground) occlude the portions of objects displayed at virtual levels that are closer to the background (or further from the foreground) that they overlap.

Figure 6:
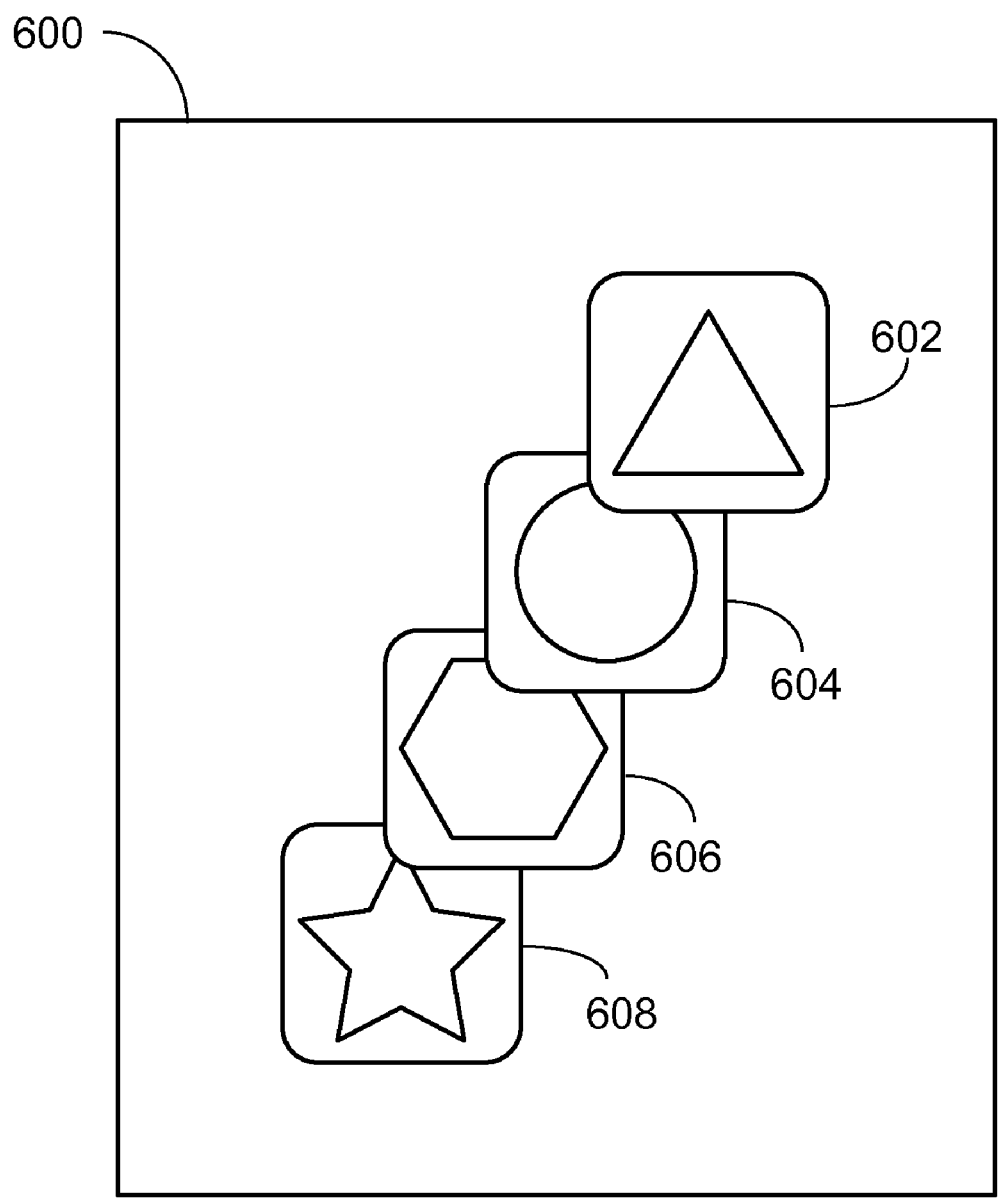
FIG. 6 is a diagram of a multi-touch display device that is configured to display objects at different virtual levels relative to the background (or the foreground) of the multi-touch display device.

FIG. 6 is a diagram of a multi-touch display device that is configured to display objects at different virtual levels relative to the background (or the foreground) of the multi-touch display device. As illustrated in FIG. 6, the multi-touch display device 600 is displaying four different objects 602, 604, 606, and 608 concurrently. In addition, the multi-touch display device 600 is displaying each of the four different displayed objects 602, 604, 606, and 608 at different levels relative to the background (or foreground) of the display.

Specifically, the multi-touch display device 600 is displaying object 602 at a virtual level that is further from the background (closer to the foreground) than the virtual levels at which the multi-touch display device 600 is displaying each of objects 604, 606, and 608. The multi-touch display device 600 is displaying object 604 at a virtual level that is closer to the background (further from the foreground) than the virtual level at which the multi-touch display device 600 is displaying object 602 but that is further from the background (closer to the foreground) than the virtual levels at which the multi-touch display device 600 is displaying each of objects 606 and 608. Similarly, the multi-touch display device 600 is displaying object 606 at a virtual level that is closer to the background (further from the foreground) than the virtual levels at which the multi-touch display device 600 is displaying each of objects 602 and 604 but that is further from the background (closer to the foreground) than the virtual level at which the multi-touch display device 600 is displaying object 608. Lastly, the multi-touch display device 600 is displaying object 608 at a virtual level that is closer to the background (further from the foreground) than the virtual levels at which the multi-touch display device 600 is displaying each of objects 602, 604, 606, and 608.

Due to the fact that the multi-touch display device 600 is displaying objects 602, 604, 606, and 608 at these different virtual levels relative to the background of the display, the multi-touch display device 600 displays object 602 such that when a portion of object 602 overlaps with any portion of object 604, object 606, and/or object 608, the overlapping portion of object 602 occludes the overlapping portion of object 604, object 606, and/or object 608. For instance, as illustrated in FIG. 6, the multi-touch display device 600 is displaying object 602 such that a portion of object 602 is overlapping with a portion of object 604. As a result, the multi-touch display device 600 displays objects 602 and 604 such that the overlapping portion of object 602 occludes the overlapping portion of object 604.

The multi-touch display device 600 also displays object 604 such that when a portion of object 604 overlaps with a portion of object 602, the overlapping portion of object 604 is occluded by the overlapping portion of object 602. Similarly, the multi-touch display device 600 displays object 604 such that when a portion of object 604 overlaps with any portion of object 606 and/or object 608, the overlapping portion of object 604 occludes the overlapping portion of object 606 and/or object 608. For instance, as illustrated in FIG. 6, the multi-touch display device 600 is displaying object 604 such that one portion of object 604 is overlapping with a portion of object 602 and another portion of object 604 is overlapping with a portion of object 606. As a result, the multi-touch display device 600 displays objects 602, 604, and 606 such that the portion of object 604 that is overlapping with a portion of object 602 is occluded by the overlapping portion of object 602 and such that the portion of object 604 that is overlapping with a portion of object 606 occludes the overlapping portion of object 606.

In addition, the multi-touch display device 600 displays object 606 such that when a portion of object 606 overlaps with any portion of object 602 and/or object 604, the overlapping portion of object 606 is occluded by the overlapping portion of object 602 and/or object 604. Similarly, the multi-touch display device 600 displays object 606 such that when a portion of object 606 overlaps with a portion of object 608, the overlapping portion of object 606 occludes the overlapping portion of object 608. For instance, as illustrated in FIG. 6, the multi-touch display device 600 is displaying object 606 such that one portion of object 606 is overlapping with a portion of object 604 and another portion of object 606 is overlapping with a portion of object 608. As a result, the multi-touch display device 600 displays objects 604, 606, and 608 such that the portion of object 606 that is overlapping with a portion of object 604 is occluded by the overlapping portion of object 604 and such that the portion of object 606 that is overlapping with a portion of object 608 occludes the overlapping portion of object 608.

Finally, the multi-touch display device 600 displays object 608 such that when a portion of object 608 overlaps with any portion of object 602, object 604, and/or object 606, the overlapping portion of object 608 is occluded by the overlapping portion of object 602, object 604, and/or object 606. For instance, as illustrated in FIG. 6, the multi-touch display device 600 is displaying object 608 such that a portion of object 608 is overlapping with a portion of object 606. As a result, the multi-touch display device 600 displays objects 606 and 608 such that the portion of object 608 that is overlapping with the portion of object 606 is occluded by the overlapping portion of object 606.

A multi-touch display device that is configured to display multiple objects concurrently and that provides multi-touch controls for manipulating multiple of the displayed objects concurrently but independently may be configured to modify the functionality of the multi-touch controls provided for two or more of the displayed objects in response to detecting that an input mechanism has engaged the surface of the multi-touch device in a location where the two or more displayed objects are overlapping. In some implementations, the multi-touch display device may modify or completely disable the multi-touch manipulation control for one or more overlapping objects while continuing to provide the full functionality of the multi-touch manipulation control for one other overlapping object (e.g., the object that is displayed at a virtual level that is further from the background (or closer to the foreground). In other implementations, the multi-touch display device may modify the functionality provided by the multi-touch manipulation controls for each of the overlapping objects. While in still other implementations, in response to detecting that an input mechanism has engaged the surface of the multi-touch device in a location where two or more objects overlap, the multi-touch display device may treat the overlapping objects as a group and provide multi-touch manipulation controls for manipulating the overlapping objects collectively as a group.

FIGS. 7A-7D are a series of figures of a multi-touch display device that illustrate the multi-touch display device activating a multi-touch control for manipulating a displayed object in response to detecting that the surface of the multi-touch display device has been engaged in a location where two or more objects overlap.

As illustrated in FIG. 7A, the multi-touch display device 700 is displaying four objects 702, 704, 706, and 708 such that portions of objects 702, 704, and 708 are overlapping. In addition, the multi-touch display device 700 also is displaying objects 702, 704, and 708 such that object 702 is displayed at a virtual level that is further from the background (closer to the foreground) than objects 704 and 706 and such that object 704 is displayed at a virtual level that is further from the background (closer to the foreground) than object 706. Consequently, the multi-touch display device 700 is displaying objects 702, 704, and 708 such that a portion of object 702 occludes the portions of objects 704 and 706 that it overlaps and such that a portion of object 704 occludes a portion of object 706 that it overlaps. Furthermore, although not necessarily apparent in FIG. 7A, the multi-touch display device 700 is displaying object 708 at a virtual level that is closer to the background (further from the foreground) than the virtual levels at which the multi-touch display device 700 is displaying each of objects 702, 704, and 708. FIG. 7A also includes a finger 710 that is poised to engage the surface of the multi-touch display device 700.

The multi-touch display device 700 is configured to detect when fingers (or other input mechanisms) have engaged the surface of the multi-touch display device 700 and to activate manipulation controls for manipulating the displayed objects 702, 704, 706, and 708 when a finger (or other input mechanism) engages the surface of the multi-touch display device 700 at a location where an object is displayed. In addition, the multi-touch display device 700 is configured such that when it detects that an input mechanism has engaged the surface of the multi-touch display device 700 at a location where portions of two or more objects overlap, the multi-touch display device activates manipulation controls only for the object that is displayed at the virtual level closest to the foreground (furthest from the background).

As illustrated in FIG. 7B, the finger 710 has engaged the surface of the multi-touch display device 700 at a location where portions of objects 702, 704, and 706 all are overlapping. In addition, in response to detecting that the finger 710 has engaged the surface of the multi-touch display device 700 at a location where portions of objects 702, 704, and 706 overlap, the multi-touch display device 700 has activated manipulation controls for object 702 but not for objects 704 and 706. This is because object 702 is displayed at a virtual level that is further from the background (closer to the foreground) than objects 704 and objects 706. In FIGS. 7B-7D, object 702 is illustrated with a highlighted border to reflect the fact that object 702 is selected and that manipulation controls for object 702 are activated. In some implementations, the multi-touch display device 700 may display such a highlighted border or some other visual cue to indicate that an object is selected and that manipulation controls for the object are activated. In other implementations, the multi-touch display device 700 may not display visual cues to indicate that an object is selected and/or that manipulation controls for the object are activated.

As a consequence of activating the manipulation controls for object 702, the multi-touch display device 700 tracks movements of the finger 710 while it remains engaged with the surface of the multi-touch display device 700 and transforms object 702 as a function of movements made by the finger 710 across the surface of the multi-touch display device 700.

For example, referring to FIG. 7C, the finger 710 has moved to a new location on the surface of the multi-touch display device 700 relative to the position of the finger 710 on the surface of the multi-touch display device 700 illustrated in FIG. 7B. In addition, in response to detecting the movement of the finger 710, the multi-touch display device 700 has translated object 702 about the multi-touch display device 700 as a function of the change in position of the finger 710. Notably, the multi-touch display device 700 has not translated objects 704 and 706 as a result of detecting the movement of finger 710 even though objects 704 and 706 also were displayed at the location where the finger 710 initially engaged the surface of the multi-touch display device 710. This is because manipulation controls were not activated for objects 704 and 706.

As illustrated in FIG. 7C, object 702 is located in a position such that a portion of object 702 is overlapping with a portion of object 708. In addition, the multi-touch display device 700 is displaying objects 702 and 708 at different virtual levels such that object 702 is being displayed at a virtual level that is further from the background (closer to the foreground) than the virtual level at which object 708 is being displayed. Despite the fact that the finger 710 is engaging the surface of the multi-touch display device 700 in a location where portions of object 702 and object 708 are overlapping, the multi-touch display device has not activated manipulation controls for object 708. This is because the multi-touch display device 700 is configured to activate manipulation controls only for the displayed object that is displayed at a virtual level that is furthest away from the background (closest to the foreground) and because object 702 is displayed at a virtual level that is further away from the background (closer to the foreground) than the virtual level at which object 708 is displayed.

Referring to FIG. 7D, the finger 710 has moved to a new location on the surface of the multi-touch display device 700 relative to the position of the finger 710 on the surface of the multi-touch display device 700 illustrated in FIG. 7C. In addition, in response to detecting the movement of the finger 710, the multi-touch display device 700 has translated object 702 about the multi-touch display device 700 as a function of the change in position of the finger 710. Notably, the multi-touch display device 700 has not translated object 708 as a result of detecting the movement of finger 710. This is because manipulation controls were not activated for object 708 even though in FIG. 7D the finger 710 engaged the surface of the multi-touch display device 700 at a location where object 708 is displayed.

In alternative implementations, instead of only selecting and activating manipulation controls for the object that is displayed at the virtual level that is closest to the foreground (furthest from the background), a multi-touch display device may be configured to select and activate manipulation controls for multiple overlapping objects in response to detecting that a finger (or other input mechanism) has engaged the surface of the multi-touch display device at a location where portions of multiple objects overlap.

FIGS. 8A-8E are a series of figures of a multi-touch display device that illustrate the multi-touch display device activating multi-touch controls for manipulating multiple displayed objects in response to detecting that the surface of the multi-touch display device has been engaged in a location where multiple objects overlap.

As illustrated in FIG. 8A, the multi-touch display device 800 is displaying four objects 802, 804, 806, and 808 such that portions of objects 802, 804, and 808 are overlapping. In addition, the multi-touch display device 800 also is displaying objects 802, 804, and 808 such that object 802 is displayed at a virtual level that is further from the background (closer to the foreground) than objects 804 and 806 and such that object 804 is displayed at a virtual level that is further from the background (closer to the foreground) than object 806. Consequently, the multi-touch display device 800 is displaying objects 802, 804, and 808 such that a portion of object 802 occludes the portions of objects 804 and 806 that it overlaps and such that a portion of object 804 occludes the portion of object 806 that it overlaps. Furthermore, although not necessarily apparent in FIG. 8A, the multi-touch display device 800 is displaying object 808 at a virtual level that is closer to the background (further from the foreground) than the virtual levels at which the multi-touch display device 800 is displaying each of objects 802, 804, and 808. FIG. 8A also includes a finger 810 that is poised to engage the surface of the multi-touch display device 800.

The multi-touch display device 800 is configured to detect when fingers (or other input mechanisms) have engaged the surface of the multi-touch display device 800 and to activate manipulation controls for manipulating the displayed objects 802, 804, 806, and 808 when a finger (or other input mechanism) engages the surface of the multi-touch display device 800 at a location where an object is displayed. In addition, the multi-touch display device 800 is configured such that when it detects that an input mechanism initially has engaged the surface of the multi-touch display device 800 at a location where portions of multiple objects overlap, the multi-touch display device 800 may select and activate manipulation controls for multiple of the overlapping objects.

For example, in some implementations, the multi-touch display device 800 may select and activate manipulation controls for each of the objects overlapping at the location where the input mechanism has engaged the surface of the multi-touch display device 800. In other implementations, the multi-touch display device 800 may select and activate manipulation controls for some but not all of the objects overlapping at the location where the input mechanism has engaged the surface of the multi-touch display device 800. For example, the multi-touch display device 800 may be configured to sense the pressure applied to the surface of the multi-touch display device 800 and to vary the depth of the virtual levels to which selection and activation of manipulation controls for displayed objects extends. That is to say, in response to sensing increased pressure being applied to the surface of the multi-touch display device 800 at a location where portions of multiple displayed objects are overlapping, the multi-touch display device 800 may increase the number of displayed objects that are selected and for which manipulation controls are activated to include objects that are displayed at virtual levels that are closer to the background (further from the foreground). In contrast, in response to sensing decreased pressure being applied to the surface of the multi-touch display device 800 at a location where portions of multiple displayed objects are overlapping, the multi-touch display device 800 may decrease the number of displayed objects that are selected and for which manipulation controls are activated to exclude objects that are displayed at virtual levels that are closer to the background (further from the foreground).

Referring to FIG. 8B, the finger 810 has engaged the surface of the multi-touch display device 810 at a location where portions of objects 802, 804, and 806 are overlapping. In addition, in response to detecting that the finger 810 has engaged the surface of the multi-touch display device 800 at a location where portions of objects 802, 804, and 806 are overlapping, the multi-touch display device 800 has selected and activated manipulation controls for each of objects 802, 804, and 806.

As a consequence of activating the manipulation controls for objects 802, 804, and 806, the multi-touch display device 800 tracks movements of the finger 810 while it remains engaged with the surface of the multi-touch display device 800 and transforms objects 802, 804, and 806 as a function of movements made by the finger 810 across the surface of the multi-touch display device 800.

As illustrated in FIG. 8C, the finger 810 has moved to a new location on the surface of the multi-touch display device 800 relative to the location of the finger 810 illustrated in FIG. 8B. In addition, in response to detecting the movement of the finger 810, the multi-touch display device 800 has translated each of objects 802, 804, and 806 as a function of the change in position of the finger 810. This is because the multi-touch display device 800 selected and activated manipulation controls for each of objects 802, 804, and 806 in response to the finger 810 engaging the surface of the multi-touch display device 800 at a location where portions of objects 802, 804, and 806 overlap.

As illustrated in FIG. 8C, objects 802, 804, and 806 are located in positions such that portions of objects 802, 804, and 806 are overlapping with a portion of object 808. Due to the fact that the multi-touch display device 800 is displaying object 808 at a virtual level that is closer to the background (further from the foreground) than the virtual levels at which the multi-touch display device 800 is displaying objects 802, 804, and 806, the portions of objects 802, 804, and 806 that are overlapping object 808 occlude the portion of object 808 that they overlap.

In some implementations, the multi-touch display device 800 is configured such that it selects and activates manipulation controls for multiple overlapping objects only when a finger (or other input mechanism) initially engages the surface of the multi-touch display device 800 at a location where portions of multiple objects overlap. In alternative implementations, the multi-touch display device 800 is configured such that it selects and activates manipulation controls for multiple overlapping objects when a finger (or other input mechanism) that already is engaged with one or more displayed objects moves to a new location on the surface of the multi-touch display device 800 where portions of multiple objects overlap.

For example, if the multi-touch display device 800 is configured to select and activate manipulation controls for multiple overlapping objects only when a finger (or other input mechanism) initially engages the surface of the multi-touch display device 800, the multi-touch display device 800 will not select and activate manipulation controls for object 808 in response to detecting that objects 802, 804, and 806 have been relocated such that finger 810 is engaged with the surface of the multi-touch display device 800 at a location where portions of objects 802, 804, 806, and 808 are overlapping, as illustrated in FIG. 8C.

Figure 8D:
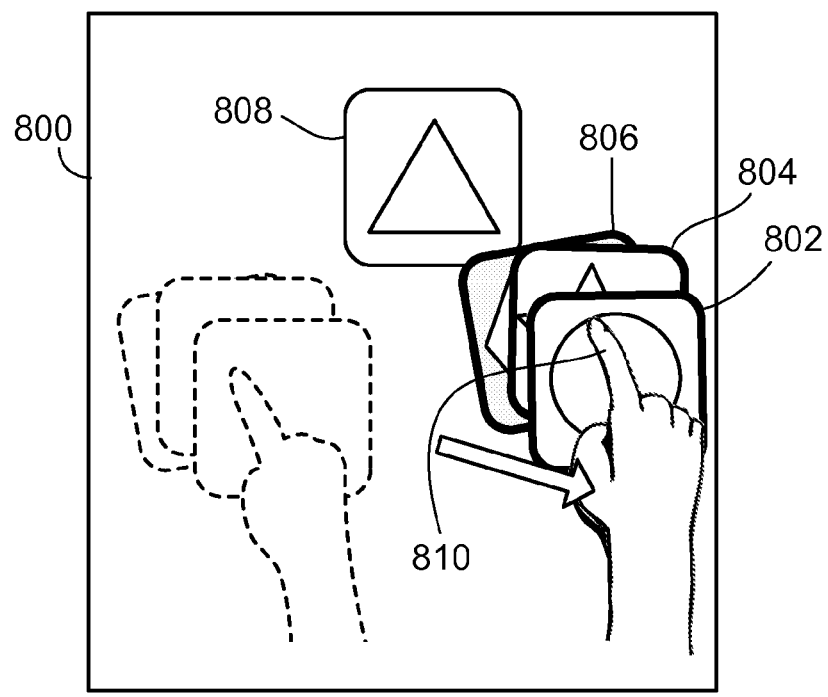

Referring to FIG. 8D, the location of the finger 810 on the surface of the multi-touch display device 800 has changed relative to the location of the finger 810 on the surface of the multi-touch display device 800 illustrated in FIG. 8C. In addition, as a consequence of detecting the change in the location of the finger 810, the multi-touch display device 800 has translated objects 802, 804, and 806 about the multi-touch display device 800 as a function of the movement of the finger 810. Notably, the multi-touch display device 800 has not translated object 808 in response to detecting the change in location of finger 810 on the surface of the multi-touch display device 800. This is due to the fact that the multi-touch display device 800 did not select and activate manipulation controls for object 808 even after detecting that objects 802, 804, and 806 had been relocated and detecting that finger 810 was engaged with the surface of the multi-touch display device 800 at a location where portions of objects 802, 804, 806, and 808 all were overlapping because the multi-touch display device 800 is configured such that it selects and activates manipulation controls for multiple overlapping objects only when and where a finger (or other input mechanism) initially engages the surface of the multi-touch display device 800.

Alternatively, if the multi-touch display device 800 is configured such that it selects and activates manipulation controls for multiple overlapping objects when a finger (or other input mechanism) that already is engaged with one or more displayed objects moves to a new location on the surface of the multi-touch display device 800 where portions of multiple objects overlap, the multi-touch display device 800 may select and activate manipulation controls for object 808 in response to detecting that objects 802, 804, and 806 have been relocated such that the finger 810 is engaged with the surface of the multi-touch display device 800 at a location where portions of objects 802, 804, 806, and 808 are overlapping, as illustrated in FIG. 8C.

Figure 8E:
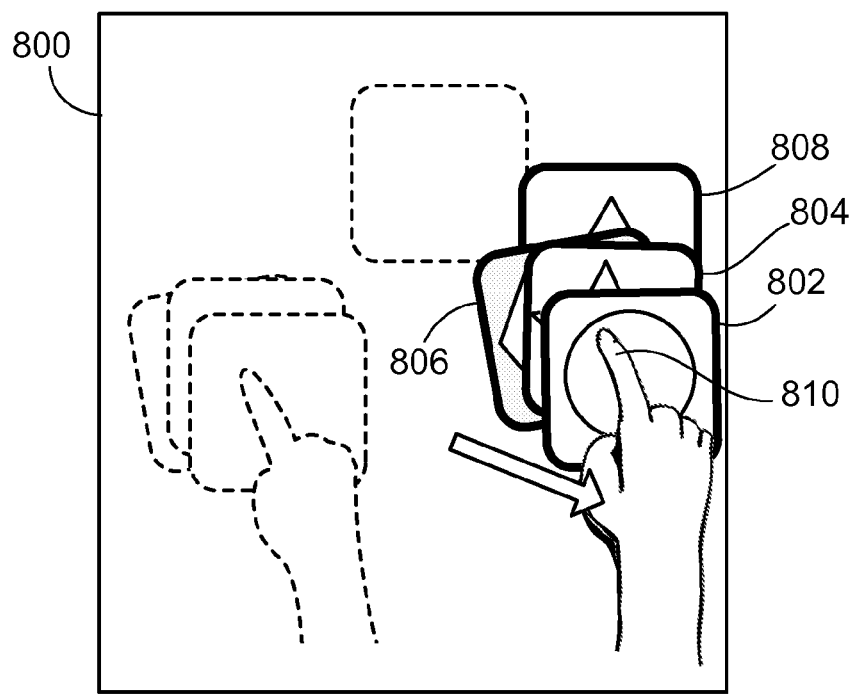

Referring to FIG. 8E, the location of the finger 810 on the surface of the multi-touch display device 800 has changed relative to the location of the finger 810 on the surface of the multi-touch display device 800 illustrated in FIG. 8C. In addition, as a consequence of detecting the change in the location of the finger 810, the multi-touch display device 800 has translated objects 802, 804, 806, and 808 about the multi-touch display device 800 as a function of the movement of the finger 810. This is due to the fact that the multi-touch display device 800 selected and activated manipulation controls for object 808 upon detecting that the position of finger 810 intersected with object 808 regardless of its level.

A multi-touch display device may be configured to enable selection and manipulation of a displayed object by only one input mechanism at a time. In some such implementations, when the multi-touch display device detects that a displayed object is engaged concurrently by two or more input mechanisms, the multi-touch display device may employ a rule that grants control of the displayed object to the first of the input mechanisms to have engaged the displayed object. In other such implementations, the multi-touch display device may employ a rule that grants control of a displayed object to the input mechanism that most recently engaged the displayed object when the multi-touch display device detects that the displayed object is engaged concurrently by two or more input mechanisms. Alternatively, in implementations where the multi-touch display device is configured to be able to sense the pressure applied by input mechanisms engaging the surface of the multi-touch display device, the multi-touch display device may employ a rule that grants control of a displayed object to the input mechanism that is engaging the displayed object with the greatest pressure when the multi-touch display device detects that the displayed object is engaged concurrently by two or more input mechanisms.

FIGS. 9A-9D are a series of figures of a multi-touch display device that is configured to enable selection and manipulation of a displayed object by only one input mechanism at any given time that illustrate the multi-touch display device employing different rules in response to detecting that multiple input mechanisms are engaging displayed objects concurrently.

Figure 9A:
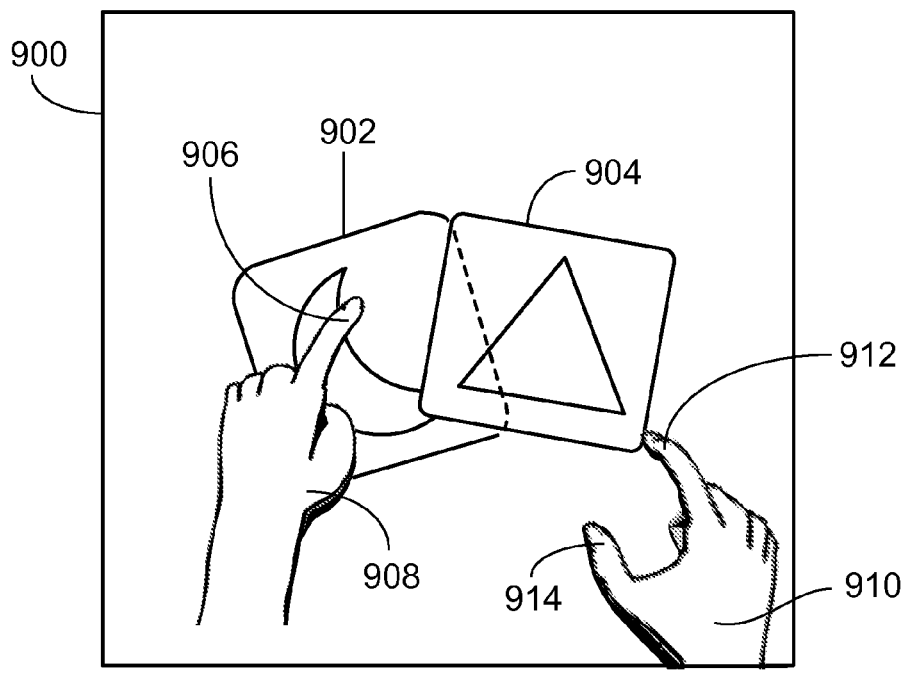
FIGS. 9A-9D are diagrams of a multi-touch display device that is configured to enable selection and manipulation of a displayed object by only one input mechanism at any given time that illustrate the multi-touch display device employing different rules in response to detecting that multiple input mechanisms are engaging displayed objects concurrently.

As illustrated in FIG. 9A, the multi-touch display device 900 is displaying two objects 902 and 904. In addition, the index finger 906 of a first hand 908 has engaged the surface of the multi-touch display device 900 in a location where object 902 is displayed. In response to detecting that the index finger 906 has engaged the surface of the multi-touch display device 900 in a location where object 902 is displayed, the multi-touch display device 900 has selected and activated manipulation controls for object 902. In addition, FIG. 9A also illustrates a second hand 910 having an index finger 912 and thumb 914 that are poised to engage the surface of the multi-touch display device 900.

Although not necessarily apparent from FIG. 9A, in response to selecting and activating manipulation controls for object 902, the multi-touch display device 900 will track the movement of the index finger 906 of the first hand 908 while it remains engaged with the surface of the multi-touch display device 900 and will manipulate object 902 as a function of tracked movements of the index finger 906 of the first hand 908 about the surface of the multi-touch display device 900.

Figure 9B:
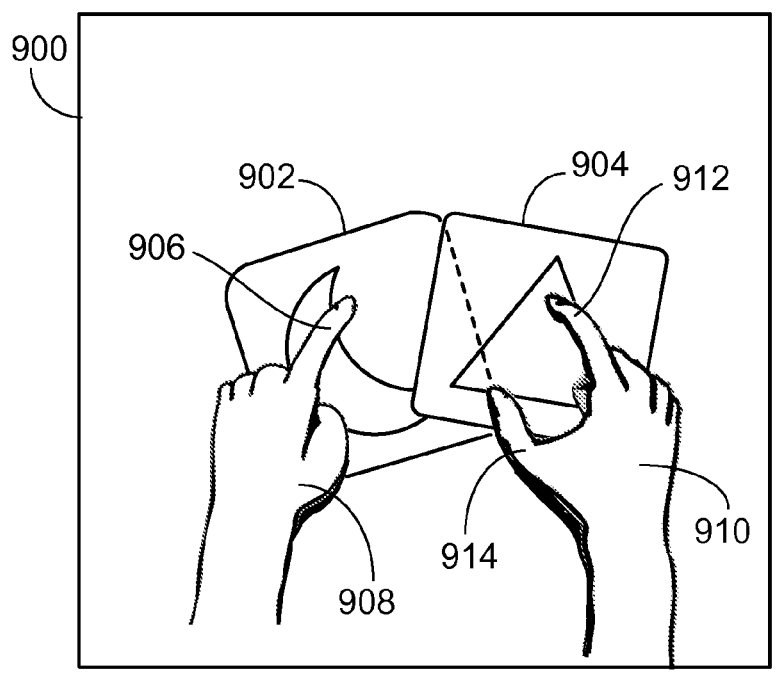

Referring to FIG. 9B, the index finger 912 and thumb 914 of the second hand 910 have engaged the surface of the multi-touch display device 900 while the index finger 906 of the first hand 908 has remained engaged with the surface of the multi-touch display device 900 in the same location as illustrated in FIG. 9A. As illustrated in FIG. 9B, the index finger 912 of the first hand 910 has engaged the surface of the multi-touch display device 900 in a location where object 904 is displayed but not where portions of object 902 and 904 are overlapping. In contrast, the thumb 914 of the second hand 910 has engaged the surface of the multi-touch display device 900 in a location where portions of objects 902 and 904 are overlapping. Although not apparent from FIG. 9B, the index finger 912 of the second hand 910 engaged the surface of the multi-touch display device 900 after the thumb 914 of the second hand 910 engaged the surface of the multi-touch display device 900.

As a result of the index finger 912 and thumb 914 of the second hand 910 engaging the surface of the multi-touch display device, two contact points have been established on each of objects 902 and 904. Specifically, the index finger 906 of the first hand 908 and the thumb 914 of the second hand 910 have established contact points on object 902, and the index finger 912 and the thumb 914 of the second hand 910 have established contact points on object 904. Due to the fact that the multi-touch display device 900 is configured to enable selection and manipulation of a displayed object by only one input mechanism at any given time, the multi-touch display device 900 may employ different rules for how to respond to detecting that multiple input mechanisms are engaging a displayed object concurrently. In one implementation, the multi-touch display device 900 may grant control of a displayed object to the first input mechanism to engage the displayed object. In an alternative implementation, the multi-touch display device 900 may grant control of a displayed object to the input mechanism that most recently engaged the displayed object.

Figure 9C:
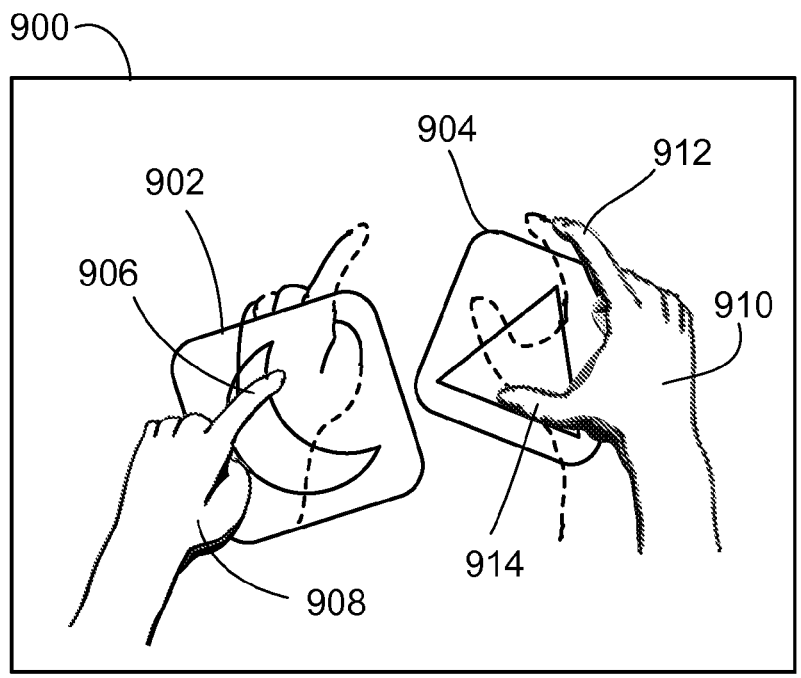

FIG. 9C illustrates how the multi-touch display device 900 handles the fact that the index finger 906 of the first hand 908 and the thumb 914 of the second hand 910 are engaged concurrently with object 902 and the index finger 912 and the thumb 914 of the second hand 910 are engaged concurrently with object 904 when the multi-touch display device 900 employs a rule that the first input mechanism to engage the displayed object is granted control of the displayed object. As illustrated in FIG. 9C, the locations of the index finger 906 of the first hand 908, the index finger 912 of the second hand 910, and the thumb 914 of the second hand 914 on the surface of the multi-touch display device 900 all have changed relative to their positions illustrated in FIG. 9B.

Due to the fact that the index finger 906 of the first hand 908 engaged object 902 before the thumb 914 of the second hand 910, the multi-touch display device 900 granted control of object 902 to the index finger 906 of the first hand 908, not the thumb 914 of the second hand 910. Consequently, in response to detecting the change in the locations of the index finger 906 of the first hand 908, the index finger 912 of the second hand 910, and the thumb 914 of the second hand 910 on the surface of the multi-touch display device 900, the multi-touch display device 900 translated object 902 as a function of the movement of the index finger 906 of the first hand 908 and not the thumb 914 of the second hand 910.

Similarly, due to the fact that the thumb 914 of the second hand 910 engaged object 904 before the index finger 912 of the second hand 910, the multi-touch display device 900 granted control of object 904 to the thumb 914 of the second hand 910, not the index finger 912 of the second hand 910. Consequently, in response to detecting the change in the locations of the index finger 906 of the first hand 908, the index finger 912 of the second hand 910, and the thumb 914 of the second hand 910 on the surface of the multi-touch display device 900, the multi-touch display device 900 translated object 904 as a function of the movement of the thumb 914 of the second hand 908 and not the index finger 912 of the second hand 910.

Figure 9D:
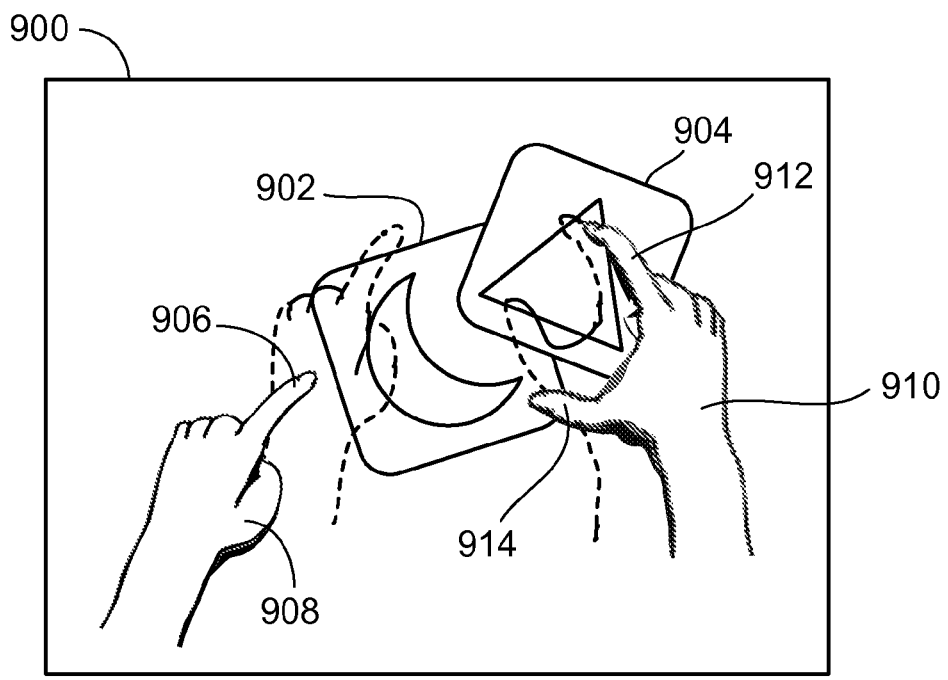

FIG. 9D illustrates how the multi-touch display device 900 handles the fact that the index finger 906 of the first hand 908 and the thumb 914 of the second hand 910 are engaged concurrently with object 902 and the index finger 912 and the thumb 914 of the second hand 910 are engaged concurrently with object 904 when the multi-touch display device 900 employs a rule that the most recent input mechanism to engage a displayed object is granted control of the displayed object. As illustrated in FIG. 9D, the locations of the index finger 906 of the first hand 908, the index finger 912 of the second hand 910, and the thumb 914 of the second hand 910 on the surface of the multi-touch display device 900 all have changed relative to their positions illustrated in FIG. 9B.

Due to the fact that the thumb 914 of the second hand 910 engaged object 902 more recently than the index finger 906 of the first hand 908, the multi-touch display device 900 granted control of object 902 to the thumb 914 of the second hand 910, not the index finger 906 of the first hand 908. Consequently, in response to detecting the change in the locations of the index finger 906 of the first hand 908, the index finger 912 of the second hand 910, and the thumb 914 of the second hand 910 on the surface of the multi-touch display device 900, the multi-touch display device 900 translated object 902 as a function of the movement of the thumb 914 of the second hand 910, not the index finger 906 of the first hand 908.

Similarly, due to the fact that the index finger 912 of the second hand 910 engaged object 904 more recently than the thumb 914 of the second hand 910, the multi-touch display device 900 granted control of object 904 to the index finger 912 of the second hand 910, not the thumb 914 of the second hand 910. Consequently, in response to detecting the change in the locations of the index finger 906 of the first hand 908, the index finger 912 of the second hand 910, and the thumb 914 of the second hand 910 on the surface of the multi-touch display device 900, the multi-touch display device 900 translated object 904 as a function of the movement of the index finger 912 of the second hand 908, not the thumb 914 of the second hand 910.

In some implementations, the multi-touch display device 900 may be configured to employ additional or alternative rules for granting control to input mechanisms when multiple input mechanisms are determined to be concurrently engaging a displayed object. In particular, in some implementations, the multi-touch display device 900 may grant an input mechanism determined to be engaging a displayed object control over the displayed object only for some predefined period of time after the input mechanism initially engages the displayed object. For example, the multi-touch display device 900 may grant the input mechanism control over the displayed object for only 30 seconds from the time at which the input mechanism was determined to originally engage the displayed object. After 30 seconds have elapsed, the multi-touch display device 900 may relinquish control over the displayed object from the input mechanism, even if the input mechanism continues to engage the displayed object. In order to regain control of the displayed object, the input mechanism may have to disengage and then reengage the displayed object.

Additionally or alternatively, the multi-touch display device 900 may limit control over the displayed object by one input mechanism to some pre-defined period of time when one or more additional input mechanisms are determined to also subsequently begin to engage the displayed object. For example, when the multi-touch display device 900 detects that a second input mechanism has newly engaged a displayed object that previously only was being engaged by a first input mechanism, the multi-touch display device 900 may continue to grant the first input mechanism control over the displayed object, but the amount of time for which the first input mechanism is allowed to retain control over the first object may be limited to some predefined period of time in the event that the second input mechanism continues to engage the displayed object throughout or after the predefined period of time. As such, if the predefined period of time elapses and both the first and second input mechanisms continue to engage the displayed object, the multi-touch display device 900 may relinquish control of the displayed object from the first input mechanism and thereafter grant control over the displayed object to the second input mechanism.

In other implementations, when the multi-touch display device 900 detects that multiple input mechanisms are engaging a displayed object concurrently, the multi-touch display device 900 may grant control to more than one but not all of the input mechanisms determined to be engaging the displayed object. For example, when the multi-touch display device 900 detects that multiple input mechanisms are engaging an object concurrently, the multi-touch display device 900 may sense the pressure with which each of the input mechanisms is engaging the displayed object and grant control over the displayed object to those input mechanisms determined to be engaging the displayed object with equal to or more than a predefined threshold amount of pressure but not to those input mechanisms that are engaging the displayed object with less than the predefined threshold amount of pressure. Additionally or alternatively, when the multi-touch display device 900 detects that multiple input mechanisms are engaging a displayed object concurrently, the multi-touch display device 900 may determine that two or more of the input mechanisms engaging the displayed object initially engaged the displayed object within a predefined period of time (e.g., one second) of one another and grant control to the two or more input mechanisms that initially engaged the displayed object within the predefined period of time of one another, but not those input mechanisms engaging the displayed object that initially engaged the displayed object outside of the predefined period of time within which the other input mechanisms initially engaged the displayed object. In other situations, when the multi-touch display device 900 detects that multiple input mechanisms are engaging a displayed object concurrently, the multi-touch display device may grant control over the displayed object to a predefined number of the first input mechanisms to engage the displayed object, but not to those input mechanisms that later engaged the displayed object. For example, the multi-touch display device 900 may grant control to the first two input mechanisms detected to have engaged a displayed object but not to input mechanisms that later were detected to have engaged the displayed object after the first two input mechanisms. Alternatively, the multi-touch display device 900 may grant control to a predefined number of the most recent input mechanisms to engage the displayed object, but not to other input mechanisms that previously engaged the displayed object. For example, the multi-touch display device 900 may grant control to the two input mechanisms detected to have engaged the displayed object most recently, but not to input mechanisms detected to have previously engaged the displayed object.

In still other implementations, the multi-touch display device 900 may treat input mechanisms that initially engage a displayed object at similar points in both time and position as a single input. That is to say, if multiple input mechanisms initially engage a displayed object within a predefined distance from each other (e.g., within the visible boundaries of the displayed object or within some predefined radius of one another) and/or within a predefined time period of each other, the multi-touch display device 900 may treat the multiple input mechanisms as one collective input mechanism. For example, if a user places all five fingers of one of the user's hands on a displayed object at substantially the same time (e.g., within a second of one another), the multi-touch display device 900 may treat all five fingers of the user's hand as a single input mechanism. In such implementations, the multi-touch display device 900 may calculate the centroid of the input mechanisms determined to have engaged the displayed object within a predefined distance and a predefined time period of each other, and translate the displayed object about the multi-touch display device 900 as a function of any changes in the position of the centroid as a consequence of movements by one or more of the input mechanisms.

A multi-touch display device that is configured to display multiple objects concurrently and that provides multi-touch controls for manipulating multiple of the displayed objects with at least four degrees of freedom concurrently but independently may employ different rules for manipulating displayed objects when the multi-touch display device detects that an input mechanism is engaging the surface of the multi-touch display device in a location where two or more displayed objects are overlapping. For example, in some implementations, when a multi-touch display device detects that an input mechanism is engaging the surface of the multi-touch display device in a location where two or more displayed objects are overlapping, the multi-touch display device may treat the point engaged by the input mechanism as exerting independent control over both of the displayed objects. Alternatively, in other implementations, a multi-touch display device may be configured such that, in response to detecting that an input mechanism is engaging the surface of a multi-touch display device in a location where two or more displayed objects are overlapping, the multi-touch display device groups the two or more displayed objects together and treats all points on any of the two or more displayed objects that are engaged by input mechanisms as exerting collective control over the two or more displayed objects as a group.

FIGS. 10A-10F are a series of figures of a multi-touch display device that provides multi-touch controls for concurrently but independently manipulating two displayed objects that illustrate different rules for manipulating displayed objects employed by the multi-touch display device when the multi-touch display device detects that an input mechanism is engaging the surface of the multi-touch display device in a location where two or more displayed objects are overlapping.

Figure 10A:
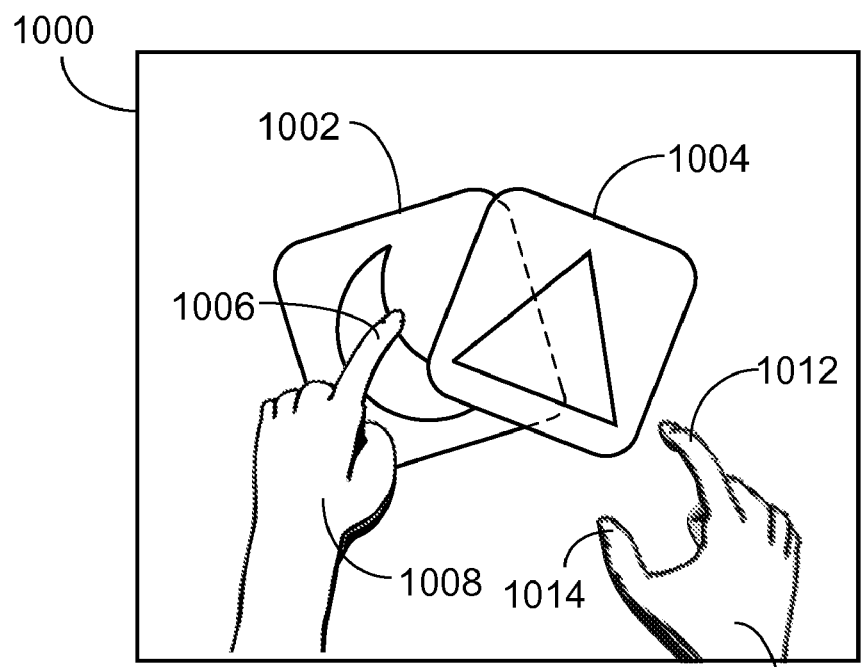
FIGS. 10A-10F are diagrams of a multi-touch display device that provides multi-touch controls for concurrently but independently manipulating two displayed objects that illustrate different rules for manipulating displayed objects employed by the multi-touch display device when the multi-touch display device detects that an input mechanism is engaging the surface of the multi-touch display device in a location where two or more displayed objects are overlapping.

As illustrated in FIG. 10A, the multi-touch display device 1000 is displaying two objects 1002 and 1004. In addition, the index finger 1006 of a first hand 1008 has engaged the surface of the multi-touch display device 1000 in a location where object 1002 is displayed. In response to detecting that the index finger 1006 has engaged the surface of the multi-touch display device 1000 in a location where object 1002 is displayed, the multi-touch display device 1000 has selected and activated a multi-point manipulation control for object 1002. In addition, FIG. 10A also illustrates a second hand 1010 having an index finger 1012 and thumb 1014 that are poised to engage the surface of the multi-touch display device 1000.

Although not necessarily apparent from FIG. 10A, the multi-point manipulation control activated by the multi-touch display device 1000 for object 1002 tracks the movement of input mechanisms engaging object 1002 and, in response to detecting movements by one or more of the input mechanisms engaging object 1002, transforms (e.g., translates in two dimensions, rotates, and/or uniformly scales) object 1002 such that the points on object 1002 that are engaged by the one or more input mechanisms are relocated to the changed positions (or at least within the general vicinity of the changed positions) of the one or more input mechanisms on the surface of the multi-touch display device 1000 and such that spatial and other relationships between the points engaged by the one or more input mechanisms and other points within the displayed object are maintained.

Figure 10B:
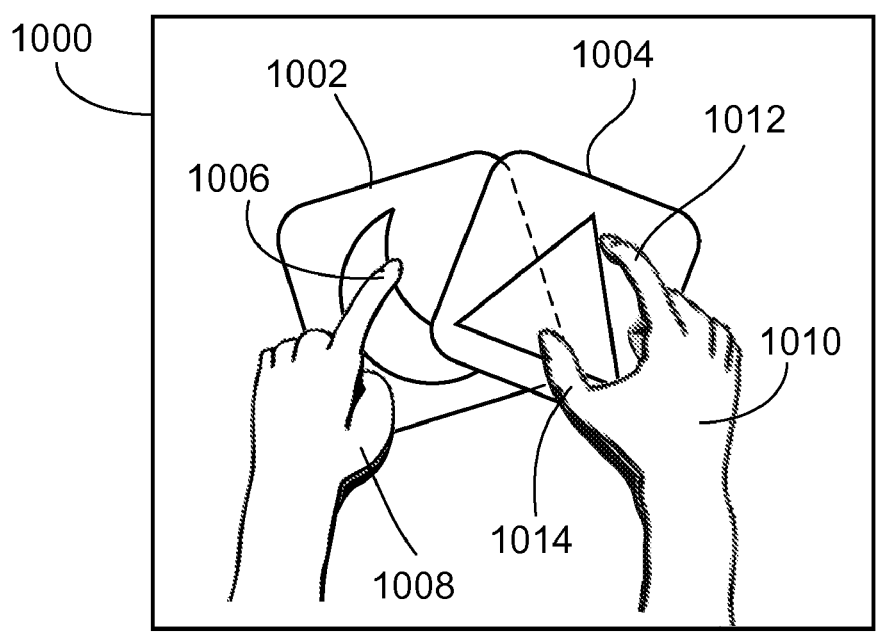

Referring to FIG. 10B, the index finger 1012 and thumb 1014 of the second hand 1010 have engaged the surface of the multi-touch display device 1000 while the index finger 1006 of the first hand 1008 has remained engaged with the surface of the multi-touch display device 1006 in the same location as illustrated in FIG. 10A. As illustrated in FIG. 10B, the index finger 1012 of the second hand 1010 has engaged the surface of the multi-touch display device 1000 in a location where object 1004 is displayed but not where portions of object 1002 and 1004 are overlapping. In contrast, the thumb 1014 of the second hand 1010 has engaged the surface of the multi-touch display device 1000 in a location where portions of objects 1002 and 1004 are overlapping.

The multi-touch display device 1000 may be configured to employ different rules for manipulating displayed objects when the multi-touch display device 1000 detects that an input mechanism is engaging the surface of the multi-touch display device 1000 in a location where two or more displayed objects are overlapping. For example, in some implementations, the multi-touch display device 1000 may treat the point engaged by the input mechanism at the location where the displayed objects are overlapping as exerting independent control over each of the displayed objects. Alternatively, in other implementations, in response to detecting that an input mechanism is engaging the surface of a multi-touch display device 1000 in a location where two or more displayed objects are overlapping, the multi-touch display device 1000 may group the displayed objects together and treat all points on any of the displayed objects that are engaged by input mechanisms as exerting collective control over the displayed objects as a group.

Figure 10C:
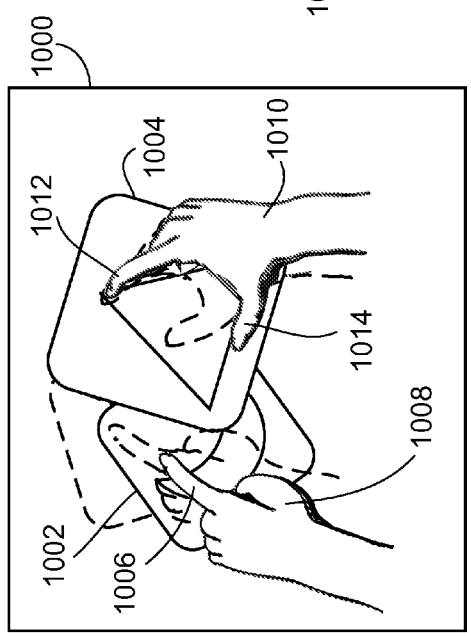
Figure 10D:
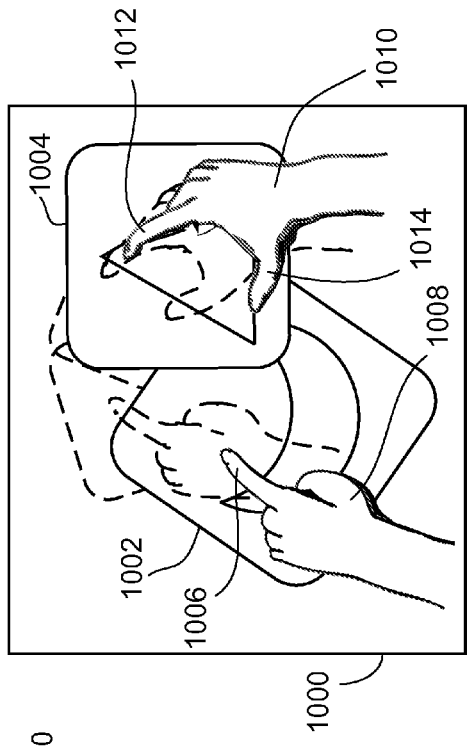

FIGS. 10C-10D illustrate the multi-touch display device's 1000 treatment of the point engaged by the thumb 1014 of the second hand 1010 when the multi-touch display device 1000 employs a rule that a point that is engaged by an input mechanism at a location where two or more displayed objects are overlapping exerts independent control over each of the displayed objects.

Referring to FIG. 10C, the locations of the index finger 1006 of the first hand 1008, the index finger 1012 of the second hand 1014, and the thumb of the second hand 1014 on the surface of the multi-touch display device 1000 all have changed relative to their positions illustrated in FIG. 10B. In addition, in response to detecting the change in position of the index finger 1006 of the first hand 1008 and the thumb 1014 of the second hand 1010, the multi-touch display device 1000 transformed object 1002 such that the points on object 1002 that initially had been engaged by the index finger 1006 of the first hand 1008 and the thumb 1014 of the second hand 1010 have been relocated to the changed positions of the index finger 1006 of the first hand 1008 and the thumb 1014 of the second hand 1010 such that spatial and other relationships between the points engaged by the index finger 1006 of the first hand 1008 and the thumb 1014 of the second hand 1010 and other points within the displayed object are maintained. Similarly, in response to detecting the change in position of the index finger 1012 and thumb 1014 of the second hand 1010, the multi-touch display device 1000 transformed object 1004 such that the points on object 1004 that initially had been engaged by the index finger 1012 and thumb 1014 of the second hand 1010 have been relocated to the changed positions of the index finger 1012 and thumb 1014 of the second hand 1010 such that spatial and other relationships between the points engaged by the index finger 1012 and thumb 1014 of the second hand 1010 and other points within the displayed object are maintained.

Notably, irrespective of the fact that the thumb 1014 of the second hand 1010 engaged both object 1002 and 1004, the multi-touch display device 1000 transformed object 1002 as a function of the changed positions of the index finger 1006 of the first hand 1008 and the thumb 1014 of the second hand 1010 independently of the transformation the multi-touch display device 1000 performed on object 1004, which the multi-touch display device 1000 performed as a function of the changed positions of the index finger 1012 and thumb 1014 of the second hand 1010. This is because the multi-touch display device 1000 is configured to treat the point engaged by the thumb 1014 of the second hand 1010 as exerting independent control over objects 1002 and 1004.

Referring to FIG. 10D, the locations of the index finger 1006 of the first hand 1008, the index finger 1012 of the second hand 1010, and the thumb 1014 of the second hand 1010 on the surface of the multi-touch display device 1000 all have changed again relative to their positions illustrated in FIG. 10C. Due to the fact that the multi-touch display device 1000 treats the point engaged by the thumb 1014 of the second hand 1010 as exerting independent control over objects 1002 and 1004, the multi-touch display device 1000 transformed object 1002 as a function of the changed positions of the index finger 1006 of the first hand 1008 while independently transforming object 1004 as a function of the changed positions of the index finger 1012 and thumb 1014 of the second hand 1010.

Figure 10E:
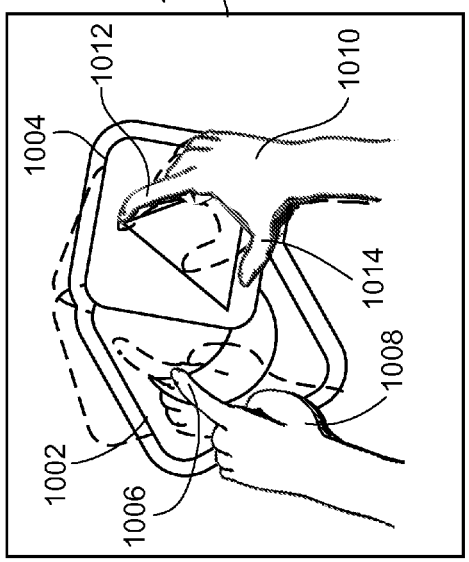
Figure 10F:
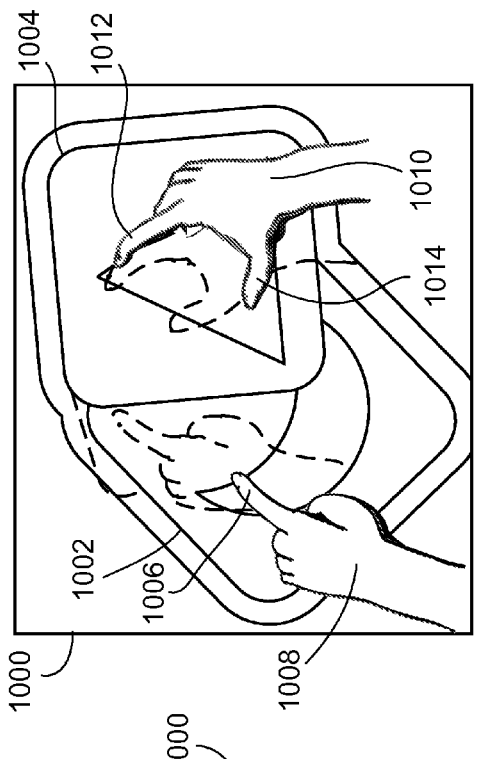

FIGS. 10E-10F illustrate the multi-touch display device's 1000 treatment of objects 1002 and 1004 when the multi-touch display device 1000 employs a rule that, in response to detecting that an input mechanism is engaging the surface of a multi-touch display device 1000 in a location where two or more displayed objects are overlapping, the displayed objects are grouped together and all points on any of the displayed objects that are engaged by input mechanisms are treated as exerting collective control over the displayed objects as a group.

Referring to FIG. 10E, in response to detecting that the thumb 1014 of the second hand 1010 has engaged the surface of the multi-touch display device 1000 in a location where objects 1002 and 1004 are overlapping, the multi-touch display device 1000 has grouped objects 1002 and 1004 together and will treat the points on objects 1002 and 1004 engaged by the index finger 1006 of the first hand 1008, the index finger 1012 of the second hand 1010, and the thumb 1014 of the second hand 1010 as exerting control over objects 1002 and 1004 collectively as a group. As illustrated in FIG. 10E a border has been drawn around objects 1002 and 1004 to indicate that the multi-touch display device 1000 is treating objects 1002 and 1004 as a group. In some implementations, the multi-touch display device 1000 may draw a border or provide some other visual cue to reflect that the multi-touch display device 1000 is treating objects 1002 and 1004 as a group. In other implementations, the multi-touch display device 1000 may not provide any visual cue that the multi-touch display device 1000 is treating objects 1002 and 1004 as a group.

As illustrated in FIG. 10E, the locations of the index finger 1006 of the first hand 1008, the index finger 1012 of the second hand 1010, and the thumb 1014 of the second hand 1010 on the surface of the multi-touch display device 1000 all have changed relative to their positions illustrated in FIG. 10B. In addition, in response to detecting the changes in the positions of the index finger 1006 of the first hand 1008, the index finger 1012 of the second hand 1010, and the thumb 1014 of the second hand 1010, the multi-touch display device 1000 transformed objects 1002 and 1004 collectively as a group as a function of the changed positions of the index finger 1006 of the first hand 1008, the index finger 1012 of the second hand 1010, and the thumb 1014 of the second hand 1010. Notably, the movement of the index finger 1012 of the second hand 1014 influenced the transformation of object 1002 irrespective of the fact that the index finger 1012 of the second hand 1010 never engaged object 1002. Similarly, the movement of the index finger 1006 of the first hand 1008 influenced the transformation of object 1004 irrespective of the fact that the index finger 1006 of the first hand 1008 never engaged object 1004.

As illustrated in FIG. 10F, the locations of the index finger 1006 of the first hand 1008, the index finger 1012 of the second hand 1010, and the thumb of the second hand 1014 on the surface of the multi-touch display device 1000 all have changed relative to their positions illustrated in FIG. 10E. In addition, in response to detecting the changes in the positions of the index finger 1006 of the first hand 1008, the index finger 1012 of the second hand 1010, and the thumb 1014 of the second hand 1010, the multi-touch display device 1000 transformed objects 1002 and 1004 collectively as a group as function of the changed positions of the index finger 1006 of the first hand 1008, the index finger 1012 of the second hand 1010, and the thumb of the second hand 1014. Notably, the movement of the index finger 1012 of the second hand 1014 again influenced the transformation of object 1002 irrespective of the fact that the index finger 1012 of the second hand 1010 never engaged object 1002. Similarly, the movement of the index finger 1006 of the first hand 1008 again influenced the transformation of object 1004 irrespective of the fact that the index finger 1006 of the first hand 1008 never engaged object 1004.

A multi-touch display device that is configured to display multiple objects concurrently and that provides multi-touch controls for manipulating multiple of the displayed objects with at least four degrees of freedom concurrently but independently may be configured to reduce the degrees of freedom provided by the manipulation controls for the displayed objects in response to detecting that a finger (or other input mechanism) has engaged the surface of the multi-touch device in a location where the two displayed objects are overlapping.

In one example, a multi-touch display device provides a manipulation control for a first object for translating the first object in two dimensions, rotating the first object, and/or uniformly scaling the first object. In addition, the multi-touch display device also provides a manipulation control for a second object for manipulating the second object concurrently with but independently of manipulations performed on the first object including translating the second object in two dimensions, rotating the second object, and/or uniformly scaling the second object. In this example, when the first and second objects are displayed concurrently on the multi-touch display device such that portions of the first and second objects are overlapping, the multi-touch display device may disable the ability of the manipulation controls to uniformly scale the first and second objects in response to detecting that a finger (or other input mechanism) has engaged the surface of the multi-touch display device in a location where portions of the first and second object are overlapping. Additionally or alternatively, the multi-touch display device may disable the ability of the manipulation controls to rotate the first and second objects in response to detecting that a finger (or other input mechanism) has engaged the surface of the multi-touch display device in a location where portions of the first and second object are overlapping. Similarly, the multi-touch display device may disable the ability of the manipulation controls to translate the first and second objects while preserving the ability of the manipulation controls to uniformly scale and/or rotate the first and second objects in response to detecting that a finger (or other input mechanism) has engaged the surface of the multi-touch display device in a location where portions of the first and second object are overlapping. Or, as an alternative to completely disabling the ability of the manipulation controls to translate the first and second objects in such situations, the multi-touch display device may limit the ability of the manipulation controls to translate the first and second objects to translation in one or more predefined directions. For example, the multi-touch display device may limit the ability of the manipulation controls to translate the first and second objects to horizontal and/or vertical translation only.

FIGS. 11A-11F are a series of figures of a multi-touch display device that provides multi-touch controls for concurrently but independently manipulating two displayed objects that illustrate the multi-touch display device reducing the number of degrees of freedom provided by the manipulation controls for the two displayed objects in response to detecting that an input mechanism has engaged the surface of the multi-touch display device in a location where portions of the two objects are overlapping.

Figure 11A:
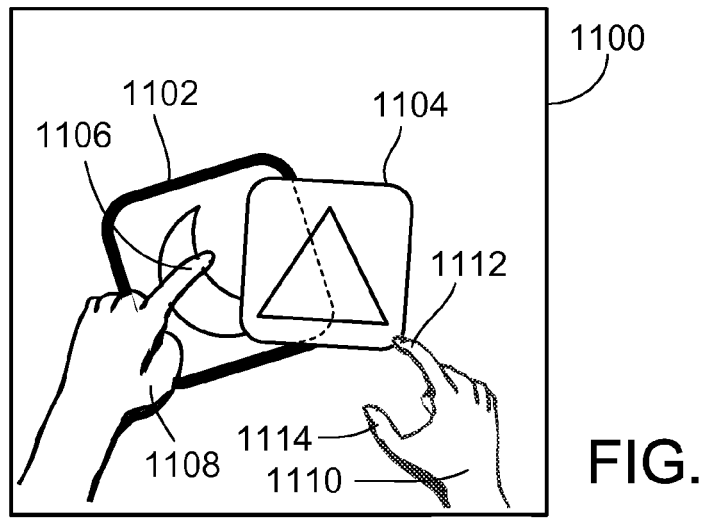
FIGS. 11A-11F are diagrams of a multi-touch display device that provides multi-touch controls for concurrently but independently manipulating two displayed objects that illustrate the multi-touch display device reducing the number of degrees of freedom provided by the manipulation controls for the two displayed objects in response to detecting that an input mechanism has engaged the surface of the multi-touch display device in a location where portions of the two objects are overlapping.

As illustrated in FIG. 11A, the multi-touch display device 1100 is displaying two objects 1102 and 1104. In addition, the index finger 1106 of a first hand 1108 has engaged the surface of the multi-touch display device 1100 in a location where object 1102 is displayed. In response to detecting that the index finger 1106 has engaged the surface of the multi-touch display device 1100 in a location where object 1102 is displayed, the multi-touch display device 1100 has selected and activated a multi-point manipulation control for object 1102. In addition, FIG. 11A also illustrates a second hand 1110 having an index finger 1112 and thumb 1114 that are poised to engage the surface of the multi-touch display device 1100.

Although not necessarily apparent from FIG. 11A, the multi-point manipulation control activated by the multi-touch display device 1100 for object 1102 tracks the movement of input mechanisms engaging object 1102 and, in response to detecting movements by one or more input mechanisms engaging object 1102, transforms (e.g., translates in two dimensions, rotates, and/or uniformly scales) object 1102 such that the points on object 1102 that are engaged by the one or more input mechanisms are relocated to the changed positions (or at least within the general vicinity of the changed positions) of the one or more input mechanisms on the surface of the multi-touch display device 1100 and such that spatial and other relationships between the points engaged by the one or more input mechanisms and other points within object 1102 are maintained.

Figure 11B:
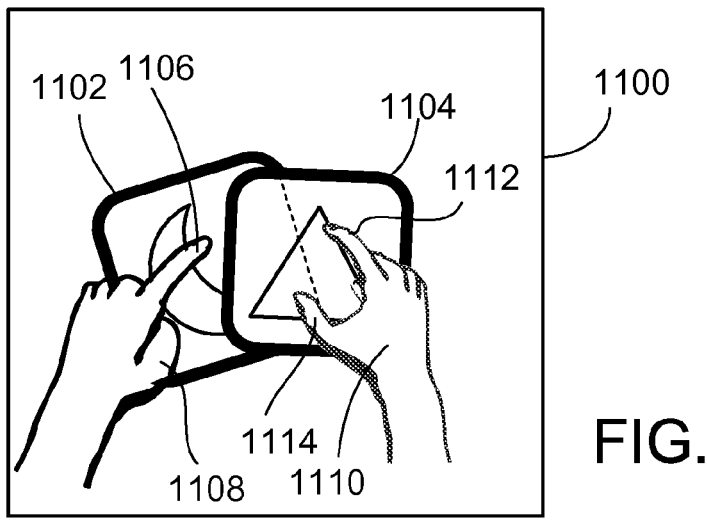

Referring to FIG. 11B, the index finger 1112 and thumb 1114 of the second hand 1110 have engaged the surface of the multi-touch display device 1100 while the index finger 1106 of the first hand 1108 has remained engaged with the surface of the multi-touch display device 1100 in the same location as illustrated in FIG. 11A. As illustrated in FIG. 11B, the index finger 1112 of the second hand 1110 has engaged the surface of the multi-touch display device 1100 in a location where object 1104 is displayed but not where portions of object 1102 and 1104 are overlapping. In contrast, the thumb 1114 of the second hand 1110 has engaged the surface of the multi-touch display device 1100 in a location where portions of objects 1102 and 1104 are overlapping.

Although not necessarily apparent from FIG. 11B, the multi-touch display device 1100 has selected and activated multi-touch manipulation controls for object 1104 in response to detecting that the index finger 1112 and thumb 1114 of the second hand 1110 have engaged the surface of the multi-touch display device 1100 in locations where object 1104 is displayed. Specifically, as a consequence of detecting that the index finger 1112 and thumb 1114 of the second hand 1110 have engaged the surface of the multi-touch display device 1100 in locations where object 1104 is displayed, the multi-touch display device 1100 will track movements of the index finger 1112 and thumb 1114 of the second hand 1110 and will manipulate object 1104 as a function of movements made by the index finger 1112 and thumb 1114 of the second hand 1110.

In addition, and also not necessarily apparent from FIG. 11B, in response to detecting that the thumb 1114 of the second hand 1110 has engaged the surface of the multi-touch display device 1100 in a location where object 1102 is displayed and detecting that the index finger 1106 of the first hand 1108 has remained engaged with object 1102, the multi-touch display device 1100 will track movements of the index finger 1106 of the first hand 1108 and the thumb 1114 of the second hand 1110 and will manipulate object 1102 as a function of movements made by the index finger 1106 of the first hand 1108 and the thumb 1114 of the second hand J10.

Furthermore, and also not necessarily apparent from FIG. 11B, the multi-touch display device 1100 has reduced the number of degrees of freedom for manipulating objects 1102 and 1104 provided by the activated manipulation controls for objects 1102 and 1104 in response to detecting that the thumb 1114 of the second hand 1110 has engaged the surface of the multi-touch display device 1100 in a location where portions of objects 1102 and 1104 overlap.

In some implementations, the multi-touch display device 1100 may disable the ability of the manipulation controls for objects 1102 and 1104 to uniformly scale objects 1102 and 1104 in response to determining that a finger (or other input mechanism) has engaged the surface of the multi-touch display device 1100 in a location where portions of objects 1102 and 1104 overlap. Additionally or alternatively, the multi-touch display device 1100 may disable the ability of the manipulation controls for objects 1102 and 1104 to rotate objects 1102 and 1104 in response to determining that a finger (or other input mechanism) has engaged the surface of the multi-touch display device 1100 in a location where portions of objects 1102 and 1104 overlap.

Figure 11C:
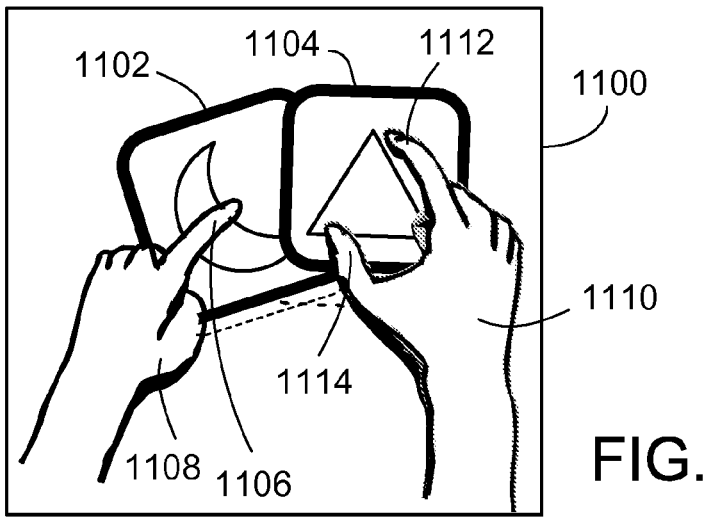
Figure 11D:
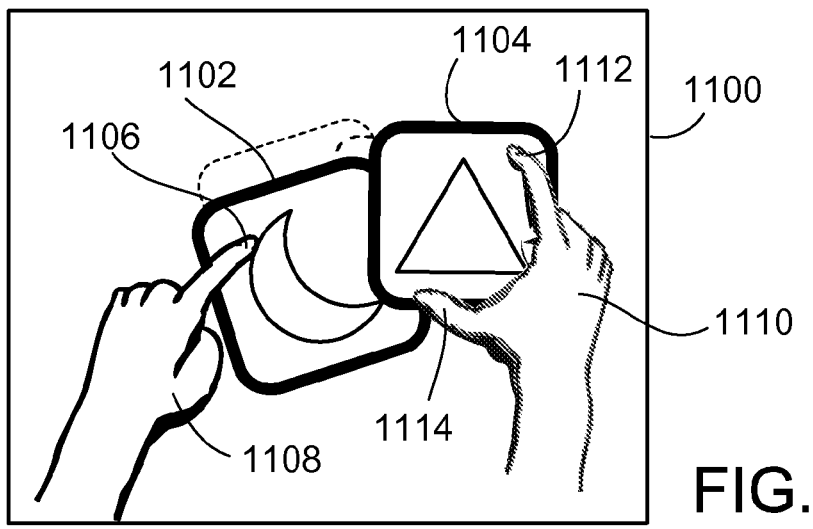

FIGS. 11C-11D are diagrams of the multi-touch display device 1100 that illustrate operation of the multi-touch display device 1100 when the multi-touch display device 1100 is configured to disable the rotating and scaling of objects 1102 and 1104 in response to determining that the thumb 1114 has engaged the surface of the multi-touch display device 1100 in a location where portions of objects 1102 and 1104 overlap. Stated differently, FIGS. 11C-11D are diagrams of the multi-touch display device 1100 that illustrate operation of the multi-touch display device 1100 when the multi-touch display device 1100 is configured to restrict the manipulation controls for objects 1102 and 1104 to providing only translation of objects 1102 and 1104 in response to determining that the thumb 1114 has engaged the surface of the multi-touch display device 1100 in a location where portions of objects 1102 and 1104 overlap. In such a configuration, the manipulation controls for objects 1102 and 1104 provided by the multi-touch display device 1100 translate objects 1102 and 1104, respectively, as a function of an average (e.g., a weighted average) of the change in positions of the fingers that have engaged the objects 1102 and 1104.

Referring to FIG. 11C, the locations of the index finger 1106 of the first hand 1108, the index finger 1112 of the second hand 1110, and the thumb 1114 of the second hand 1110 on the surface of the multi-touch display device 1100 all have changed relative to their positions illustrated in FIG. 11B.

If the multi-point manipulation control for object 1102 was enabled to provide manipulation of object 1102 with a full four degrees of freedom, the multi-touch display device 1100 would have transformed object 1102 such that the points on object 1102 that initially had been engaged by the index finger 1106 of the first hand 1108 and the thumb 1114 of the second hand 1110 would be relocated to the changed positions of the index finger 1106 of the first hand 1108 and the thumb 1114 of the second hand 1110 such that spatial and other relationships between the points engaged by the index finger 1106 of the first hand 1108 and the thumb 1114 of the second hand 1110 and other points within the displayed object are maintained. Specifically, in response to detecting the changes in position of the index finger 1106 of the first hand 1108 and the thumb 1114 of the second hand 1110, the multi-touch display device 1100 would have manipulated object 1102 just like multi-touch display device 1000 manipulated object 1002 in FIG. 10C. However, the multi-touch display device 1100 has limited the manipulation control for object 1102 to translating object 1102 as a function of the movement of input mechanisms engaging object 1102. Consequently, the multi-touch display device 1100 merely translated object 1102, as a function of a weighted average of the movement of the index finger 1106 of the first hand 1108 and the thumb 1114 of the second hand 1110, in response to detecting the change in positions of the index finger 1106 of the first hand 1108 and the thumb 1114 of the second hand 1110.

Similarly, if the multi-point manipulation control for object 1104 was enabled to provide manipulation of object 1104 with a full four degrees of freedom, the multi-touch display device 1100 would have transformed object 1104 such that the points on object 1104 that initially had been engaged by the index finger 1112 and thumb 1114 of the second hand 1110 would be relocated to the changed positions of the index finger 1112 and thumb 1114 of the second hand 1110 such that spatial and other relationships between the points engaged by the index finger 1112 and thumb 1114 of the second hand 1110 and other points within the displayed object are maintained. Specifically, in response to detecting the changes in position of the index finger 1112 and thumb 1114 of the second hand 1110, the multi-touch display device would have manipulated object 1104 just like multi-touch display device 1000 manipulated object 1004 in FIG. 10C. However, the multi-touch display device 1100 has limited the manipulation control for object 1104 to translating object 1104 as a function of the movement of input mechanisms engaging object 1104. Consequently, the multi-touch display device 1100 merely translated object 1104, as a function of a weighted average of the movement of the index finger 1112 and thumb 1114 of the second hand 1110, in response to detecting the change in positions of the index finger 1112 and thumb 1114 of the second hand 1110.

Referring to FIG. 11D, the locations of the index finger 1106 of the first hand 1108, the index finger 1112 of the second hand 1110, and the thumb 1114 of the second hand 1110 on the surface of the multi-touch display device 1100 all have changed again relative to their positions illustrated in FIG. 11C. Due to the fact that the multi-touch display device 1100 has limited the manipulation control for object 1102 to translating object 1102 as a function of the movement of input mechanisms engaging object 1102, the multi-touch display device 1100 translated object 1102 but did not rotate or scale object 1102 in response to detecting the change in positions of the index finger 1106 of the first hand 1108 and the thumb 1114 of the second hand 1110. Similarly, due to the fact that the multi-touch display device 1100 has limited the manipulation control for object 1104 to translating object 1104 as a function of the movement of input mechanisms engaging object 1104, the multi-touch display device 1100 translated object 1104 but did not rotate or scale object 1104 in response to detecting the change in positions of the index finger 1112 and thumb 1114 of the second hand 1110.

Figure 11E:
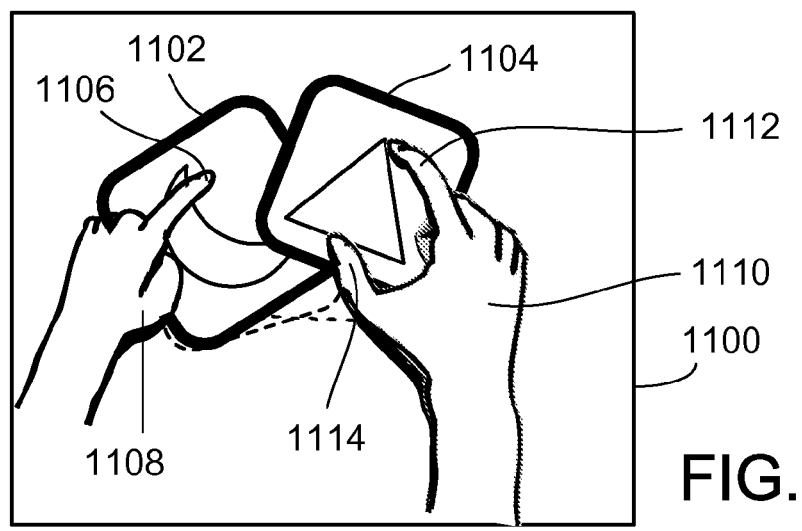
Figure 11F:
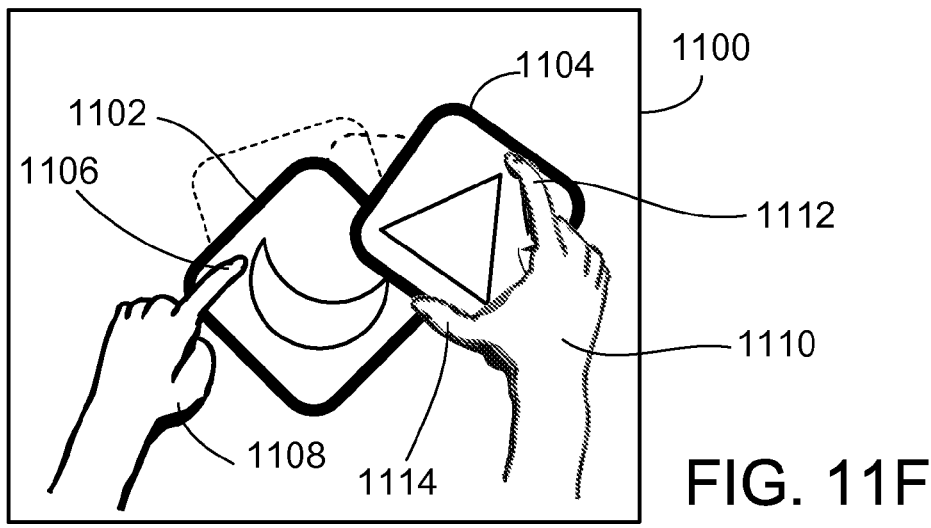

FIGS. 11E-11F are diagrams of the multi-touch display device 1100 that illustrate operation of the multi-touch display device 1100 when the multi-touch display device 1100 is configured to disable the scaling of objects 1102 and 1104 but not the rotation of objects 1102 and 1104 in response to determining that the thumb 1114 has engaged the surface of the multi-touch display device 1100 in a location where portions of objects 1102 and 1104 overlap. Stated differently, FIGS. 11E-11F are diagrams of the multi-touch display device 1100 that illustrate operation of the multi-touch display device 1100 when the multi-touch display device 1100 is configured to restrict the manipulation controls for objects 1102 and 1104 to providing only translation and rotation of objects 1102 and 1104 in response to determining that the thumb 1114 of the second hand 1110 has engaged the surface of the multi-touch display device 1100 in a location where portions of objects 1102 and 1104 overlap.

Referring to FIG. 11E, the locations of the index finger 1106 of the first hand 1108, the index finger 1112 of the second hand 1110, and the thumb 1114 of the second hand 1110 on the surface of the multi-touch display device 1100 all have changed relative to their positions illustrated in FIG. 11B. Due to the fact that the multi-touch display device 1100 has limited the manipulation control for object 1102 to translating and rotating object 1102 as a function of the movement of input mechanisms engaging object 1102, the multi-touch display device 1100 translated and rotated object 1102 but did not scale object 1102 in response to detecting the change in positions of the index finger 1106 of the first hand 1108 and the thumb 1114 of the second hand 1110. Similarly, due to the fact that the multi-touch display device 1100 has limited the manipulation control for object 1104 to translating and rotating object 1104 as a function of the movement of input mechanisms engaging object 1104, the multi-touch display device 1100 translated object 1104 but did not scale object 1104 in response to detecting the change in positions of the index finger 1112 and thumb 1114 of the second hand 1110.

Referring to FIG. 11F, the locations of the index finger 1106 of the first hand 1108, the index finger 1112 of the second hand 1110, and the thumb 1114 of the second hand 1110 on the surface of the multi-touch display device 1100 all have changed again relative to their positions illustrated in FIG. 11E. Due to the fact that the multi-touch display device 1100 has limited the manipulation control for object 1102 to translating and rotating object 1102 as a function of the movement of input mechanisms engaging object 1102, the multi-touch display device 1100 translated and rotated object 1102 but did not scale object 1102 in response to detecting the change in positions of the index finger 1106 of the first hand 1108 and the thumb 1114 of the second hand 1110. Similarly, due to the fact that the multi-touch display device 1100 has limited the manipulation control for object 1104 to translating and rotating object 1104 as a function of the movement of input mechanisms engaging object 1104, the multi-touch display device 1100 translated object 1104 but did not scale object 1104 in response to detecting the change in positions of the index finger 1112 and thumb 1114 of the second hand 1110.

As discussed above, a multi-touch display device may be configured to enable a user to interact with the multi-touch display device by engaging the surface of the multi-touch display device with an input mechanism. Furthermore, in response to detecting that an input mechanism has engaged the surface of the multi-touch display device, the multi-touch display device may define a region of influence about the location where the input mechanism engages the surface of the multi-touch display device. In some implementations, the region of influence may be a circle with a pre-defined, fixed radius (e.g., a radius that is on the order of the average radius of an adult finger) or a variable radius. Alternatively, the region of influence may be some other common geometric shape with fixed or variable dimensions or the region of influence may be of some irregular or freeform shape.

After an input mechanism has engaged the surface of the multi-touch display device and the multi-touch display device has defined a region of influence about the input mechanism, the multi-touch display device may enable a user to move the region of influence about the multi-touch display device by moving the input mechanism around the surface of the multi-touch display device. Specifically, the multi-touch display device tracks movements of the input mechanism about the surface of the multi-touch display device and relocates the region of influence in accordance with the tracked movements of the input mechanism. In addition, the multi-touch display device may enable a user to select and manipulate a displayed object by positioning the region of influence defined about an input mechanism in a location that engages the displayed object. In particular, in response to detecting that the region of influence defined about an input mechanism engages a displayed object, the multi-touch display device may select the displayed object and/or enable the user to control the displayed object.

In some implementations, the multi-touch display device may be configured to vary the size (e.g., area) of the region of influence defined about an input mechanism in response to user manipulation. For example, a multi-touch display device that is configured to sense the pressure applied to the surface of the multi-touch display device by an input mechanism may define the size of the region of influence about the input mechanism as a function of the pressure applied to the surface of the multi-touch display device by the input mechanism—the greater the pressure applied to the surface of the multi-touch display device, the greater the size of the region of influence.

Figure 12A:
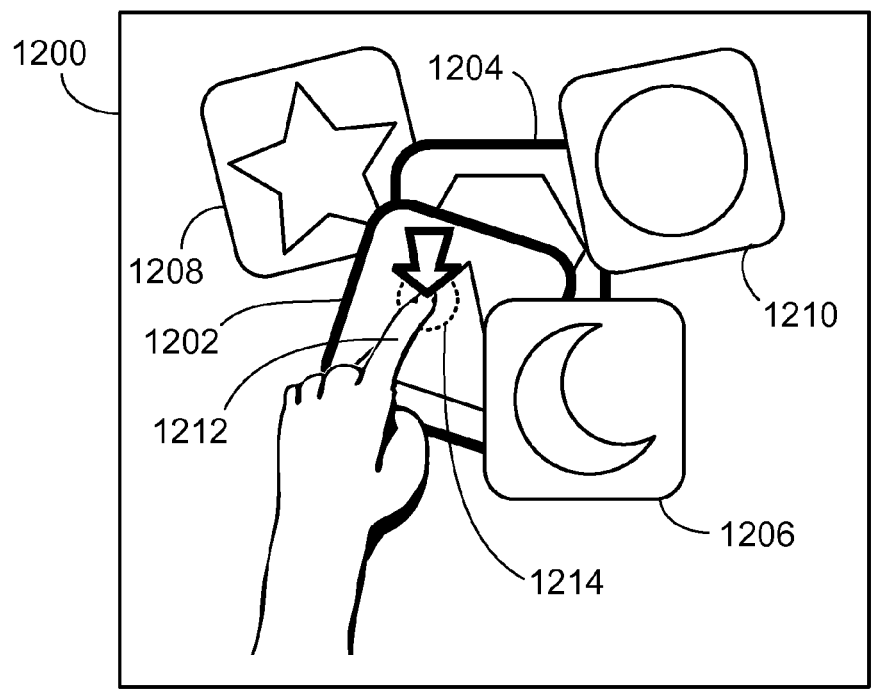
FIGS. 12A-12B are diagrams of a multi-touch display device that illustrate the multi-touch display device varying the size of the region of influence defined about a finger that is engaging the surface of the multi-touch display device as a function of the pressure applied to the multi-touch display device by the finger.
Figure 12B:
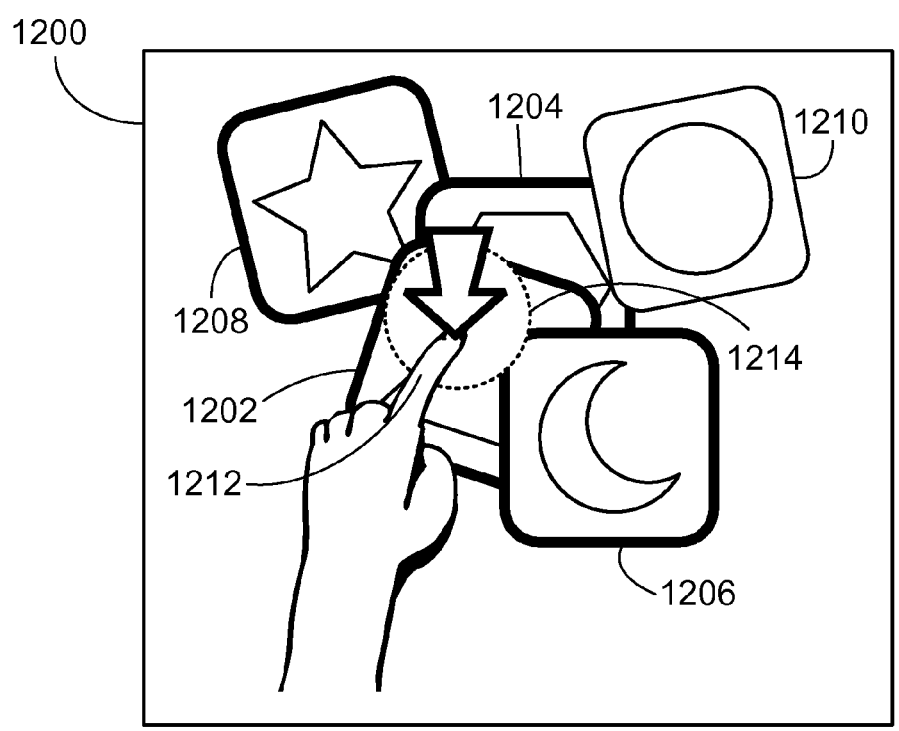

FIGS. 12A-12B are a series of figures of a multi-touch display device that illustrate the multi-touch display device varying the size of the region of influence defined about a finger that is engaging the surface of the multi-touch display device as a function of the pressure applied to the multi-touch display device by the finger.

Referring to FIG. 12A, the multi-touch display device 1200 is displaying five objects 1202, 1204, 1206, 1208, and 1210. In addition, a finger 1212 has engaged the surface of the multi-touch display device 1200 by applying some amount of pressure to the surface of the multi-touch display device 1200. In response to detecting that the finger 1212 has engaged the surface of the multi-touch display device 1200, the multi-touch display device 1200 has defined a region of influence 1214 about the finger 1212. Furthermore, the multi-touch display device 1200 has sensed the amount of pressure applied by the finger 1212 to the surface of the multi-touch display device 1200 and defined the size of the region of influence 1214 as a function of the sensed amount of pressure applied by the finger to the surface of the multi-touch display device 1200.

As illustrated in FIG. 12A, the region of influence 1214 is positioned at a location on the multi-touch display device 1200 where objects 1202 and 1204 are located. Consequently, in response to detecting that the region of influence 1214 is positioned at a location on the multi-touch display device 1200 where objects 1202 and 1204 are located, the multi-touch display device 1200 has selected objects 1202 and 1204. In order to reflect that objects 1202 and 1204 have been selected, the borders of objects 1202 and 1204 are highlighted in FIG. 12A.

Referring to FIG. 12B, the finger 1212 remains engaged with the surface of the multi-touch display device 1200, but the finger 1212 is applying greater pressure to the surface of the multi-touch display device 1200 than in FIG. 12A. In addition, in response to sensing that the finger 1212 is applying an increased amount of pressure to the surface of the multi-touch display device 1200, the multi-touch display device 1200 has increased the area of the region of influence 1214 as a function of the pressure applied by the finger 1212 to the surface of the multi-touch display device 1200. Consequently, the region of influence 1214 engages not only objects 1202 and 1204, but also objects 1206 and 1208. In response to detecting that the region of influence 1214 now engages objects 1206 and 1208, the multi-touch display device 1200 has selected objects 1206 and 1208 in addition to objects 1202 and 1204. In order to reflect that objects 1202, 1204, 1206, and 1208 have been selected, the borders of objects 1202, 1204, 1206, and 1208 are highlighted in FIG. 12B.

After a multi-touch display device has selected one or more displayed objects in response to detecting that the region of influence defined about an input mechanism has engaged the one or more displayed objects, the multi-touch display device may track movements by the input mechanism and manipulate the selected objects in accordance with the tracked movements of the input mechanism about which the region of influence is defined. For example, as the input mechanism traces a path about the surface of the multi-touch display device, the multi-touch display device may track the movement of the input mechanism about the surface of the multi-touch display device and translate the selected objects in accordance with the path traced by the input mechanism. In addition, as the input mechanism traverses the surface of the multi-touch display device, the multi-touch display device may repeatedly relocate the region of influence defined about the input mechanism such that the region of influence tracks the movement of the input mechanism, thereby enabling selection and manipulation of additional displayed objects as the input mechanism moves across the surface of the multi-touch display device. This functionality provided by the multi-touch display device may enable a user to cluster and thereafter effectively sweep multiple displayed objects around the multi-touch display device by tracing a path across the surface of the multi-touch display device much like a broom sweeps dirt and dust particles across the floor.

Figure 13A:
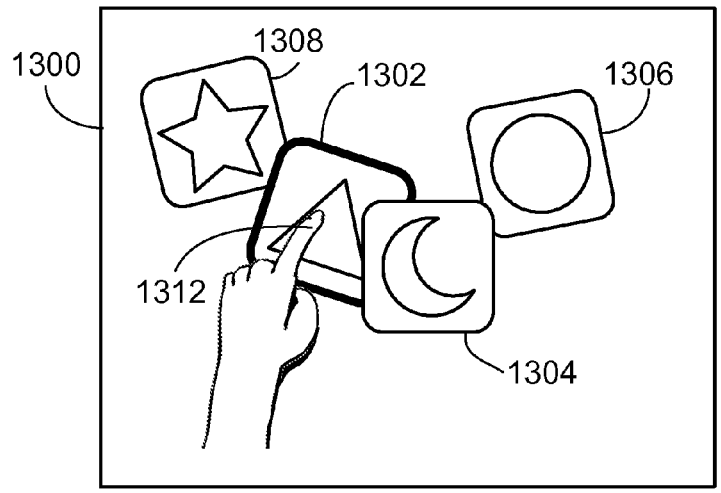
FIGS. 13A-13C are diagrams of a multi-touch display device that is configured to define a region of influence about an input mechanism in response to detecting that the input mechanism has engaged the surface of the multi-touch display device that illustrate the effect of the region of influence as the input mechanism is moved about the surface of the multi-touch display device.
Figure 13B:
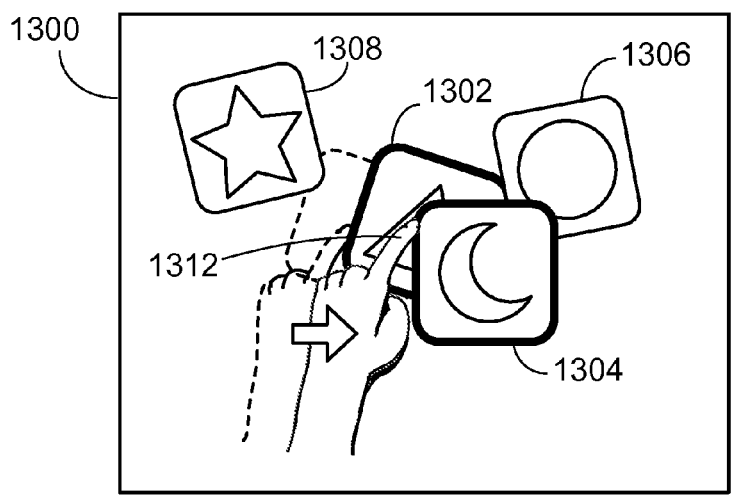
Figure 13C:
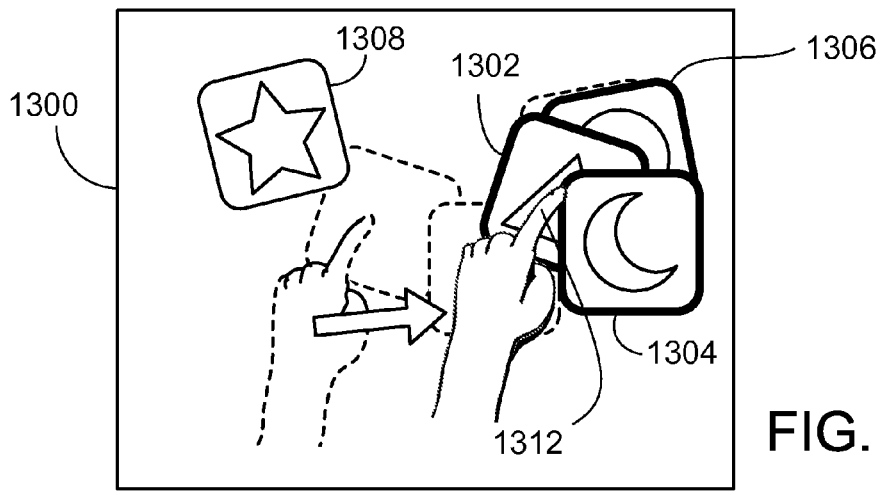

FIGS. 13A-13C are a series of figures of a multi-touch display device that is configured to define a region of influence about an input mechanism in response to detecting that the input mechanism has engaged the surface of the multi-touch display device that illustrate the effect of the region of influence as the input mechanism is moved about the surface of the multi-touch display device. In some implementations, the multi-touch display device may define the region of influence to be the area of the surface of the multi-touch display device that is engaged by the input mechanism. In other implementations, the multi-touch display device may define the region of influence more generally as a function of the area of the surface of the multi-touch display device that is engaged by the input mechanism. In such implementations, the region of influence defined by the multi-touch display device may be larger or smaller than the area of the surface of the multi-touch display device that is engaged by the input mechanism. Furthermore, in such implementations, the region of influence defined by the multi-touch display device may be askew or distinct from the area of the surface of the multi-touch display device that is engaged by the input mechanism.

As illustrated in FIG. 13A, the multi-touch display device 1300 is displaying four objects 1302, 1304, 1306, and 1308. In addition, a finger 1312 has engaged the surface of the multi-touch display device 1300. In response to detecting that the finger 1312 has engaged the surface of the multi-touch display device 1300, the multi-touch display device 1300 has defined a region of influence about the finger 1312 that engages object 1302. Consequently, in response to detecting that the region of influence engages object 1302, the multi-touch display device 1300 has selected object 1302. In FIG. 13A, the border of object 1302 has been highlighted to indicate that object 1302 has been selected.

The multi-touch display device 1300 is configured to track movements of the finger 1312 across the surface of the multi-touch display device 1300. In addition, because object 1302 has been selected, the multi-touch display device 1300 is configured to translate object 1302 about the multi-touch display device 1300 in accordance with tracked movements of the finger 1312.

Referring to FIG. 13B, the location of the finger 1312 on the surface of the multi-touch display device 1300 has changed relative to the position of the finger 1312 illustrated in FIG. 13A. In response to detecting the change of the location of the finger 1312 on the surface of the multi-touch display device 1300, the multi-touch display device 1300 translated object 1302 in accordance with the movement of finger 1312 about the surface of the multi-touch display device 1300. In addition, the multi-touch display device 1300 has redefined the region of influence exerted by the finger 1312 as a function of the current location of the finger 1312 on the surface of the multi-touch display device 1300.

As illustrated in FIG. 13B, as a result of the movement of the finger 1312, the region of influence now engages object 1304 in addition to object 1302. Specifically, in this example, the position on the multi-touch display device 1300 engaged by the finger 1300 corresponds to a position that includes a point on object 1304. Consequently, in response to detecting that the region of influence engages object 1304, the multi-touch display device 1300 has additionally selected object 1304. The border of object 1304 is highlighted in FIG. 13B, as is the border of object 1302, to indicate that object 1304, in addition to object 1302, has been selected.

Referring to FIG. 13C, the location of the finger 1312 on the surface of the multi-touch display device 1300 again has changed relative to the position of the finger 1312 illustrated in FIG. 13B. In response to detecting the change of the location of the finger 1312 on the surface of the multi-touch display device 1300, the multi-touch display device 1300 translated objects 1302 and 1304 in accordance with the movement of finger 1312 about the surface of the multi-touch display device 1300.

In addition, while the finger 1312 moved across the multi-touch display device 1300, the multi-touch display device 1300 frequently relocated the region of influence exerted by the finger 1312 to track the movement of the finger 1312 about the multi-touch display device 1300. Specifically, in this example, the multi-touch display device 1300 relocated the region of influence to track the positions on the surface of the multi-touch display device 1300 engaged by the finger 1312 as the finger 1312 moved about the multi-touch display device 1300. As the finger 1312 moved about the multi-touch display device 1300, at some point in time after the point in time illustrated in FIG. 13B but prior to the point in time illustrated in FIG. 13C, the finger 1312 engaged a position on the multi-touch display device 1300 that corresponded to a position that included a point on object 1306. Thus, the multi-touch display device 1300 relocated the region of influence exerted by the finger 1312 such that the region of influence engaged object 1306. As a consequence, the multi-touch display device 1300 additionally selected object 1306 and began translating object 1306, along with objects 1302 and 1304, as a function of the tracked movements of the finger 1312. Accordingly, FIG. 13C illustrates object 1306 as having been translated from its original position by the multi-touch display device 1300.

As illustrated in FIGS. 13A-13C, as the finger 1312 traversed the surface of the multi-touch display device 1300, the multi-touch display device 1300 tracked the movement of the finger 1312, updated the region of influence exerted by the finger in accordance with the tracked movements of the finger 1312, and selected and translated objects engaged by the region of influence exerted by the finger as the region of influence exerted by the finger 1312 moved across the multi-touch display device 1300. Thus, the effect of the movement of the finger 1312 across the surface of the multi-touch display device 1300 was that the multi-touch display device 1300 clustered objects 1302, 1304, and 1306 together and translated the clustered objects 1302, 1304, and 1306 as a group across the multi-touch display device 1300 in accordance with the tracked movement of the finger 1312. Notably, through the series of FIGS. 13A-13C, object 1308 remains in its original position on the multi-touch display device 1300. This is because the region of influence exerted by the finger 1312 never engaged object 1308.

In some implementations, when a multi-touch display device detects that an input mechanism has engaged the surface of the multi-touch display device in a location where an object is displayed, the multi-touch display device may define the region of influence about the input mechanism to be the boundary or edges of the displayed object. In addition, as the object is manipulated and its boundary or edges come into contact with the boundaries or edges of other objects, the multi-touch display device may extend the region of influence exerted by the input mechanism to include the boundaries or edges of each of the objects contacted by the boundary or edges of the originally-selected object.

Figure 14A:
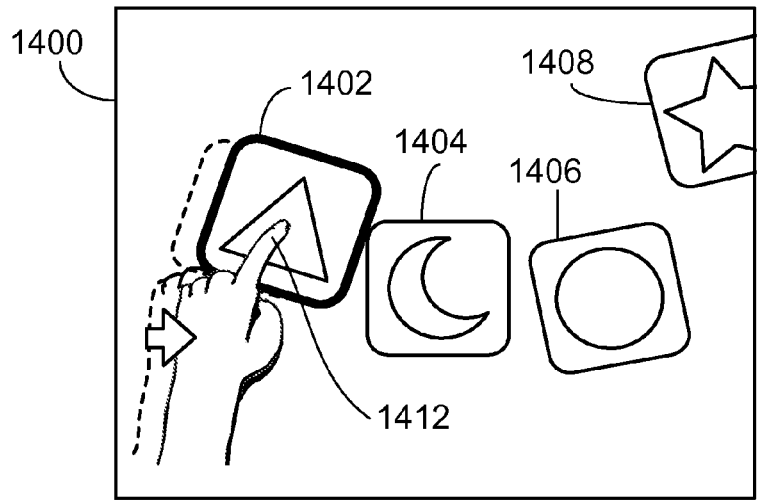
FIGS. 14A-14C are diagrams of a multi-touch display device that is configured such that when the multi-touch display device detects that an input mechanism has engaged the surface of the multi-touch display device in a location where an object is displayed, the multi-touch display device defines the boundary of the displayed object as the region of influence exerted by the input mechanism.
Figure 14B:
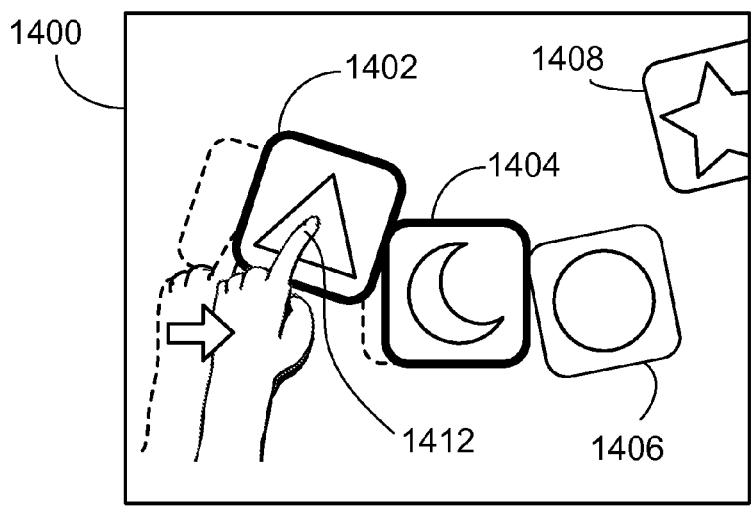
Figure 14C:
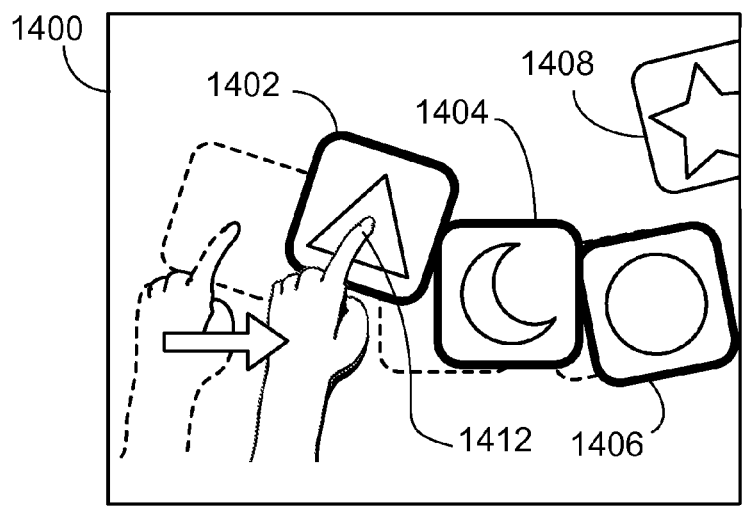

FIGS. 14A-14C are a series of figures of a multi-touch display device that is configured such that when the multi-touch display device detects that an input mechanism has engaged the surface of the multi-touch display device in a location where an object is displayed, the multi-touch display device defines the boundary of the displayed object as the region of influence exerted by the input mechanism.

As illustrated in FIG. 14A, the multi-touch display device 1400 is displaying four objects 1402, 1404, 1406, and 1408. In addition, at some point in time prior to the point in time illustrated in FIG. 14A, the multi-touch display device 1400 displayed object 1402 such that no portion of object 1402 was overlapping with object 1404 and a finger 1412 engaged the surface of the multi-touch display device 1400 in a location that corresponded to a position that included object 1402. In response to detecting that the finger 1412 engaged the surface of the multi-touch display device 1400 in the location that corresponded to the position that included the point on object 1402, the multi-touch display device 1400 selected object 1402 for manipulation. Furthermore, in response to selecting object 1402 for manipulation, the multi-touch display device 1400 began tracking movements of finger 1412 and translating object 1402 as a function of the tracked movements of finger 1412. As illustrated in FIG. 14A, after engaging the surface of the multi-touch display device 1400 in the location that corresponded to the position that included the point on object 1402, the finger 1412 moved in a generally rightward direction across the surface of the multi-touch display device 1400, and the multi-touch display device accordingly translated object 1402 in a generally rightward direction in response.

In addition to selecting object 1402 for manipulation in response to detecting that the finger 1412 engaged the surface of the multi-touch display device 1400 in the location that corresponded to the position that included the point on object 1402, the multi-touch display device 1400 also defined the border of object 1402 as the region of influence exerted by the finger 1412. In FIG. 14A, the border of object 1402 has been highlighted to indicate that object 1402 has been selected and to reflect that the region of influence exerted by the finger 1412 is defined by the border of object 1402.

As illustrated in FIG. 14A, as a consequence of the movement of finger 1412 and the resultant translation of object 1402, the border of object 1402 has come into contact with the border of object 1404. In addition, in response to detecting that the border of object 1402 has come into contact with the border of object 1404, the multi-touch display device 1400 has additionally selected object 1404 for manipulation and extended the region of influence exerted by the finger 1412 to include the border of object 1404 in addition to the border of object 1402.

Referring to FIG. 14B, the location of the finger 1412 on the surface of the multi-touch display device 1400 has changed relative to the position of the finger 1412 illustrated in FIG. 14A. In response to detecting the change of the location of the finger 1412 on the surface of the multi-touch display device 1400, the multi-touch display device 1400 translated objects 1402 and 1404 in accordance with the movement of the finger 1412 about the surface of the multi-touch display device 1400. As illustrated in FIG. 14B, the multi-touch display device 1400 translated objects 1402 and 1404 an equal distance relative to their respective positions in FIG. 14A. In some alternative implementations, however, the multi-touch display device 1400 may be configured to translate objects 1402 and 1404 related but different distances. For example, because object 1402 is the object actually engaged by the finger 1412, the multi-touch display device 1400 may translate object 1402 a distance that is a function of the movement of finger 1412 while translating object 1404 some other distance that is directly (or indirectly) proportional to but different from the distance the multi-touch display device 1400 translated object 1402.

As illustrated in FIG. 14B, as a result of the multi-touch display device 1400 translating objects 1402 and 1404, the border of object 1404, and thus the region of influence exerted by the finger 1412, has engaged the border of object 1406. Consequently, in response to detecting that the region of influence has engaged object 1406, the multi-touch display device 1400 has additionally selected object 1406 for manipulation. In addition, the multi-touch display device 1400 has redefined the region of influence exerted by the finger 1412 such that the region of influence exerted by the finger 1412 is defined by the borders of objects 1402, 1404, and 1406.

Referring to FIG. 14C, the location of the finger 1412 on the surface of the multi-touch display device 1400 has changed relative to the position of the finger 1412 illustrated in FIG. 14B. In addition, in response to detecting the change of the location of the finger 1412 on the surface of the multi-touch display device 1400, the multi-touch display device 1400 translated objects 1402, 1404, and 1406 as a function of the movement of the finger 1412 about the surface of the multi-touch display device 1400. As illustrated in FIG. 14C, the multi-touch display device 1400 translated objects 1402, 1404, and 1406 an equal distance relative to their translations from the time they were each engaged. In some alternative implementations, however, the multi-touch display device 1400 may be configured to translate objects 1402, 1404, and 1406 related but different distances. For example, because object 1402 is the object actually engaged by the finger 1412, the multi-touch display device 1400 may translate object 1402 a distance that is a function of the movement of finger 1412 while translating objects 1404 and 1406 other distances that are directly (or indirectly) proportional to but different than the distance the multi-touch display device 1400 translated object 1402. In some implementations, the distances that the multi-touch display device 1400 translates objects 1404 and 1406 may be a function of their own distances from object 1402 or the point on object 1402 engaged by the finger 1412 in addition to the tracked movement of the finger 1412.

The functionality provided by the multi-touch display device 1400 illustrated in FIGS. 14A-14C enables a user to select and manipulate an object displayed on the multi-touch display device 1400 by engaging the surface of the multi-touch display device 1400 with an input mechanism at a location that corresponds to a point on the object and thereafter acquire for control and manipulation additional objects displayed by the multi-touch display device 1400 without ever engaging the surface of the multi-touch display device 1400 at locations that correspond to points on the later-acquired objects. In fact, in some implementations, the multi-touch display device 1400 may prevent the contact point defined by the input mechanism from contacting the borders or even from entering the interiors of the later-acquired objects. Essentially, the multi-touch display device 1400 may move a contact point that is attached to a selected object and that is defined by a location where an input mechanism engages the surface of the multi-touch display device 1400 about the multi-touch display device 1400 as a function of detected movement of the input mechanism. When the multi-touch display device 1400 detects an intersection between an edge of the selected object and edges of one or more other objects encountered by the selected object, the multi-touch display device 1400 may record a relationship between the intersected objects and the selected object and impart movement to the intersected objects based on the detected movement of the input mechanism.

As illustrated in FIGS. 14A-14C, the multi-touch display device 1400 selects a previously unselected object in response to the border of a selected object intersecting with the border of the previously unselected object. In some alternative implementations, the multi-touch display device 1400 may require that the border of a selected object overlap a previously unselected object by a defined threshold distance before the multi-touch display device 1400 selects the previously unselected object. As further illustrated in FIGS. 14A-14C, the region of influence defined by the multi-touch display device 1400 matches the visible borders of the selected objects. In some alternative implementations, the multi-touch display device 1400 may define a region of influence such that the region of influence does not match the visible border of the selected objects. For example, the multi-touch display device 1400 may define the region of influence to extend some defined distance beyond the visible border of each selected object. In such an implementation, the region of influence may engage a previously unselected object without the visible border of a selected object having come into contact with the visible border of the previously unselected object. Rather, the region of influence may engage the visible border of the previously unselected object when the visible border of the selected objects is within the defined distance of the previously unselected object. Alternatively, the multi-touch display device 1400 may define the region of influence to be withdrawn some defined distance within the visible border of each selected object. In such an implementation, the region of influence may engage a previously unselected object only after the visible border of a selected object is overlapping the visible border of the previously unselected object by the defined distance.

Different configurations for handling the concurrent control and manipulation of multiple objects displayed on a multi-touch display device have been described. In some implementations, a multi-touch display device may support multiple of these configurations such that the multi-touch display device is operable to transition between different of these configurations, for example, in response to user-supplied input.

In one specific example, a multi-touch display device that is configured to sense the pressure applied to the surface of the multi-touch display device supports multiple configurations for handling the concurrent control and manipulation of multiple displayed objects and is operable to transition between the different configurations as a function of the sensed pressure applied to the surface of the multi-touch display device. In a sense, therefore, the sensed pressure applied to the surface of the multi-touch display device operates as a clutch for transitioning between the different configurations for handling the concurrent control and manipulation of multiple displayed objects.

In one implementation, the multi-touch display device supports at least two different configurations of handling the concurrent control and manipulation of multiple displayed objects and is operable to transition between the two different configurations as a function of the sensed pressure applied to the surface of the multi-touch display device. In the first configuration, when the multi-touch display device detects that an input mechanism is engaging the surface of the multi-touch display device at a location where two or more displayed objects are overlapping, the multi-touch display device selects only the object displayed closest to the foreground (furthest from the background) from among the overlapping objects for subsequent control and manipulation. In this specific implementation, the multi-touch display device operates according to this configuration when the sensed pressure applied to the surface of the multi-touch display device by the input mechanism is less than some threshold value. In the second configuration, according to which the multi-touch display device operates when the sensed pressure applied to the surface of the multi-touch display device by the input mechanism is equal to or greater than the threshold value, the multi-touch display device selects all overlapping objects for subsequent control and manipulation in response to detecting that the input mechanism is engaging the surface of the multi-touch display device at a location where two or more displayed objects are overlapping.

In other implementations, the multi-touch display device supports more than two of the different configurations for handling the concurrent control and manipulation of multiple disclosed objects described herein and is operable to transition between each of the multiple different configurations as a function of the sensed pressure applied to the surface of the multi-touch display device by an input mechanism. Furthermore, in some implementations, when multiple different input mechanisms are engaging the surface of the multi-touch display device at different locations where different groups of objects are overlapping, the multi-touch display device may be operable to operate according to two different configurations concurrently as a function of the sensed pressures applied to the surface of the multi-touch display device by the different input mechanisms. That is to say that the multi-touch display device may handle the manipulation of a first overlapping group of objects engaged by a first input mechanism according to one configuration as a result of the sensed pressure applied to the surface of the multi-touch display device by the first input mechanism while concurrently handling the manipulation of a second overlapping group of objects engaged by a second input mechanism according to a second configuration as a result of the sensed pressure applied to the surface of the multi-touch display device by the second input mechanism.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Multi-touch display devices encompass a wide variety of display devices and associated systems and components. Some multi-touch display devices require physical contact with a surface of the multi-touch display device in order to receive input. For example, such a multi-touch display device may receive input by detecting contact with a surface of the multi-touch display device by a finger, a stylus, some other mechanical, electro-mechanical, or magnetic input mechanism and/or any combination of multiple such input mechanisms at the same time. Furthermore, some such multi-touch display devices may be configured such that the surface that receives input may appear to be the same surface on which the multi-touch display device displays objects (whether or not the surface that receives input actually is the same surface as the surface on which the multi-touch display device displays objects). Alternatively, other such multi-touch display devices may receive input on a surface that is clearly remote and distinct from the surface on which the multi-touch display device displays objects. One example of such a multi-touch display system is a multi-point input capable standalone tablet that provides input to a remote and distinct display.

Other multi-touch display devices do not require physical contact with the surface of the multi-touch display device in order to receive input. For example, such multi-touch display devices may receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

Furthermore, the various different operations and transformations disclosed herein may be implemented by any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Moreover, some of the various different operations and transformations disclosed herein are not limited to implementation on a multi-touch device and thus may be implemented on a single-point device.

Various modifications may be made. For example, while scaling manipulations generally are described herein in the context of uniform scaling operations, such scaling operations need not be uniform. Furthermore, useful results still may be achieved if steps of the disclosed techniques are performed in a different order. Moreover, useful results may be achieved by combining various steps or components of the various disclosed techniques in a different manner and/or if components of the disclosed systems are combined in a different manner and/or replaced or supplemented by other components.

What is claimed is:

1. A computer-implemented method for allocating control to a user input device when multiple user input devices are engaging an object displayed on a multi-touch display device, the method comprising:

displaying an object on a display component of a multi-touch display device;

determining that a first user input device is engaging a surface of the multi-touch display device;

as a consequence of having determined that the first user input device is engaging the surface of the multi-touch display device, tracking movements of the first user input device while the first user input device continues to engage the surface of the multi-touch display device;

determining that a second user input device is engaging the surface of the multi-touch display device;

as a consequence of having determined that the second user input device is engaging the surface of the multi-touch display device, tracking movements of the second user input device while the second user input device continues to engage the surface of the multi-touch display device;

determining that the first user input device determined to be engaging the surface of the multi-touch display device is engaging the surface of the multi-touch display device at a first position that corresponds to a first point within the displayed object while the second user input device determined to be engaging the surface of the multi-touch display device concurrently is engaging the surface of the multi-touch display device at a second position that corresponds to a second point within the displayed object;

as a consequence of having determined that the first user input device and the second user input device concurrently are engaging positions on the surface of the multi-touch display device that correspond to points within the displayed object, determining to allocate control of the displayed object to the first user input device but not the second user input device;

after allocating control of the displayed object to the first user input device and as a consequence of tracking movements of the first user input device while the first user input device continues to engage the surface of the multi-touch display device and tracking movements of the second user input device while the second user input device continues to engage the surface of the multi-touch display device, determining that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device; and as a consequence of having determined that the first user input device moved to the third position on the surface of the multi-touch display device from the first position on the surface of the multi-touch display device and as a consequence of having allocated control of the displayed object to the first user input device, translating the displayed object about the display component of the multi-touch display device as a function of the determined movement of the first user input device to the third position on the surface of the multi-touch display device from the first position on the surface of the multi-touch display device, wherein the translation of the displayed object about the display component of the multi-touch display device as a function of the determined movement of the first user input device to the third position on the surface of the multi-touch display device from the first position on the surface of the multi-touch display device is not influenced by the determined movement of the second user input device to the fourth position on the surface of the multi-touch display device from the second position on the surface of the multi-touch display device, wherein determining to allocate control of the displayed object to the first user input device but not the second user input device includes:

sensing a relative amount of pressure with which the first user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displayed object;

sensing a relative amount of pressure with which the second user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displaced object;

comparing the relative amount of pressure with which the first user input device is sensed to be engaging the surface of the multi-touch display device to the relative amount of pressure with which the second user input device is sensed to be engaging the surface of the multi-touch display device;

based on results of comparing the relative amount of pressure with which the first user input device is sensed to be engaging the surface of the multi-touch display device to the relative amount of pressure with which the second user input device is sensed to be engaging the surface of the multi-touch display device, determining that the relative amount of pressure with which the first user input device is sensed to be engaging the surface of the multi-touch display device is greater than the relative amount of pressure with which the second user input device is sensed to be engaging the surface of the multi-touch display device; and allocating control of the displayed object to the first user input device but not the second user input device as a consequence of having determined that the relative amount of pressure with which the first user input device is sensed to be engaging the surface of the multi-touch display device is greater than the relative amount of pressure with which the second user input device is sensed to be engaging the surface of the multi-touch display device.

2. The method of claim 1 further comprising:

after translating the displayed object about the display component of the multi-touch display device as a function of the determined movement of the first user input device to the third position on the surface of the multi-touch display device from the first position on the surface of the multi-touch display device, determining that the second user input device concurrently moved to a fifth position on the surface of the multi-touch display device from the fourth position on the surface of the multi-touch display device while the first user input device remained located at the third position on the surface of the multi-touch display device; and in response to determining that the second user input device concurrently moved to a fifth position on the surface of the multi-touch display device from the fourth position on the surface of the multi-touch display device while the first user input device remained located at the third position on the surface of the multi-touch display device and as a consequence of having allocated control of the displayed object to the first user input device but not the second user input device, preserving the position, orientation, and scale of the displayed object on the display component of the multi-touch display device.

3. The method of claim 1 wherein:

determining that a first user input device is engaging the surface of the multi-touch display device includes determining that a first finger is engaging the surface of the multi-touch display device;

tracking movements of the first user input device while the first user input device continues to engage the surface of the multi-touch display device as a consequence of having determined that the first user input device is engaging the surface of the multi-touch display device includes tracking movements of the first finger while the first finger continues to engage the surface of the multi-touch display device as a consequence of having determined that the first finger is engaging the surface of the multi-touch display device;

determining that a second user input device is engaging the surface of the multi-touch display device includes determining that a second finger is engaging the surface of the multi-touch display device;

tracking movements of the second user input device while the second user input device continues to engage the surface of the multi-touch display device as a consequence of having determined that the second user input device is engaging the surface of the multi-touch display device includes tracking movements of the second finger while the second finger continues to engage the surface of the multi-touch display device as a consequence of having determined that the second finger is engaging the surface of the multi-touch display device;

determining that the first user input device is engaging the surface of the multi-touch display device at the first position that corresponds to the first point within the displayed object while the second user input device is engaging the surface of the multi-touch display device at the second position that corresponds to the second point within the displayed object includes determining that the first finger is engaging the surface of the multi-touch display device at the first position that corresponds to the first point within the displayed object while the second finger is engaging the surface of the multi-touch display device at the second position that corresponds to the second point within the displayed object;

determining to allocate control of the displayed object to the first user input device but not the second user input device as a consequence of having determined that the first user input device and the second user input device concurrently are engaging positions on the surface of the multi-touch display device that correspond to points within the displayed object includes determining to allocate control of the displayed object to the first finger but not the second finger as a consequence of having determined that the first finger and the second finger concurrently are engaging positions on the surface of the multi-touch display device that correspond to points within the displayed object;

determining that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device includes determining that the first finger moved to a third position on the surface of the multi-touch display device from the first position on the surface of the multi-touch display device while the second finger concurrently moved to a fourth position on the surface of the multi-touch display device from the second position on the surface of the multi-touch display device; and translating the displayed object about the display component of the multi-touch display device as a function of the determined movement of the first user input device to the third position on the surface of the multi-touch display device from the first position on the surface of the multi-touch display device as a consequence of having determined that the first user input device moved to the third position on the surface of the multi-touch display device from the first position on the surface of the multi-touch display device and as a consequence of having allocated control of the displayed object to the first user input device includes translating the displayed object about the display component of the multi-touch display device as a function of the determined movement of the first finger to the third position on the surface of the multi-touch display device from the first position on the surface of the multi-touch display device as a consequence of having determined that the first finger moved to the third position on the surface of the multi-touch display device from the first position on the surface of the multi-touch display device and as a consequence of having allocated control of the displayed object to the first finger, wherein the translation of the displayed object about the display component of the multi-touch display device as a function of the determined movement of the first finger to the third position on the surface of the multi-touch display device from the first position on the surface of the multi-touch display device is not influenced by the determined movement of the second finger to the fourth position on the surface of the multi-touch display device from the second position on the surface of the multi-touch display device.

4. The method of claim 1 wherein:

determining that the first user input device is engaging the surface of the multi-touch display device includes determining that the first user input device is making physical contact with the surface of the multi-touch display device;

tracking movements of the first user input device while the first user input device continues to engage the surface of the multi-touch display device as a consequence of having determined that the first user input device is engaging the surface of the multi-touch display device includes tracking movements of the first user input device while the first user input device continues to make physical contact with the surface of the multi-touch display device as a consequence of having determined that the first user input device is making physical contact with the surface of the multi-touch display device;

determining that the second user input device is engaging the surface of the multi-touch display device includes determining the second user input device is making physical contact with the surface of the multi-touch display device;

tracking movements of the second user input device while the second user input device continues to engage the surface of the multi-touch display device as a consequence of having determined that the second user input device is engaging the surface of the multi-touch display device includes tracking movements of the second user input device while the second user input device continues to make physical contact with the surface of the multi-touch display device as a consequence of having determined that the second user input device is making physical contact with the surface of the multi-touch display device;

determining that the first user input device is engaging the surface of the multi-touch display device at the first position that corresponds to the first point within the displayed object while the second user input device concurrently is engaging the surface of the multi-touch display device at the second position that corresponds to the second point within the displayed object includes determining that the first user input device is making physical contact with the surface of the multi-touch display device at the first position that corresponds to the first point within the displayed object while the second user input device concurrently is making physical contact with the surface of the multi-touch display device at the second position that corresponds to the second point within the displayed object;

determining to allocate control of the displayed object to the first user input device but not the second user input device as a consequence of having determined that the first user input device and the second user input device concurrently are engaging positions on the surface of the multi-touch display device that correspond to points within the displayed object includes determining to allocate control of the displayed object to the first user input device but not the second user input device as a consequence of having determined that the first user input device and the second user input device concurrently are making physical contact with positions on the surface of the multi-touch display device that correspond to points within the displayed object; and determining that the first user input device moved to the third position on the surface of the multi-touch display device from the first position on the surface of the multi-touch display device while the second user input device concurrently moved to the fourth position on the surface of the multi-touch display device from the second position on the surface of the multi-touch display device as a consequence of tracking movements of the first user input device while the first user input device continues to engage the surface of the multi-touch display device and tracking movements of the second user input device while the second user input device continues to engage the surface of the multi-touch display device includes determining that the first user input device is making physical contact with the third position on the surface of the multi-touch display device while the second user input device concurrently is making physical contact with the fourth position on the surface of the multi-touch display device as a consequence of tracking movements of the first user input device while the first user input device continues to make physical contact with the surface of the multi-touch display device and tracking movements of the second user input device while the second user input device continues to make physical contact with the surface of the multi-touch display device.

5. A computer-readable storage medium storing instructions that, when executed by a processor, cause the processor to:

display an object on a display component of a multi-touch display device;

determine that a first user input device is engaging a surface of the multi-touch display device;

as a consequence of having determined that the first user input device is engaging the surface of the multi-touch display device, track movements of the first user input device while the first user input device continues to engage the surface of the multi-touch display device;

determine that a second user input device is engaging the surface of the multi-touch display device;

as a consequence of having determined that the second user input device is engaging the surface of the multi-touch display device, track movements of the second user input device while the second user input device continues to engage the surface of the multi-touch display device;

determine that the first user input device determined to be engaging the surface of the multi-touch display device is engaging the surface of the multi-touch display device at a first position that corresponds to a first point within the displayed object while the second user input device determined to be engaging the surface of the multi-touch display device concurrently is engaging the surface of the multi-touch display device at a second position that corresponds to a second point within the displayed object;

as a consequence of having determined that the first user input device and the second user input device concurrently are engaging positions on the surface of the multi-touch display device that correspond to points within the displayed object, determine to allocate control of the displayed object to the first user input device but not the second user input device;

after allocating control of the displayed object to the first user input device and as a consequence of tracking movements of the first user input device while the first user input device continues to engage the surface of the multi-touch display device and tracking movements of the second user input device while the second user input device continues to engage the surface of the multi-touch display device, determine that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device; and as a consequence of having determined that the first user input device moved to the third position on the surface of the multi-touch display device from the first position on the surface of the multi-touch display device and as a consequence of having allocated control of the displayed object to the first user input device, translate the displayed object about the display component of the multi-touch display device as a function of the determined movement of the first user input device to the third position on the surface of the multi-touch display device from the first position on the surface of the multi-touch display device, wherein the translation of the displayed object about the display component of the multi-touch display device as a function of the determined movement of the first user input device to the third position on the surface of the multi-touch display device from the first position on the surface of the multi-touch display device is not influenced by the determined movement of the second user input device to the fourth position on the surface of the multi-touch display device from the second position on the surface of the multi-touch display device, wherein the instructions that, when executed by a processor, cause the processor to allocate control of the displayed object to the first user input device but not the second user input device include instructions that, when executed by a processor, cause the processor to:

sense a relative amount of pressure with which the first user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displayed object;

sense a relative amount of pressure with which the second user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displayed object;

compare the relative amount of pressure with which the first user input device is sensed to be engaging the surface of the multi-touch display device to the relative amount of pressure with which the second user input device is sensed to be engaging the surface of the multi-touch display device;

based on results of comparing the relative amount of pressure with which the first user input device is sensed to be engaging the surface of the multi-touch display device to the relative amount of pressure with which the second user input device is sensed to be engaging the surface of the multi-touch display device, determine that the relative amount of pressure with which the first user input device is sensed to be engaging the surface of the multi-touch display device is greater than the relative amount of pressure with which the second user input device is sensed to be engaging the surface of the multi-touch display device; and allocate control of the displayed object to the first user input device but not the second user input device as a consequence of having determined that the relative amount of pressure with which the first user input device is sensed to be engaging the surface of the multi-touch display device is greater than the relative amount of pressure with which the second user input device is sensed to be engaging the surface of the multi-touch display device.

6. The computer-readable storage medium of claim 5 wherein:

the instructions that, when executed by a processor, cause the processor to determine that a first user input device is engaging the surface of the multi-touch display device include instructions that, when executed by a processor, cause the processor to determine that a first finger is engaging the surface of the multi-touch display device;

the instructions that, when executed by a processor, cause the processor to track movements of the first user input device while the first user input device continues to engage the surface of the multi-touch display device as a consequence of having determined that the first user input device is engaging the surface of the multi-touch display device include instructions that, when executed by a processor, cause the processor to track movements of the first finger while the first finger continues to engage the surface of the multi-touch display device as a consequence of having determined that the first finger is engaging the surface of the multi-touch display device;

the instructions that, when executed by a processor, cause the processor to determine that a second user input device is engaging the surface of the multi-touch display device include instructions that, when executed by a processor, cause the processor to determine that a second finger is engaging the surface of the multi-touch display device;

the instructions that, when executed by a processor, cause the processor to track movements of the second user input device while the second user input device continues to engage the surface of the multi-touch display device as a consequence of having determined that the second user input device is engaging the surface of the multi-touch display device include instructions that, when executed by a processor, cause the processor to track movements of the second finger while the second finger continues to engage the surface of the multi-touch display device as a consequence of having determined that the second finger is engaging the surface of the multi-touch display device;

the instructions that, when executed by a processor, cause the processor to determine that the first user input device is engaging the surface of the multi-touch display device at the first position that corresponds to the first point within the displayed object while the second user input device is engaging the surface of the multi-touch display device at the second position that corresponds to the second point within the displayed object include instructions that, when executed by a processor, cause the processor to determine that the first finger is engaging the surface of the multi-touch display device at the first position that corresponds to the first point within the displayed object while the second finger is engaging the surface of the multi-touch display device at the second position that corresponds to the second point within the displayed object;

the instructions that, when executed by a processor, cause the processor to determine to allocate control of the displayed object to the first user input device but not the second user input device as a consequence of having determined that the first user input device and the second user input device concurrently are engaging positions on the surface of the multi-touch display device that correspond to points within the displayed object include instructions that, when executed by a processor, cause the processor to determine to allocate control of the displayed object to the first finger but not the second finger as a consequence of having determined that the first finger and the second finger concurrently are engaging positions on the surface of the multi-touch display device that correspond to points within the displayed object;

the instructions that, when executed by a processor, cause the processor to determine that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device include instructions that, when executed by a processor, cause the processor to determine that the first finger moved to a third position on the surface of the multi-touch display device from the first position on the surface of the multi-touch display device while the second finger concurrently moved to a fourth position on the surface of the multi-touch display device from the second position on the surface of the multi-touch display device; and the instructions that, when executed by a processor, cause the processor to translate the displayed object about the display component of the multi-touch display device as a function of the determined movement of the first user input device to the third position on the surface of the multi-touch display device from the first position on the surface of the multi-touch display device as a consequence of having determined that the first user input device moved to the third position on the surface of the multi-touch display device from the first position on the surface of the multi-touch display device and as a consequence of having allocated control of the displayed object to the first user input device include instructions that, when executed by a processor, cause the processor to translate the displayed object about the display component of the multi-touch display device as a function of the determined movement of the first finger to the third position on the surface of the multi-touch display device from the first position on the surface of the multi-touch display device as a consequence of having determined that the first finger moved to the third position on the surface of the multi-touch display device from the first position on the surface of the multi-touch display device and as a consequence of having allocated control of the displayed object to the first finger, wherein the translation of the displayed object about the display component of the multi-touch display device as a function of the determined movement of the first finger to the third position on the surface of the multi-touch display device from the first position on the surface of the multi-touch display device is not influenced by the determined movement of the second finger to the fourth position on the surface of the multi-touch display device from the second position on the surface of the multi-touch display device.

7. The computer-readable storage medium of claim 5 wherein:

the instructions that, when executed by a processor, cause the processor to determine that the first user input device is engaging the surface of the multi-touch display device include instructions that, when executed by a processor, cause the processor to determine that the first user input device is making physical contact with the surface of the multi-touch display device;

the instructions that, when executed by a processor, cause the processor to track movements of the first user input device while the first user input device continues to engage the surface of the multi-touch display device as a consequence of having determined that the first user input device is engaging the surface of the multi-touch display device include instructions that, when executed by a processor, cause the processor to track movements of the first user input device while the first user input device continues to make physical contact with the surface of the multi-touch display device as a consequence of having determined that the first user input device is making physical contact with the surface of the multi-touch display device;

the instructions that, when executed by a processor, cause the processor to determine that the second user input device is engaging the surface of the multi-touch display device include instructions that, when executed by a processor, cause the processor to determine the second user input device is making physical contact with the surface of the multi-touch display device;

the instructions that, when executed by a processor, cause the processor to track movements of the second user input device while the second user input device continues to engage the surface of the multi-touch display device as a consequence of having determined that the second user input device is engaging the surface of the multi-touch display device include instructions that, when executed by a processor, cause the processor to track movements of the second user input device while the second user input device continues to make physical contact with the surface of the multi-touch display device as a consequence of having determined that the second user input device is making physical contact with the surface of the multi-touch display device;

the instructions that, when executed by a processor, cause the processor to determine that the first user input device is engaging the surface of the multi-touch display device at the first position that corresponds to the first point within the displayed object while the second user input device concurrently is engaging the surface of the multi-touch display device at the second position that corresponds to the second point within the displayed object include instructions that, when executed by a processor, cause the processor to determine that the first user input device is making physical contact with the surface of the multi-touch display device at the first position that corresponds to the first point within the displayed object while the second user input device concurrently is making physical contact with the surface of the multi-touch display device at the second position that corresponds to the second point within the displayed object;

the instructions that, when executed by a processor, cause the processor to determine to allocate control of the displayed object to the first user input device but not the second user input device as a consequence of having determined that the first user input device and the second user input device concurrently are engaging positions on the surface of the multi-touch display device that correspond to points within the displayed object include instructions that, when executed by a processor, cause the processor to determine to allocate control of the displayed object to the first user input device but not the second user input device as a consequence of having determined that the first user input device and the second user input device concurrently are making physical contact with positions on the surface of the multi-touch display device that correspond to points within the displayed object; and the instructions that, when executed by a processor, cause the processor to determine that the first user input device moved to the third position on the surface of the multi-touch display device from the first position on the surface of the multi-touch display device while the second user input device concurrently moved to the fourth position on the surface of the multi-touch display device from the second position on the surface of the multi-touch display device as a consequence of tracking movements of the first user input device while the first user input device continues to engage the surface of the multi-touch display device and tracking movements of the second user input device while the second user input device continues to engage the surface of the multi-touch display device include instructions that, when executed by a processor, cause the processor to determine that the first user input device is making physical contact with the third position on the surface of the multi-touch display device while the second user input device concurrently is making physical contact with the fourth position on the surface of the multi-touch display device as a consequence of tracking movements of the first user input device while the first user input device continues to make physical contact with the surface of the multi-touch display device and tracking movements of the second user input device while the second user input device continues to make physical contact with the surface of the multi-touch display device.

8. A multi-touch display device comprising:
a display component configured to render a visual output display;
a touch-sensitive sensing system configured to determine that one or more user input devices are engaging a surface of the multi-touch display device; and
a computing system configured to:
  display an object on the display component of a multi-touch display device;
  determine that a first user input device is engaging the surface of the multi-touch display device;
  as a consequence of having determined that the first user input device is engaging the surface of the multi-touch display device, track movements of the first user input device while the first user input device continues to engage the surface of the multi-touch display device;
  determine that a second user input device is engaging the surface of the multi-touch display device;
  as a consequence of having determined that the second user input device is engaging the surface of the multi-touch display device, track movements of the second user input device while the second user input device continues to engage the surface of the multi-touch display device;
  determine that the first user input device determined to be engaging the surface of the multi-touch display device is engaging the surface of the multi-touch display device at a first position that corresponds to a first point within the displayed object while the second user input device determined to be engaging the surface of the multi-touch display device concurrently is engaging the surface of the multi-touch display device at a second position that corresponds to a second point within the displayed object;
  as a consequence of having determined that the first user input device and the second user input device concurrently are engaging positions on the surface of the multi-touch display device that correspond to points within the displayed object, determine to allocate control of the displayed object to the first user input device but not the second user input device;
  after allocating control of the displayed object to the first user input device and as a consequence of tracking movements of the first user input device while the first user input device continues to engage the surface of the multi-touch display device and tracking movements of the second user input device while the second user input device continues to engage the surface of the multi-touch display device, determine that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device; and
  as a consequence of having determined that the first user input device moved to the third position on the surface of the multi-touch display device from the first position on the surface of the multi-touch display device and as a consequence of having allocated control of the displayed object to the first user input device, translate the displayed object about the display component of the multi-touch display device as a function of the determined movement of the first user input device to the third position on the surface of the multi-touch display device from the first position on the surface of the multi-touch display device, wherein the translation of the displayed object about the display component of the multi-touch display device as a function of the determined movement of the first user input device to the third position on the surface of the multi-touch display device from the first position on the surface of the multi-touch display device is not influenced by the determined movement of the second user input device to the fourth position on the surface of the multi-touch display device from the second position on the surface of the multi-touch display device,
wherein the computing system configured to allocate control of the displayed object to the first user input device but not the second user input device includes a computing system configured to:
  sense a relative amount of pressure with which the first user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displayed object;
  sense a relative amount of pressure with which the second user input device is engaging the surface of the multi-touch display device while the first user input device is engaging the surface of the multi-touch display device at the first position that corresponds to the first point within the displayed object and the second user input device concurrently is engaging the surface of the multi-touch display device at the second position that corresponds to the second point within the displaced object;
  compare the relative amount of pressure with which the first user input device is sensed to be engaging the surface of the multi-touch display device to the relative amount of pressure with which the second user input device is sensed to be engaging the surface of the multi-touch display device;
  based on results of comparing the relative amount of pressure with which the first user input device is sensed to be engaging the surface of the multi-touch display device to the relative amount of pressure with which the second user input device is sensed to be engaging the surface of the multi-touch display device, determine that the relative amount of pressure with which the first user input device is sensed to be engaging the surface of the multi-touch display device is greater than the relative amount of pressure with which the second user input device is sensed to be engaging the surface of the multi-touch display device; and allocate control of the displayed object to the first user input device but not the second user input device as a consequence of having determined that the relative amount of pressure with which the first user input device is sensed to be engaging the surface of the multi-touch display device is greater than the relative amount of pressure with which the second user input device is sensed to be engaging the surface of the multi-touch display device.

9. The multi-touch display device of claim 8 wherein:

the computing system configured to determine that a first user input device is engaging the surface of the multi-touch display device includes a computing system configured to determine that a first finger is engaging the surface of the multi-touch display device;

the computing system configured to track movements of the first user input device while the first user input device continues to engage the surface of the multi-touch display device as a consequence of having determined that the first user input device is engaging the surface of the multi-touch display device includes a computing system configured to track movements of the first finger while the first finger continues to engage the surface of the multi-touch display device as a consequence of having determined that the first finger is engaging the surface of the multi-touch display device;

the computing system configured to determine that a second user input device is engaging the surface of the multi-touch display device includes a computing system configured to determine that a second finger is engaging the surface of the multi-touch display device;

the computing system configured to track movements of the second user input device while the second user input device continues to engage the surface of the multi-touch display device as a consequence of having determined that the second user input device is engaging the surface of the multi-touch display device includes a computing system configured to track movements of the second finger while the second finger continues to engage the surface of the multi-touch display device as a consequence of having determined that the second finger is engaging the surface of the multi-touch display device;

the computing system configured to determine that the first user input device is engaging the surface of the multi-touch display device at the first position that corresponds to the first point within the displayed object while the second user input device is engaging the surface of the multi-touch display device at the second position that corresponds to the second point within the displayed object includes a computing system configured to determine that the first finger is engaging the surface of the multi-touch display device at the first position that corresponds to the first point within the displayed object while the second finger is engaging the surface of the multi-touch display device at the second position that corresponds to the second point within the displayed object;

the computing system configured to determine to allocate control of the displayed object to the first user input device but not the second user input device as a consequence of having determined that the first user input device and the second user input device concurrently are engaging positions on the surface of the multi-touch display device that correspond to points within the displayed object includes a computing system configured to determine to allocate control of the displayed object to the first finger but not the second finger as a consequence of having determined that the first finger and the second finger concurrently are engaging positions on the surface of the multi-touch display device that correspond to points within the displayed object;

the computing system configured to determine that the first user input device moved to a third position on the surface of the multi-touch display device from the first position on the surface of the multi-touch display device while the second user input device concurrently moved to a fourth position on the surface of the multi-touch display device from the second position on the surface of the multi-touch display device includes a computing system configured to determine that the first finger moved to a third position on the surface of the multi-touch display device from the first position on the surface of the multi-touch display device while the second finger concurrently moved to a fourth position on the surface of the multi-touch display device from the second position on the surface of the multi-touch display device; and the computing system configured to translate the displayed object about the display component of the multi-touch display device as a function of the determined movement of the first user input device to the third position on the surface of the multi-touch display device from the first position on the surface of the multi-touch display device as a consequence of having determined that the first user input device moved to the third position on the surface of the multi-touch display device from the first position on the surface of the multi-touch display device and as a consequence of having allocated control of the displayed object to the first user input device includes a computing system configured to translate the displayed object about the display component of the multi-touch display device as a function of the determined movement of the first finger to the third position on the surface of the multi-touch display device from the first position on the surface of the multi-touch display device as a consequence of having determined that the first finger moved to the third position on the surface of the multi-touch display device from the first position on the surface of the multi-touch display device and as a consequence of having allocated control of the displayed object to the first finger, wherein the translation of the displayed object about the display component of the multi-touch display device as a function of the determined movement of the first finger to the third position on the surface of the multi-touch display device from the first position on the surface of the multi-touch display device is not influenced by the determined movement of the second finger to the fourth position on the surface of the multi-touch display device from the second position on the surface of the multi-touch display device.

10. A computer-implemented method for allocating control to user input devices when multiple user input devices are engaging an object displayed on a multi-touch display device, the method comprising:

displaying an object on a display component of a multi-touch display device;

determining that a first user input device is engaging a surface of the multi-touch display device;

as a consequence of having determined that the first user input device is engaging the surface of the multi-touch display device, tracking movements of the first user input device while the first user input device continues to engage the surface of the multi-touch display device;

determining that a second user input device is engaging the surface of the multi-touch display device;

as a consequence of having determined that the second user input device is engaging the surface of the multi-touch display device, tracking movements of the second user input device while the second user input device continues to engage the surface of the multi-touch display device;

determining that a third user input device is engaging the surface of the multi-touch display device;

as a consequence of having determined that the third user input device is engaging the surface of the multi-touch display device, tracking movements of the third user input device while the third user input device continues to engage the surface of the multi-touch display device;

determining that the first user input device determined to be engaging the surface of the multi-touch display device is engaging the surface of the multi-touch display device at a first position that corresponds to a first point within the displayed object while the second user input device determined to be engaging the surface of the multi-touch display device concurrently is engaging the surface of the multi-touch display device at a second position that corresponds to a second point within the displayed object and while the third user input device determined to be engaging the surface of the multi-touch display device concurrently is engaging the surface of the multi-touch display device at a third position that corresponds to a third point within the displayed object;

determining that the first user input device first engaged the first position on the surface of the multi-touch display device that corresponds to the first point within the displayed object at a first point in time;

determining that the second user input device first engaged the second position on the surface of the multi-touch display device that corresponds to the second point within the displayed object at a second point in time;

determining that the third user input device first engaged the third position on the surface of the multi-touch display device that corresponds to the third point within the displayed object at a third point in time;

as a consequence of having determined that the first user input device is engaging the surface of the multi-touch display device at the first position that corresponds to the first point within the displayed object while the second user input device concurrently is engaging the surface of the multi-touch display device at the second position that corresponds to the second point within the displayed object and while the third user input device concurrently is engaging the surface of the multi-touch display device at the third position that corresponds to the third point within the displayed object:

determining that the second point in time at which the second user input device first engaged the second position on the surface of the multi-touch display device and the third point in time at which the third user input device first engaged the third position on the surface of the multi-touch display occurred within a predefined time period of one another, determining that the first point in time at which the first user input device first engaged the first position on the surface of the multi-touch display device did not occur within the predefined period of time of the second point in time at which the second user input device first engaged the second position on the surface of the multi-touch display device or the third point in time at which the third user input device first engaged the third position on the surface of the multi-touch display, and as a consequence of having determined that the second point in time at which the second user input device first engaged the second position on the surface of the multi-touch display device and the third point in time at which the third user input device first engaged the third position on the surface of the multi-touch display occurred within the predefined period time of one another and as a consequence of having determined that the first point in time at which the first user input device first engaged the first position on the surface of the multi-touch display device did not occur within the predefined period of time of the second point in time at which the second user input device first engaged the second position on the surface of the multi-touch display device or the third point in time at which the third user input device first engaged the third position on the surface of the multi-touch display, determining to allocate control of the displayed object to the second user input device and the third user input device but not the first user input device, wherein control of the displayed object is allocated to the second user input device and the third user input device as a single unit;

after allocating control of the displayed object to the second and third user input devices as a single unit and as a consequence of tracking movements of the first user input device while the first user input device continues to engage the surface of the multi-touch display device, tracking movements of the second user input device while the second user input device continues to engage the surface of the multi-touch display device, and tracking movements of the third user input device while the third user input device continues to engage the surface of the multi-touch display device, determining that the first user input device moved to a fourth position on the surface of the multi-touch display device from the first position on the surface of the multi-touch display device while the second user input device concurrently moved to a fifth position on the surface of the multi-touch display device from the second position on the surface of the multi-touch display device and while the third user input device concurrently moved to a sixth position on the surface of the multi-touch display device from the third position on the surface of the multi-touch display device; and as a consequence of having determined that the second user input device moved to the fifth position on the surface of the multi-touch display device from the second position on the surface of the multi-touch display device and the third user input device moved to the sixth position on the surface of the multi-touch display device from the third position on the surface of the multi-touch display device and as a consequence of having allocated control of the displayed object to the second user input device and the third user input device as a single unit, translating the displayed object about the display component of the multi-touch display device as a function of the determined movement of the second user input device to the fifth position on the surface of the multi-touch display device from the second position on the surface of the multi-touch display device and the determined movement of the third user input device to the sixth position on the surface of the multi-touch display device from the third position on the surface of the multi-touch display device, wherein the translation of the displayed object about the display component of the multi-touch display device as a function of the determined movement of the second user input device to the fifth position on the surface of the multi-touch display device from the second position on the surface of the multi-touch display device and the determined movement of the third user input device to the sixth position on the surface of the multi-touch display device from the third position on the surface of the multi-touch display device is not influenced by the determined movement of the first user input device to the fourth position on the surface of the multi-touch display device from the first position on the surface of the multi-touch display device.

11. A computer-implemented method for allocating control among user input devices when multiple user input devices are engaging an object displayed on a multi-touch display device, the method comprising:

displaying an object on a display component of a multi-touch display device;

determining that a first user input device is engaging a surface of the multi-touch display device;

as a consequence of having determined that the first user input device is engaging the surface of the multi-touch display device, tracking movements of the first user input device while the first user input device continues to engage the surface of the multi-touch display device;

determining that a second user input device is engaging the surface of the multi-touch display device;

as a consequence of having determined that the second user input device is engaging the surface of the multi-touch display device, tracking movements of the second user input device while the second user input device continues to engage the surface of the multi-touch display device;

determining that a third user input device is engaging the surface of the multi-touch display device;

as a consequence of having determined that the third user input device is engaging the surface of the multi-touch display device, tracking movements of the third user input device while the third user input device continues to engage the surface of the multi-touch display device;

determining that the first user input device determined to be engaging the surface of the multi-touch display device is engaging the surface of the multi-touch display device at a first position that corresponds to a first point within the displayed object while the second user input device determined to be engaging the surface of the multi-touch display device concurrently is engaging the surface of the multi-touch display device at a second position that corresponds to a second point within the displayed object and while the third user input device determined to be engaging the surface of the multi-touch display device concurrently is engaging the surface of the multi-touch display device at a third position that corresponds to a third point within the displayed object;

as a consequence of having determined that the first user input device, the second user input device, and the third user input device concurrently are engaging positions on the surface of the multi-touch display device that correspond to points within the displayed object, determining to allocate control of the displayed object to the first user input device and the second user input device but not the third user input device;

after allocating control of the displayed object to the first user input device and the second user input device and as a consequence of tracking movements of the first user input device while the first user input device continues to engage the surface of the multi-touch display device, tracking movements of the second user input device while the second user input device continues to engage the surface of the multi-touch display device, and tracking movements of the third user input device while the third user input device continues to engage the surface of the multi-touch display device, determining that at least one of the first user input device and the second user input device moved relative to the other of the first user input device and the second user input device on the surface of the multi-touch display device while the third user input device concurrently moved to a fourth position on the surface of the multi-touch display device from the third position on the surface of the multi-touch display device;

as a consequence of having allocated control of the displayed object to the first user input device and the second user input device, transforming the displayed object on the display component of the multi-touch display device as a function of the determined relative movement of the first and second user input devices, wherein the transformation of the displayed object on the display component of the multi-touch display device as a function of the determined relative movement of the first and second user input devices is not influenced by the determined movement of the third user input device to the fourth position on the surface of the multi-touch display device from the third position on the surface of the multi-touch display device;

after transforming the displayed object on the display component of the multi-touch display device as a function of the determined relative movement of the first and second user input devices, determining that the third user input device moved to a fifth position on the surface of the multi-touch display device from the fourth position on the surface of the multi-touch display device while the first user input device and the second user input devices remained in fixed positions on the surface of the multi-touch display device; and in response to having determined that the third user input device moved to a fifth position on the surface of the multi-touch display device from the fourth position on the surface of the multi-touch display device while the first user input device and the second user input devices remained in fixed positions on the surface of the multi-touch display device and as a consequence of having allocated control of the displayed object to the first user input device and the second user input device but not the third user input device, preserving the position, orientation, and scale of the displayed object on the display component of the multi-touch display device.

* * * * *